(12) United States Patent
Martone et al.

(10) Patent No.: US 12,508,688 B2
(45) Date of Patent: Dec. 30, 2025

(54) ABRASIVE ARTICLES AND METHODS OF FORMING SAME

(71) Applicants: SAINT-GOBAIN ABRASIVES, INC., Worcester, MA (US); SAINT-GOBAIN SURFACE SOLUTIONS FRANCE, Conflans-Sainte-Honorine (FR)

(72) Inventors: Anthony Martone, Belmont, MA (US); Hua Fan, Southborough, MA (US)

(73) Assignees: SAINT-GOBAIN ABRASIVES, INC., Worcester, MA (US); SAINT-GOBAIN SURFACE SOLUTIONS FRANCE, Conflans-Sainte-Honorine (FR)

( * ) Notice: Subject to any disclaimer, the term of this patent is extended or adjusted under 35 U.S.C. 154(b) by 308 days.

(21) Appl. No.: 18/148,390

(22) Filed: Dec. 29, 2022

(65) Prior Publication Data
US 2023/0211467 A1 Jul. 6, 2023

Related U.S. Application Data

(60) Provisional application No. 63/266,268, filed on Dec. 30, 2021.

(51) Int. Cl.
*B24D 11/02* (2006.01)
(52) U.S. Cl.
CPC .................. *B24D 11/02* (2013.01)
(58) Field of Classification Search
CPC ............... C09K 3/1409; C09K 3/1436; B24D 3/00–348; B24D 3/001–007; B24D 3/002; B24D 3/004; B24D 3/008; B24D 3/28; B24D 3411/02; B24D 3411/001; Y10T 428/2982; Y10T 428/2991; Y10T 428/2993

USPC .... 51/295, 298, 307, 308, 309; 451/59, 526, 451/533, 534, 539, 538
See application file for complete search history.

(56) References Cited

U.S. PATENT DOCUMENTS

| | | |
|---|---|---|
| 345,604 A | 7/1886 | Semper |
| 1,910,444 A | 5/1933 | Nicholson |
| 2,033,991 A | 3/1936 | Melton et al. |
| 2,036,903 A | 4/1936 | Webster |
| 2,049,874 A | 8/1936 | Sherk |

(Continued)

FOREIGN PATENT DOCUMENTS

| | | |
|---|---|---|
| CA | 743715 A | 10/1966 |
| CA | 2423788 A1 | 7/2002 |

(Continued)

OTHER PUBLICATIONS

Torre, "Investigation of Shaped Abrasive Particles vol. 1: Review of U.S. Pat. No. 6,054,093 Apr. 25, 2000" © Apr. 2011.

(Continued)

*Primary Examiner* — Robert F Neibaur
(74) *Attorney, Agent, or Firm* — Abel Schillinger, LLP; Arpan Ghosh

(57) ABSTRACT

An abrasive article including: a backing layer including a front fill overlying a backing, wherein the backing layer including the front fill comprises (1) a surface roughness of not greater than 100 microns or (2) an average thickness/roughness ratio of greater than 0.80; a make coat overlying the backing layer; and a plurality of abrasive particles overlying the backing layer, wherein at least 65% of the abrasive particles have a well-oriented tilt orientation.

29 Claims, 14 Drawing Sheets

(56) References Cited

U.S. PATENT DOCUMENTS

| | | |
|---|---|---|
| 2,148,400 A | 2/1939 | Crompton, Jr. |
| 2,248,064 A | 7/1941 | Carlton et al. |
| 2,248,990 A | 7/1941 | Heany |
| 2,290,877 A | 7/1942 | Heany |
| 2,318,360 A | 5/1943 | Benner et al. |
| 2,376,343 A | 5/1945 | Carlton |
| 2,414,474 A | 1/1947 | March |
| 2,563,650 A | 8/1951 | Heinemann |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,284,178 A | 11/1966 | Timmer et al. |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. et al. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Gluchowicz |
| 3,608,050 A | 9/1971 | Carman et al. |
| 3,608,134 A | 9/1971 | Cook |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,808,747 A | 5/1974 | Kenagy |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda et al. |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 9/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,863,573 A | 9/1989 | Moore et al. |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,457 A | 5/1990 | Dekok et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Willkens et al. |
| 4,997,461 A | 3/1991 | Markhoff-Matheny et al. |
| 5,000,760 A | 3/1991 | Ohtsubo et al. |
| 5,008,222 A | 4/1991 | Kameda |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,165 A | 9/1991 | Tselesin |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |

(56) References Cited

U.S. PATENT DOCUMENTS

| | | |
|---|---|---|
| 5,244,477 A | 9/1993 | Rue et al. |
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,314,513 A | 5/1994 | Miller et al. |
| 5,360,462 A | 11/1994 | Harmer et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,489,318 A | 2/1996 | Erickson et al. |
| 5,496,386 A | 3/1996 | Broberg et al. |
| 5,498,268 A | 3/1996 | Gagliardi et al. |
| 5,500,273 A | 3/1996 | Holmes et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,549,962 A | 8/1996 | Holmes et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,603,738 A | 2/1997 | Zeiringer et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,940 A | 9/1997 | Stubbs |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,632 A | 1/1999 | Stoetzel et al. |
| 5,855,997 A | 1/1999 | Amateau |
| 5,863,306 A | 1/1999 | Wei et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,946,991 A | 9/1999 | Hoopman |
| 5,975,987 A | 11/1999 | Hoopman et al. |
| 5,980,678 A | 11/1999 | Tselesin |
| 5,984,988 A | 11/1999 | Berg et al. |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,027,326 A | 2/2000 | Cesarano, III et al. |
| 6,039,775 A | 3/2000 | Ho et al. |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,179,887 B1 | 1/2001 | Barber, Jr. et al. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,398,989 B1 | 6/2002 | Bergstrom |
| 6,401,795 B1 | 6/2002 | Cesarano, III et al. |
| 6,403,001 B1 | 6/2002 | Hayashi |
| 6,406,200 B2 | 6/2002 | Mahoney |
| 6,413,286 B1 | 7/2002 | Swei et al. |
| 6,428,392 B1 | 8/2002 | Sunahara et al. |
| 6,451,076 B1 | 9/2002 | Nevoret et al. |
| 6,475,253 B2 | 11/2002 | Culler et al. |

(56) References Cited

U.S. PATENT DOCUMENTS

| | | |
|---|---|---|
| 6,500,493 B2 | 12/2002 | Swei et al. |
| 6,511,938 B1 | 1/2003 | Liu |
| 6,524,681 B1 | 2/2003 | Seitz et al. |
| 6,531,423 B1 | 3/2003 | Schwetz et al. |
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,620,214 B2 | 9/2003 | McArdle et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,750,173 B2 | 6/2004 | Rizkalla |
| 6,752,700 B2 | 6/2004 | Duescher |
| 6,755,729 B2 | 6/2004 | Ramanath et al. |
| 6,802,878 B2 | 10/2004 | Monroe |
| 6,821,196 B2 | 11/2004 | Oliver |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,949,128 B2 | 9/2005 | Annen |
| 6,951,504 B2 | 10/2005 | Adefris et al. |
| 6,974,930 B2 | 12/2005 | Jense |
| 7,022,179 B1 | 4/2006 | Dry |
| 7,044,989 B2 | 5/2006 | Welygan et al. |
| 7,112,621 B2 | 9/2006 | Rohrbaugh et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,604 B2 | 9/2007 | Yoshizawa et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,404,832 B2 | 7/2008 | Ohtsubo et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,632,434 B2 | 12/2009 | Duescher |
| 7,651,386 B2 | 1/2010 | Sung |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,867,302 B2 | 1/2011 | Nevoret et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,333,360 B2 | 12/2012 | Rule et al. |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,530,682 B2 | 9/2013 | Sachs |
| 8,568,497 B2 | 10/2013 | Sheridan |
| 8,628,597 B2 | 1/2014 | Palmgren et al. |
| 8,783,589 B2 | 7/2014 | Hart et al. |
| 8,852,643 B2 | 10/2014 | Gonzales et al. |
| 8,920,527 B2 | 12/2014 | Seider et al. |
| 8,921,687 B1 | 12/2014 | Welser |
| 9,017,439 B2 | 4/2015 | Yener et al. |
| 9,079,154 B2 | 7/2015 | Rosendahl |
| 9,181,477 B2 | 11/2015 | Collins et al. |
| 9,211,634 B2 | 12/2015 | Rehrig et al. |
| 9,259,726 B2 | 2/2016 | Gopal |
| 9,375,826 B2 | 6/2016 | Tian et al. |
| 9,662,768 B2 * | 5/2017 | Sharmila .................. B24D 3/32 |
| 9,717,674 B1 | 8/2017 | Guskey et al. |
| 9,758,724 B2 | 9/2017 | Collins et al. |
| 9,982,175 B2 | 5/2018 | Sarangi et al. |
| D849,066 S | 5/2019 | Hanschen et al. |
| D849,067 S | 5/2019 | Hanschen et al. |
| 10,351,745 B2 | 7/2019 | Josseaux et al. |
| 10,364,383 B2 | 7/2019 | Yener et al. |
| D862,538 S | 10/2019 | Hanschen et al. |
| D870,782 S | 12/2019 | Hanschen et al. |
| 10,556,323 B2 | 2/2020 | Alkhas et al. |
| 10,557,068 B2 | 2/2020 | Oldenkotte et al. |
| 10,563,105 B2 | 2/2020 | Cotter et al. |
| 10,611,939 B2 | 4/2020 | Hill et al. |
| 10,655,038 B2 | 5/2020 | Martinez et al. |
| 10,710,211 B2 | 7/2020 | Lehuu et al. |
| 10,717,908 B2 | 7/2020 | Hejtmann et al. |
| 11,643,582 B2 | 5/2023 | Bujnowski et al. |
| 2001/0027623 A1 | 10/2001 | Rosenflanz |
| 2002/0026752 A1 | 3/2002 | Culler et al. |
| 2002/0068518 A1 | 6/2002 | Cesena et al. |
| 2002/0084290 A1 | 7/2002 | Materna |
| 2002/0090891 A1 | 7/2002 | Adefris et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2003/0228738 A1 | 12/2003 | Beaudoin |
| 2004/0003895 A1 | 1/2004 | Amano et al. |
| 2004/0148868 A1 | 8/2004 | Anderson et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0081455 A1 | 4/2005 | Welygan et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0245179 A1 | 11/2005 | Luedeke |

(56) References Cited

U.S. PATENT DOCUMENTS

| | | |
|---|---|---|
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0177488 A1 | 8/2006 | Caruso et al. |
| 2006/0185256 A1 | 8/2006 | Nevoret et al. |
| 2007/0001951 A1 | 1/2007 | Gaeta et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0072500 A1 | 3/2008 | Klett et al. |
| 2008/0098659 A1 | 5/2008 | Sung |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0233845 A1 | 9/2008 | Annen et al. |
| 2008/0262577 A1 | 10/2008 | Altshuler et al. |
| 2008/0271384 A1 | 11/2008 | Puthanangady et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017276 A1 | 1/2009 | Hoglund et al. |
| 2009/0017736 A1 | 1/2009 | Block et al. |
| 2009/0098365 A1 | 4/2009 | Moeltgen |
| 2009/0165394 A1 | 7/2009 | Culler et al. |
| 2009/0165661 A1 | 7/2009 | Koenig et al. |
| 2009/0169816 A1 | 7/2009 | Erickson et al. |
| 2009/0208734 A1 | 8/2009 | Macfie et al. |
| 2009/0246464 A1 | 10/2009 | Watanabe et al. |
| 2009/0325466 A1 | 12/2009 | Kincaid et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0040767 A1 | 2/2010 | Uibel et al. |
| 2010/0056816 A1 | 3/2010 | Wallin et al. |
| 2010/0064594 A1 | 3/2010 | Pakalapati et al. |
| 2010/0068974 A1 | 3/2010 | Dumm |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0251625 A1 | 10/2010 | Gaeta |
| 2010/0292428 A1 | 11/2010 | Meador et al. |
| 2010/0307067 A1 | 12/2010 | Sigalas et al. |
| 2010/0319269 A1 | 12/2010 | Erickson |
| 2010/0330886 A1 | 12/2010 | Wu et al. |
| 2011/0008604 A1 | 1/2011 | Boylan |
| 2011/0081848 A1 | 4/2011 | Chen |
| 2011/0092137 A1 | 4/2011 | Ohishi et al. |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0152548 A1 | 6/2011 | Sachs |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0034847 A1 | 2/2012 | Besse et al. |
| 2012/0055098 A1 | 3/2012 | Ramanath et al. |
| 2012/0100366 A1 | 4/2012 | Dumm et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2012/0308837 A1 | 12/2012 | Schlechtriemen et al. |
| 2012/0321567 A1 | 12/2012 | Gonzales et al. |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0067669 A1 | 3/2013 | Gonzales et al. |
| 2013/0072417 A1 | 3/2013 | Perez-Prat et al. |
| 2013/0074418 A1 | 3/2013 | Panzarella et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0203328 A1 | 8/2013 | Givot et al. |
| 2013/0212952 A1 | 8/2013 | Welygan et al. |
| 2013/0236725 A1 | 9/2013 | Yener et al. |
| 2013/0255162 A1 | 10/2013 | Welygan et al. |
| 2013/0260656 A1 | 10/2013 | Seth et al. |
| 2013/0267150 A1 | 10/2013 | Seider et al. |
| 2013/0283705 A1 | 10/2013 | Fischer et al. |
| 2013/0296587 A1 | 11/2013 | Rosendahl |
| 2013/0305614 A1 | 11/2013 | Gaeta et al. |
| 2013/0337262 A1 | 12/2013 | Bauer et al. |
| 2013/0337725 A1 | 12/2013 | Monroe |
| 2013/0344786 A1 | 12/2013 | Keipert |
| 2014/0000176 A1 | 1/2014 | Moren et al. |
| 2014/0007518 A1 | 1/2014 | Yener et al. |
| 2014/0080393 A1 | 3/2014 | Ludwig |
| 2014/0106126 A1 | 4/2014 | Gaeta et al. |
| 2014/0107356 A1 | 4/2014 | Gopal |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0256238 A1 | 9/2014 | Van et al. |
| 2014/0287658 A1 | 9/2014 | Flaschberger et al. |
| 2014/0290147 A1 | 10/2014 | Seth et al. |
| 2014/0325917 A1 | 11/2014 | Czerepinski et al. |
| 2014/0345204 A1 | 11/2014 | Wang et al. |
| 2014/0345205 A1 | 11/2014 | Kavanaugh et al. |
| 2014/0352721 A1 | 12/2014 | Gonzales et al. |
| 2014/0352722 A1 | 12/2014 | Gonzales et al. |
| 2014/0357544 A1 | 12/2014 | Gonzales et al. |
| 2014/0378036 A1 | 12/2014 | Cichowlas et al. |
| 2015/0000209 A1 | 1/2015 | Louapre et al. |
| 2015/0000210 A1 | 1/2015 | Breder et al. |
| 2015/0007399 A1 | 1/2015 | Gonzales et al. |
| 2015/0007400 A1 | 1/2015 | Gonzales et al. |
| 2015/0068130 A1 | 3/2015 | Louapre et al. |
| 2015/0089881 A1 | 4/2015 | Stevenson et al. |
| 2015/0126098 A1 | 5/2015 | Eilers et al. |
| 2015/0128505 A1 | 5/2015 | Wang et al. |
| 2015/0158148 A1 | 6/2015 | Sharmila et al. |
| 2015/0183089 A1 | 7/2015 | Iyengar et al. |
| 2015/0209932 A1 | 7/2015 | Lehuu et al. |
| 2015/0218430 A1 | 8/2015 | Yener et al. |
| 2015/0232727 A1 | 8/2015 | Erickson |
| 2015/0267099 A1 | 9/2015 | Panzarella et al. |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 12/2015 | Breder et al. |
| 2016/0053151 A1 | 2/2016 | Bauer et al. |
| 2016/0074998 A1 | 3/2016 | Sharmila et al. |
| 2016/0090516 A1 | 3/2016 | Yener et al. |
| 2016/0107290 A1 | 4/2016 | Bajaj et al. |
| 2016/0177152 A1 | 6/2016 | Braun |
| 2016/0177153 A1 | 6/2016 | Josseaux |
| 2016/0177154 A1 | 6/2016 | Josseaux et al. |
| 2016/0186028 A1 | 6/2016 | Louapre et al. |
| 2016/0214903 A1 | 7/2016 | Humpal et al. |

(56) References Cited

U.S. PATENT DOCUMENTS

| | | |
|---|---|---|
| 2016/0289520 A1 | 10/2016 | Bujnowski et al. |
| 2016/0289521 A1 | 10/2016 | Colet et al. |
| 2016/0298013 A1 | 10/2016 | Bock et al. |
| 2016/0303704 A1 | 10/2016 | Chou et al. |
| 2016/0303705 A1 | 10/2016 | Chou et al. |
| 2016/0304760 A1 | 10/2016 | Bock et al. |
| 2016/0311081 A1 | 10/2016 | Culler et al. |
| 2016/0311084 A1 | 10/2016 | Culler et al. |
| 2016/0326416 A1 | 11/2016 | Bauer et al. |
| 2016/0340564 A1 | 11/2016 | Louapre et al. |
| 2016/0354898 A1 | 12/2016 | Nienaber et al. |
| 2016/0362589 A1 | 12/2016 | Bauer et al. |
| 2016/0375556 A1 | 12/2016 | Seth et al. |
| 2017/0015886 A1 | 1/2017 | Czerepinski et al. |
| 2017/0028531 A1 | 2/2017 | Gaeta et al. |
| 2017/0050293 A1 | 2/2017 | Gaeta et al. |
| 2017/0066099 A1 | 3/2017 | Nakamura |
| 2017/0114260 A1 | 4/2017 | Bock et al. |
| 2017/0129075 A1 | 5/2017 | Thurber et al. |
| 2017/0145274 A1 | 5/2017 | Yener et al. |
| 2017/0158930 A1 | 6/2017 | Iyengar |
| 2017/0225299 A1 | 8/2017 | Keipert et al. |
| 2017/0247592 A1 | 8/2017 | Bauer et al. |
| 2017/0335155 A1 | 11/2017 | Czerepinski et al. |
| 2017/0335156 A1 | 11/2017 | Bauer et al. |
| 2017/0342303 A1 | 11/2017 | Stevenson et al. |
| 2017/0349797 A1 | 12/2017 | Yener et al. |
| 2018/0002584 A1 | 1/2018 | Yener et al. |
| 2018/0086957 A1 | 3/2018 | Sahlin et al. |
| 2018/0155592 A1 | 6/2018 | Josseaux et al. |
| 2018/0161960 A1 | 6/2018 | Wilson et al. |
| 2018/0169837 A1 | 6/2018 | Liu |
| 2018/0187057 A1 | 7/2018 | Bujnowski et al. |
| 2018/0215975 A1 | 8/2018 | Marazano et al. |
| 2018/0215976 A1 | 8/2018 | Cotter et al. |
| 2018/0237675 A1 | 8/2018 | Yener et al. |
| 2018/0318983 A1 | 11/2018 | Wilson et al. |
| 2018/0327644 A1 | 11/2018 | Bauer et al. |
| 2018/0370857 A1 | 12/2018 | Marlin et al. |
| 2019/0022826 A1 | 1/2019 | Franke et al. |
| 2019/0030684 A1 | 1/2019 | Van et al. |
| 2019/0091835 A1 | 3/2019 | Culler et al. |
| 2019/0119540 A1 | 4/2019 | Colet et al. |
| 2019/0126436 A1 | 5/2019 | Westberg et al. |
| 2019/0160630 A1 | 5/2019 | Jiang et al. |
| 2019/0217442 A1 | 7/2019 | Gaeta et al. |
| 2019/0217444 A1* | 7/2019 | Zhang .................. B24D 11/02 |
| 2019/0249052 A1 | 8/2019 | Eckel et al. |
| 2019/0270182 A1 | 9/2019 | Eckel et al. |
| 2019/0284461 A1 | 9/2019 | Josseaux et al. |
| 2019/0309201 A1 | 10/2019 | Dumont et al. |
| 2019/0322915 A1 | 10/2019 | Jiwpanich et al. |
| 2019/0330505 A1 | 10/2019 | Bujnowski et al. |
| 2019/0337124 A1 | 11/2019 | Liu et al. |
| 2019/0338172 A1 | 11/2019 | Erickson et al. |
| 2019/0338173 A1 | 11/2019 | Yener et al. |
| 2019/0351531 A1 | 11/2019 | Nelson et al. |
| 2019/0358776 A1 | 11/2019 | Seth et al. |
| 2019/0366511 A1 | 12/2019 | Huber |
| 2019/0382637 A1 | 12/2019 | Braun et al. |
| 2020/0139512 A1 | 5/2020 | Culler et al. |
| 2020/0148927 A1 | 5/2020 | Arcona et al. |
| 2020/0156215 A1 | 5/2020 | Jusuf et al. |
| 2020/0157396 A1 | 5/2020 | Cotter et al. |
| 2020/0157397 A1 | 5/2020 | Stevenson et al. |
| 2020/0199426 A1 | 6/2020 | Yener et al. |
| 2020/0262031 A1 | 8/2020 | Seth et al. |
| 2020/0308462 A1 | 10/2020 | Bauer et al. |
| 2020/0391354 A1 | 12/2020 | Marazano et al. |
| 2021/0024798 A1 | 1/2021 | Czerepinski et al. |
| 2021/0087444 A1 | 3/2021 | Stevenson et al. |
| 2021/0087445 A1 | 3/2021 | Cotter et al. |
| 2021/0108117 A1 | 4/2021 | Bauer et al. |
| 2021/0108118 A1 | 4/2021 | Yener et al. |
| 2021/0130667 A1 | 5/2021 | Arcona et al. |
| 2021/0197339 A1 | 7/2021 | Marlin et al. |
| 2021/0198544 A1 | 7/2021 | Marlin et al. |
| 2021/0198545 A1 | 7/2021 | Marlin et al. |
| 2021/0332278 A1 | 10/2021 | Iyengar |
| 2021/0395587 A1 | 12/2021 | Yener et al. |
| 2022/0001512 A1 | 1/2022 | Gaeta et al. |
| 2022/0025237 A1 | 1/2022 | Sahlin et al. |
| 2023/0061952 A1 | 3/2023 | Lentz et al. |
| 2023/0065541 A1 | 3/2023 | Colet et al. |
| 2023/0096577 A1 | 3/2023 | Cotter et al. |
| 2023/0135441 A1 | 5/2023 | Seth et al. |
| 2023/0193100 A1 | 6/2023 | Josseaux et al. |
| 2023/0211466 A1 | 7/2023 | Martone et al. |
| 2023/0211467 A1 | 7/2023 | Martone et al. |
| 2023/0211468 A1 | 7/2023 | Martone et al. |
| 2023/0220255 A1 | 7/2023 | Yuyang et al. |
| 2023/0220256 A1 | 7/2023 | Bujnowski et al. |
| 2023/0265326 A1 | 8/2023 | Adefris |
| 2023/0272254 A1 | 8/2023 | Yener et al. |
| 2023/0294247 A1 | 9/2023 | Liu et al. |
| 2023/0332030 A1 | 10/2023 | Bauer et al. |
| 2023/0357617 A9 | 11/2023 | Yener et al. |
| 2024/0116153 A1 | 4/2024 | Martone et al. |
| 2024/0123574 A1 | 4/2024 | Martone et al. |
| 2024/0141219 A1 | 5/2024 | Bauer et al. |
| 2024/0198488 A1 | 6/2024 | Marlin et al. |
| 2024/0218224 A1 | 7/2024 | Fan et al. |
| 2024/0218225 A1 | 7/2024 | Cotter et al. |
| 2024/0254376 A1 | 8/2024 | Josseaux et al. |

FOREIGN PATENT DOCUMENTS

| | | |
|---|---|---|
| CH | 685051 A5 | 3/1995 |
| CN | 1229007 A | 7/2005 |
| CN | 1774488 A | 5/2006 |
| CN | 101389466 A | 3/2009 |
| CN | 101970347 A | 2/2011 |
| CN | 101980836 A | 2/2011 |
| CN | 102281992 A | 12/2011 |
| CN | 103189164 A | 7/2013 |
| CN | 103842132 A | 6/2014 |
| CN | 102123837 B | 7/2014 |
| CN | 104125875 A | 10/2014 |
| CN | 104994995 A | 10/2015 |
| CN | 105622071 A | 6/2016 |
| CN | 105713568 A | 6/2016 |
| DE | 3923671 C2 | 2/1998 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 0078896 A2 | 5/1983 |
| EP | 0152768 A2 | 8/1985 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |

(56) References Cited

FOREIGN PATENT DOCUMENTS

| | | |
|---|---|---|
| EP | 0614861 B1 | 5/2001 |
| EP | 0931032 B1 | 7/2001 |
| EP | 0833803 | 8/2001 |
| EP | 1207015 A2 | 5/2002 |
| EP | 1356152 A2 | 10/2003 |
| EP | 1371451 A1 | 12/2003 |
| EP | 1383631 A1 | 1/2004 |
| EP | 1015181 B1 | 3/2004 |
| EP | 1492845 A1 | 1/2005 |
| EP | 1851007 | 11/2007 |
| EP | 1960157 A1 | 8/2008 |
| EP | 2176031 A1 | 4/2010 |
| EP | 2184134 A1 | 5/2010 |
| EP | 2242618 A2 | 10/2010 |
| EP | 2390056 A2 | 11/2011 |
| EP | 1800801 B1 | 3/2012 |
| EP | 2445982 A2 | 5/2012 |
| EP | 2507016 A2 | 10/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| EP | 2719752 A1 | 4/2014 |
| EP | 2012972 B1 | 6/2014 |
| EP | 2720676 B1 | 1/2018 |
| EP | 3319758 A1 | 5/2018 |
| EP | 3342839 A1 | 7/2018 |
| EP | 3444313 B1 | 7/2020 |
| EP | 3830211 A1 | 6/2021 |
| FR | 2354373 A1 | 1/1978 |
| GB | 986847 A | 3/1965 |
| GB | 1456765 A | 11/1976 |
| GB | 1466054 | 3/1977 |
| JP | 53064890 A | 6/1978 |
| JP | 60-006356 U | 1/1985 |
| JP | 62002946 B | 1/1987 |
| JP | 63036905 B | 7/1988 |
| JP | 03079277 A | 4/1991 |
| JP | 03-287687 | 12/1991 |
| JP | 05285833 A | 11/1993 |
| JP | 06114739 A | 4/1994 |
| JP | 07008474 B2 | 2/1995 |
| JP | 3030861 U | 8/1996 |
| JP | 10113875 A | 5/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 2000-336344 A | 12/2000 |
| JP | 2000354967 A | 12/2000 |
| JP | 3160084 B2 | 4/2001 |
| JP | 2001162541 A | 6/2001 |
| JP | 3194269 B2 | 7/2001 |
| JP | 2001180930 A | 7/2001 |
| JP | 2001207160 A | 7/2001 |
| JP | 2001516652 A | 10/2001 |
| JP | 2002-038131 A | 2/2002 |
| JP | 2002210659 A | 7/2002 |
| JP | 2003-049158 A | 2/2003 |
| JP | 2004-510873 A | 4/2004 |
| JP | 2004209624 A | 7/2004 |
| JP | 2006130586 A | 5/2006 |
| JP | 2006130636 A | 5/2006 |
| JP | 2006159402 A | 6/2006 |
| JP | 2006-192540 A | 7/2006 |
| JP | 2006224201 A | 8/2006 |
| JP | 2007-537891 A | 12/2007 |
| JP | 2008132560 A | 6/2008 |
| JP | 2008194761 A | 8/2008 |
| JP | 2008531305 A | 8/2008 |
| JP | 2012512046 A | 5/2012 |
| JP | 2012512047 A | 5/2012 |
| JP | 2012512048 A | 5/2012 |
| JP | 2012530615 A | 12/2012 |
| JP | 5238725 B2 | 7/2013 |
| JP | 5238726 B2 | 7/2013 |
| JP | 2014503367 A | 2/2014 |
| JP | 2017518889 A | 7/2017 |
| JP | 2017538588 A | 12/2017 |
| JP | 2018510073 A | 4/2018 |
| KR | 1019890014409 A | 10/1989 |
| KR | 1020020042840 A | 6/2002 |
| KR | 20140106713 A | 9/2014 |
| NL | 171464 B1 | 11/1982 |
| WO | 94/02559 A1 | 2/1994 |
| WO | 95/03370 | 2/1995 |
| WO | 1995016756 A1 | 6/1995 |
| WO | 1995017287 A1 | 6/1995 |
| WO | 95/18192 A1 | 7/1995 |
| WO | 95/20469 A1 | 8/1995 |
| WO | 1996012776 A1 | 5/1996 |
| WO | 1996014964 A1 | 5/1996 |
| WO | 96/27189 A1 | 9/1996 |
| WO | 9711484 A1 | 3/1997 |
| WO | 97/14536 A1 | 4/1997 |
| WO | 99/06500 A1 | 2/1999 |
| WO | 99/14016 A1 | 3/1999 |
| WO | 99/38817 A1 | 8/1999 |
| WO | 1999038817 A1 | 8/1999 |
| WO | 99/54424 A1 | 10/1999 |
| WO | 0064630 A1 | 11/2000 |
| WO | 0114494 A1 | 3/2001 |
| WO | 0123323 A1 | 4/2001 |
| WO | 02097150 A2 | 12/2002 |
| WO | 03087236 A1 | 10/2003 |
| WO | 2005080624 A1 | 9/2005 |
| WO | 2005112601 A2 | 12/2005 |
| WO | 2006027593 A3 | 3/2006 |
| WO | 2006062597 A1 | 6/2006 |
| WO | 2007041538 A1 | 4/2007 |
| WO | 2009085578 A2 | 7/2009 |
| WO | 2009085841 A2 | 7/2009 |
| WO | 2009098017 A1 | 8/2009 |
| WO | 2010077509 A1 | 7/2010 |
| WO | 2010085587 A1 | 7/2010 |
| WO | 2010118440 A2 | 10/2010 |
| WO | 2010151201 A1 | 12/2010 |
| WO | 2011005425 A2 | 1/2011 |
| WO | 2011019188 A1 | 2/2011 |
| WO | 2011068714 A2 | 6/2011 |
| WO | 2011068724 A2 | 6/2011 |
| WO | 2011087649 A2 | 7/2011 |
| WO | 2011109188 A2 | 9/2011 |
| WO | 2011133438 A1 | 10/2011 |
| WO | 2011139562 A2 | 11/2011 |
| WO | 2011149625 A2 | 12/2011 |
| WO | 2012018903 A2 | 2/2012 |
| WO | 2012061016 A1 | 5/2012 |
| WO | 2012061033 A2 | 5/2012 |
| WO | 2012092590 A2 | 7/2012 |
| WO | 2012092605 A3 | 7/2012 |
| WO | 2010070294 A1 | 8/2012 |
| WO | 2012112305 A2 | 8/2012 |
| WO | 2012112322 A2 | 8/2012 |
| WO | 2012092590 A3 | 10/2012 |
| WO | 2012140617 A1 | 10/2012 |
| WO | 2012141905 A2 | 10/2012 |
| WO | 2013003830 A2 | 1/2013 |
| WO | 2013003831 A2 | 1/2013 |
| WO | 2013009484 A2 | 1/2013 |
| WO | 2013036402 A1 | 3/2013 |
| WO | 2013040423 A2 | 3/2013 |
| WO | 2013045251 A1 | 4/2013 |
| WO | 2013049239 A1 | 4/2013 |
| WO | 2013070576 A2 | 5/2013 |

(56) References Cited

FOREIGN PATENT DOCUMENTS

| | | |
|---|---|---|
| WO | 2013101575 A1 | 7/2013 |
| WO | 2013102170 A1 | 7/2013 |
| WO | 2013102176 A1 | 7/2013 |
| WO | 2013102177 A1 | 7/2013 |
| WO | 2013106597 A1 | 7/2013 |
| WO | 2013106602 A1 | 7/2013 |
| WO | 2013149209 A1 | 10/2013 |
| WO | 2013151745 A1 | 10/2013 |
| WO | 2013177446 A1 | 11/2013 |
| WO | 2013186146 A1 | 12/2013 |
| WO | 2013188038 A1 | 12/2013 |
| WO | 2014005120 A1 | 1/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014161001 A1 | 2/2014 |
| WO | 2014057273 A1 | 4/2014 |
| WO | 2014062701 A1 | 4/2014 |
| WO | 2014070468 A1 | 5/2014 |
| WO | 2014106173 A1 | 7/2014 |
| WO | 2014106211 A1 | 7/2014 |
| WO | 2014124554 A1 | 8/2014 |
| WO | 2014137972 A1 | 9/2014 |
| WO | 2014140689 A1 | 9/2014 |
| WO | 2014165390 A1 | 10/2014 |
| WO | 2014176108 A1 | 10/2014 |
| WO | 2014206739 A1 | 12/2014 |
| WO | 2014206890 A1 | 12/2014 |
| WO | 2014206967 A1 | 12/2014 |
| WO | 2014209567 A1 | 12/2014 |
| WO | 2014210160 A1 | 12/2014 |
| WO | 2014210442 A1 | 12/2014 |
| WO | 2014210532 A1 | 12/2014 |
| WO | 2014210568 A1 | 12/2014 |
| WO | 2015050781 A1 | 4/2015 |
| WO | 2015073346 A1 | 5/2015 |
| WO | 2015048768 A9 | 6/2015 |
| WO | 2015088953 A1 | 6/2015 |
| WO | 2015089527 A1 | 6/2015 |
| WO | 2015089528 A1 | 6/2015 |
| WO | 2015089529 A1 | 6/2015 |
| WO | 2015100018 A1 | 7/2015 |
| WO | 2015100020 A1 | 7/2015 |
| WO | 2015100220 A1 | 7/2015 |
| WO | 2015102992 A1 | 7/2015 |
| WO | 2015112379 A1 | 7/2015 |
| WO | 2015130487 A1 | 9/2015 |
| WO | 2015143461 A1 | 10/2015 |
| WO | 2015158009 A1 | 10/2015 |
| WO | 2015160854 A1 | 10/2015 |
| WO | 2015160855 A1 | 10/2015 |
| WO | 2015160857 A1 | 10/2015 |
| WO | 2015164211 A1 | 10/2015 |
| WO | 2015165122 A1 | 11/2015 |
| WO | 2015167910 A1 | 11/2015 |
| WO | 2015179335 A1 | 11/2015 |
| WO | 2015180005 A1 | 12/2015 |
| WO | 2015184355 A1 | 12/2015 |
| WO | 2016028683 A1 | 2/2016 |
| WO | 2016044158 A1 | 3/2016 |
| WO | 2016064726 A1 | 4/2016 |
| WO | 2016089675 A1 | 6/2016 |
| WO | 2016105469 A1 | 6/2016 |
| WO | 2016105474 A1 | 6/2016 |
| WO | 2016160357 A1 | 10/2016 |
| WO | 2016161157 A1 | 10/2016 |
| WO | 2016161170 A1 | 10/2016 |
| WO | 2016167967 A1 | 10/2016 |
| WO | 2016187570 A1 | 11/2016 |
| WO | 2016196795 A1 | 12/2016 |
| WO | 2016201104 A1 | 12/2016 |
| WO | 2016205133 A1 | 12/2016 |
| WO | 2016205267 A1 | 12/2016 |
| WO | 2016210057 A1 | 12/2016 |
| WO | 2017007703 A1 | 1/2017 |
| WO | 2017007714 A1 | 1/2017 |
| WO | 2017062482 A1 | 4/2017 |
| WO | 2017083249 A1 | 5/2017 |
| WO | 2017083255 A1 | 5/2017 |
| WO | 2016105543 A9 | 9/2017 |
| WO | 2017151498 A1 | 9/2017 |
| WO | 2017197002 A1 | 11/2017 |
| WO | 2017197006 A1 | 11/2017 |
| WO | 2018010730 A2 | 1/2018 |
| WO | 2018026669 A1 | 2/2018 |
| WO | 2018057465 A1 | 3/2018 |
| WO | 2018057558 A1 | 3/2018 |
| WO | 2018063902 A1 | 4/2018 |
| WO | 2018063958 A1 | 4/2018 |
| WO | 2018063960 A1 | 4/2018 |
| WO | 2018063962 A1 | 4/2018 |
| WO | 2018064642 A1 | 4/2018 |
| WO | 2018080703 A1 | 5/2018 |
| WO | 2018080704 A1 | 5/2018 |
| WO | 2018080705 A1 | 5/2018 |
| WO | 2018080755 A1 | 5/2018 |
| WO | 2018080756 A1 | 5/2018 |
| WO | 2018080765 A1 | 5/2018 |
| WO | 2018080778 A1 | 5/2018 |
| WO | 2018080784 A1 | 5/2018 |
| WO | 2018081246 A1 | 5/2018 |
| WO | 2018118688 A1 | 6/2018 |
| WO | 2018118690 A1 | 6/2018 |
| WO | 2018118695 A1 | 6/2018 |
| WO | 2018118699 A1 | 6/2018 |
| WO | 2018134732 A1 | 7/2018 |
| WO | 2018136268 A1 | 7/2018 |
| WO | 2018136269 A1 | 7/2018 |
| WO | 2018136271 A1 | 7/2018 |
| WO | 2018172193 A1 | 9/2018 |
| WO | 2018207145 A1 | 11/2018 |
| WO | 2018226912 A1 | 12/2018 |
| WO | 2018236989 A1 | 12/2018 |
| WO | 2019001908 A1 | 1/2019 |
| WO | 2019069157 A1 | 4/2019 |
| WO | 2019102312 A1 | 5/2019 |
| WO | 2019102328 A1 | 5/2019 |
| WO | 2019102329 A1 | 5/2019 |
| WO | 2019102330 A1 | 5/2019 |
| WO | 2019102331 A1 | 5/2019 |
| WO | 2019108805 A2 | 6/2019 |
| WO | 2021161129 A1 | 8/2019 |
| WO | 2019167022 A1 | 9/2019 |
| WO | 2019197948 A1 | 10/2019 |
| WO | 2019207415 A1 | 10/2019 |
| WO | 2019207416 A1 | 10/2019 |
| WO | 2019207417 A1 | 10/2019 |
| WO | 2019207423 A1 | 10/2019 |
| WO | 2019215571 A1 | 11/2019 |
| WO | 2020025270 A1 | 2/2020 |
| WO | 2020035764 A1 | 2/2020 |
| WO | 2020075005 A1 | 4/2020 |
| WO | 2020079522 A1 | 4/2020 |
| WO | 2020084382 A1 | 4/2020 |
| WO | 2020084483 A1 | 4/2020 |
| WO | 2020089741 A1 | 5/2020 |
| WO | 2020115685 A1 | 6/2020 |
| WO | 2020128708 A1 | 6/2020 |
| WO | 2020128716 A1 | 6/2020 |
| WO | 2020128717 A1 | 6/2020 |
| WO | 2020128719 A1 | 6/2020 |
| WO | 2020128720 A2 | 6/2020 |
| WO | 2020128752 A1 | 6/2020 |
| WO | 2020128779 A2 | 6/2020 |
| WO | 2020128780 A1 | 6/2020 |
| WO | 2020128781 A1 | 6/2020 |
| WO | 2020128783 A1 | 6/2020 |
| WO | 2020128787 A1 | 6/2020 |
| WO | 2020128794 A1 | 6/2020 |
| WO | 2020128833 A1 | 6/2020 |
| WO | 2020128838 A1 | 6/2020 |
| WO | 2020128842 A1 | 6/2020 |

(56) References Cited

FOREIGN PATENT DOCUMENTS

| | | |
|---|---|---|
| WO | 2020128844 A1 | 6/2020 |
| WO | 2020128845 A1 | 6/2020 |
| WO | 2020128852 A1 | 6/2020 |
| WO | 2020128853 A1 | 6/2020 |
| WO | 2020128856 A1 | 6/2020 |
| WO | 2020212788 A1 | 10/2020 |
| WO | 2021009600 A1 | 1/2021 |
| WO | 2021014271 A1 | 1/2021 |
| WO | 2021074756 A1 | 4/2021 |
| WO | 2021074768 A1 | 4/2021 |
| WO | 2021079331 A1 | 4/2021 |
| WO | 2021081571 A1 | 5/2021 |
| WO | 2021105030 A1 | 6/2021 |
| WO | 2021116883 A1 | 6/2021 |
| WO | 2021133876 A1 | 7/2021 |
| WO | 2021133888 A1 | 7/2021 |
| WO | 2021133901 A1 | 7/2021 |
| WO | 2021137092 A1 | 7/2021 |
| WO | WO-2021152444 A1 * 8/2021 ........... B24D 11/001 |
| WO | 2021179025 A1 | 9/2021 |
| WO | 2021186326 A1 | 9/2021 |
| WO | 2021214576 A1 | 10/2021 |
| WO | 2021214605 A1 | 10/2021 |
| WO | 2021234540 A1 | 11/2021 |
| WO | 2022022905 A1 | 2/2022 |
| WO | 2022022906 A1 | 2/2022 |
| WO | 2022229744 A1 | 11/2022 |
| WO | 2023130051 A1 | 7/2023 |
| WO | 2023130052 A1 | 7/2023 |
| WO | 2023130053 A1 | 7/2023 |
| WO | 2023209518 A1 | 11/2023 |
| WO | 2024127255 A1 | 6/2024 |
| WO | 2024145523 A1 | 7/2024 |

OTHER PUBLICATIONS

Austin, Benson M., "Thick-Film Screen Printing," Solid State Technology, Jun. 1969, pp. 53-58.
Avril, Nicolas Joseph "Manufacturing Glass-Fiber Reinforcement for Grinding Wheels" Massachusetts Institute of Technology, Feb. 1996, 105 pages.
Bacher, Rudolph J., "High Resolution Thick Film Printing," E.I. du Pont de Nemours & Company, Inc., Proceedings of the International Symposium on Microelectronics, 1986, pp. 576-581.
Besse, John R., "Understanding and controlling wheel truing and dressing forces when rotary plunge.Dressing," Cutting Tool Engineering, Jun. 2012, vol. 64, Issue 6, 4 pages.
Ciccotti, M. et al., "Complex dynamics in the peeling of an adhesive tape," International Journal of Adhesion & Adhesives 24 (2004) pp. 143-151.
Dupont, "Kevlar Aramid Pulp", Copyright 2011, DuPont, Accessed: Sep. 18, 2013, 2 pages.
Wu, J. et al., "Friction and Wear Properties of Kevlar Pulp Reinforced Epoxy Composite under Dry Sliding Condition", Tribology Letters, vol. 22, No. 3, Jun. 2006, pp. 259-263, Abstract only.
J. European Ceramic Society 31 (2011) 2073-2081, Abstract only.
Riemer, Dietrich E., "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.
Morgan, P. et al., "Ceramic Composites of Monazite and Alumina," J. Am. Ceram. Soc., 78, 1995, 1553-63.
Riemer, Dietrich E., "Analytical Engineering Model of the Screen Printing Process: Part I," Solid State Technology, Aug. 1988, pp. 107-111.
WINTER Catalogue No. 5, Dressing tools, WINTER diamond tools for dressing grinding wheels, Edition Year: 2010, 140 pages.
Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.
3M Cubitron II Abrasive Belts Brochure, Shaping the Future, Jan. 2011, 6 pages.
Vanstrum et al., Precisely Shaped Grain (PSG): 3M's Innovation in Abrasive Grain Technology, date unknown, 1 page.
Graf, "Cubitron II: Precision-Shaped Grain (PSG) Turns the Concept of Gear Grinding Upside Down," gearsolutions.com, May 2014, pp. 36-44.
DOW Machine Tool Accessories, Grinding & Surface Finishing, www.1mta.com, Nov. 2014, 72 pages.
VSM Actirox Fibre Discs, The Latest Generation of Abrasives for Maximum Stock Removal [PDF] VSM Abrasives Ltd., Apr. 2019 [retrieved on May 15, 2019], 8 pages. Retrieved from https://uk.vsmabrasives.com/fileadmin/user_upload/ACTIROX/VSM-ACTIROX-EN.pdf.
Kumar et al., "Composites by rapid prototyping technology", Material & Design, Feb. 2010, vol. 31, Issue 2, pp. 850-856.
Lewis et al., "Direct Ink Writing of Three-Dimensional Ceramic Structures", Journal of the American Ceramic Society, US, Nov. 30, 2006, vol. 89, Issue 12, pp. 3599-3609.
International Search Report with regard to International application no. PCT/US2017/031998, dated Aug. 21, 2017.
International Search Report with regard to International application no. PCT/US2017/031992, dated Aug. 21, 2017.
International Search Report and Written Opinion for Application No. PCT/US2016/036701, dated Sep. 1, 2016, 12 pages.
Brewer, L. et al., Journal of Materials Research, 1999, vol. 14, No. 10, pp. 3907-3912, Abstract only.
Lewis et al., "Direct Ink Writing of 3D Functional Materials", Advanced Functional Materials, 2006, 16, pp. 2193-2204.
International Search Report and Written Opinion for Application No. PCT/US2020/066817, mailed Apr. 15, 2021, 11 pages.
International Search Report and Written Opinion for Application No. PCT/US2014/058378, mailed Jan. 29, 2015, 18 pages.
International Search Report and Written Opinion for Application No. PCT/US2015/025825) mailed Jul. 16, 2015, 13 pages.
International Search Report and Written Opinion for PCT/US2022/082598 dated May 2, 2023, 11 pages.
Rowenhorst 3D scans, Nov. 22, 1994, 30 pages.
International Search Report and Written Opinion for PCT/US2020/066801 dated Apr. 2, 2021, 9 pages.
International Search Report and Written Opinion for PCT/US2015/000190 dated Dec. 23, 2015, 13 pages.
International Search Report and Written Opinion for PCT/US2023/086306 dated Apr. 25, 2024, 12 pages.

* cited by examiner

FIG. 10A      FIG. 10B

ABRASIVE ARTICLES AND METHODS OF FORMING SAME

CROSS-REFERENCE TO RELATED APPLICATION(S)

This application claims priority under 35 U.S.C. § 119 (e) to U.S. Provisional Patent Application No. 63/266,268, filed Dec. 30, 2021, by Anthony Martone et al., entitled "ABRASIVE ARTICLES AND METHODS OF FORMING SAME," which is assigned to the current assignee hereof and incorporated herein by reference in its entirety for all purposes.

BACKGROUND

Field of the Disclosure

The following is directed to abrasive articles, and in particular, coated abrasive articles and methods of forming coated abrasive articles.

SUMMARY

According to one aspect, an abrasive article includes a backing layer including a front fill layer overlying the backing; a make coat overlying the backing layer; and a plurality of abrasive particles overlying the backing layer wherein at least 65% of the abrasive particles have a well-oriented tilt orientation.

BRIEF DESCRIPTION OF THE DRAWINGS

The present disclosure may be better understood, and its numerous features and advantages made apparent to those skilled in the art by referencing the accompanying drawings.

The present disclosure may be better understood, and its numerous features and advantages made apparent to those skilled in the art by referencing the accompanying drawings.

FIG. 10A includes an image of a coated abrasive article edited for front fill measurements.

FIG. 10B includes an image of a coated abrasive article according to an embodiment edited for front fill measurements.

DETAILED DESCRIPTION

The following is directed to methods of forming abrasive articles, such as fixed abrasive articles, and more particularly coated abrasive articles. The abrasive articles may be used in a variety of material removal operations for a variety of work pieces.

Figure 1:
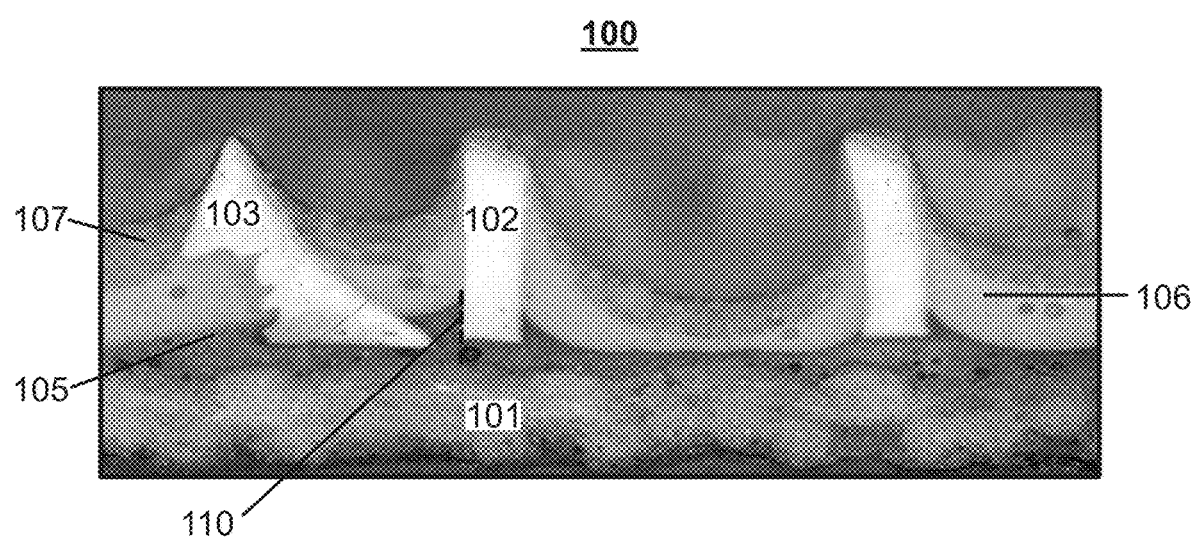
FIG. 1 includes a cross sectional image of a section of an abrasive article according to an embodiment.

FIG. 1 includes an image of a coated abrasive article 100 according to an embodiment. As shown in FIG. 1, the coated abrasive article 100 can include a backing layer 101. The backing layer 101 can include a front fill. The coated abrasive article 100 can also include an adhesive layer such as make coat 105 overlying the backing layer. The coated abrasive article 100 can further include a plurality of abrasive particles 102 and 103. The coated abrasive article can also include a size coat 106 and a super size coat 107. The make coat 105 can have an average thickness Ta. The make coat 105 can also include an average thickness at the sides of the abrasive particles, Tg. An example make coat thickness at the side of the abrasive particles can be seen as dotted line 110 in FIG. 1.

In an embodiment, the front fill can comprise a particular material that may facilitate improved manufacturing or performance of the abrasive article. In an embodiment, the front fill can include calcium carbonate.

In an embodiment, the front fill can have a particular viscosity that may facilitate improved manufacturing or performance of the abrasive article. In an embodiment, the viscosity can be at least 700 cps or at least 800 cps or at least 900 cps or at least 1000 cps or at least 1100 cps or at least 1200 cps or at least 1300 cps or at least 1400 cps. In an embodiment, the viscosity can be no greater than 2500 cps or no greater than 2000 cps or no greater than 1900 cps or no greater than 1800 cps or no greater than 1700 cps or no greater than 1600. It will be appreciated that the front fill viscosity can be between any of the above mentioned minimum and maximum values notes above, including for example, but not limited to, at least 700 cps and not greater than 2500 cps or at least 1000 cps and not greater than 2000 cps.

In an embodiment, the make coat can comprise a particular material that may facilitate improved manufacturing or performance of the abrasive article. In an embodiment, the make coat can include wollastonite, PF resin, water, or a combination thereof.

In an embodiment, the make coat can have a particular viscosity that may facilitate improved manufacturing or performance of the abrasive article. In an embodiment, the viscosity can be at least 3500 cps or at least 3750 cps or at least 4000 cps or at least 4250 cps or at least 4500 cps or at least 4750 cps or at least 5000 cps or at least 5250 cps. In an embodiment, the viscosity can be no greater than 7000 cps or no greater than 6750 cps or no greater than 6500 cps or no greater than 6250 cps or no greater than 6000 cps or no greater than 5750. It will be appreciated that the make coat viscosity can be between any of the above mentioned minimum and maximum values notes above, including for example, but not limited to, at least 3500 cps and not greater than 7000 cps or at least 5000 cps and not greater than 6000 cps.

In an embodiment, the backing can include a particular material that may facilitate improved performance and/or manufacturing of the abrasive article. In an embodiment, the backing can include an inorganic material, an organic material, a naturally-occurring material, a woven material, a non-woven material, a polyester, a polyurethane, a polypropylene, a polyimide, a paper, a metal, a metal alloy, or any combination thereof.

In an embodiment, the backing can have a particular backing deviation that may facilitate improved performance and/or manufacturing of the abrasive article. Backing deviation can be measured according to the process described in the examples section below. In an embodiment, the backing deviation can be not greater than 1 mm or not greater than 800 microns or not greater than 600 microns or not greater than 500 microns or not greater than 400 microns or not greater than 300 microns or not greater than 250 microns or not greater than 225 microns or not greater than 200 microns or not greater than 190 microns or not greater than 180 microns or not greater than 175 microns or not greater than 170 microns or not greater than 165 microns or not greater than 160 microns. In an embodiment, the backing deviation can be at least 10 microns or at least 25 microns or at least 50 microns or at least 75 microns or at least 100 microns or at least 110 microns or at least 120 microns or at least 130 microns or at least 140 microns or at least 150 microns. It will be appreciated that the backing deviation can be between any of the minimum and maximum values noted above, including, for example, but not limited to, at least 50 microns, and no greater than 800 microns, or at least 100 microns and no greater than 300 microns.

In an embodiment, the front fill can have a front fill roughness that may facilitate improved performance and/or manufacturing of the abrasive article. In an embodiment, the front fill roughness can be not greater than 95 microns or not greater than 92 microns or not greater than 90 microns or not greater than 87 microns or not greater than 85 microns or not greater than 82 microns or not greater than 80 microns or not greater than 77 microns or not greater than 75 microns or not greater than 72 microns or not greater than 70 microns or not greater than 67 microns or not greater than 65 microns or not greater than 62 microns or not greater than 60 microns or not greater than 57 microns or not greater than 55 microns or not greater than 52 microns or not greater than 50 microns or not greater than 47 microns or not greater than 45 microns or not greater than 42 microns or not greater than 40 microns or not greater than 37 microns or not greater than 35 microns or not greater than 32 microns or not greater than 30 microns. In an embodiment, the front fill roughness can be at least 1 micron or at least 2 microns or at least 5 microns or at least 7 microns or at least 10 microns or at least 12 microns or at least 15 microns or at least 17 microns or at least 20 microns or at least 22 microns or at least 25 microns or at least 27 microns or at least 30 microns. It will be appreciated that the front fill roughness can be between any of the minimum and maximum values noted above, including, for example, but not limited to, at least 2 microns, and no greater than 77 microns, or at least 15 microns and no greater than 72 microns.

In an embodiment, the front fill can have an average thickness that may facilitate improved performance and/or manufacturing of the abrasive article. Front fill thickness can be measured according to the process described in the examples section below. In an embodiment, the average thickness of the front fill can be at least 20 microns or at least 25 microns or at least 30 microns or at least 35 microns or at least 40 microns or at least 45 microns or at least 50 microns or at least 55 microns or at least 60 microns or at least 65 microns or at least 70 microns or at least 75 microns or at least 80 microns or at least 85 microns or at least 90 microns or at least 95 microns or at least 100 microns. In an embodiment, the average thickness of the front fill can be not greater than 1 mm or not greater than 900 microns or not greater than 800 microns or not greater than 700 microns or not greater than 600 microns or not greater than 500 microns or not greater than 400 microns or not greater than 300 microns or not greater than 200 microns or not greater than 175 microns or not greater than 150 microns or not greater than 125 microns. It will be appreciated that the average front fill thickness can be between any of the minimum and maximum values noted above, including, for example, but not limited to, at least 25 microns, and no greater than 7700 microns, or at least 1545 microns and no greater than 800 microns.

In an embodiment, the abrasive article can have a certain ratio of average front fill thickness/surface roughness that may facilitate improved manufacturing and/or performance of the abrasive article. In an embodiment, the average thickness/roughness ratio can be at least 0.85 or at least 0.90 or at least 0.95 or at least 1.00 or at least 1.05 or at least 1.10 or at least 1.15 or at least 1.20 or at least 1.25 or at least 1.30 or at least 1.35 or at least 1.40 or at least 1.45 or at least 1.50 or at least 1.55 or at least 1.60 or at least 1.65 or at least 1.70 or at least 1.75 or at least 1.80 or at least 1.85 or at least 1.90 or at least 1.95 or at least 2.00 or at least 2.10 or at least 2.20 or at least 2.30 or at least 2.40 or at least 2.50 or at least 2.60 or at least 2.70 or at least 2.80 or at least 2.90 or at least 3.00 or at least 3.50 or at least 4.00 or at least 4.50 or at least 5.00. In an embodiment, the average thickness/roughness ratio cannot be greater than 15 or not greater 12 or not greater than 10 or not greater than 9 or not greater than 8 or not greater than 7 or not greater than 6 or not greater than 5 or not greater than 4 or not greater than 3. It will be appreciated that the average thickness/roughness ratio can be between any of the minimum and maximum values noted above, including, for example, at least 0.85, and no greater than 10, or at least 1.10 and no greater than 7.

Figure 10C:
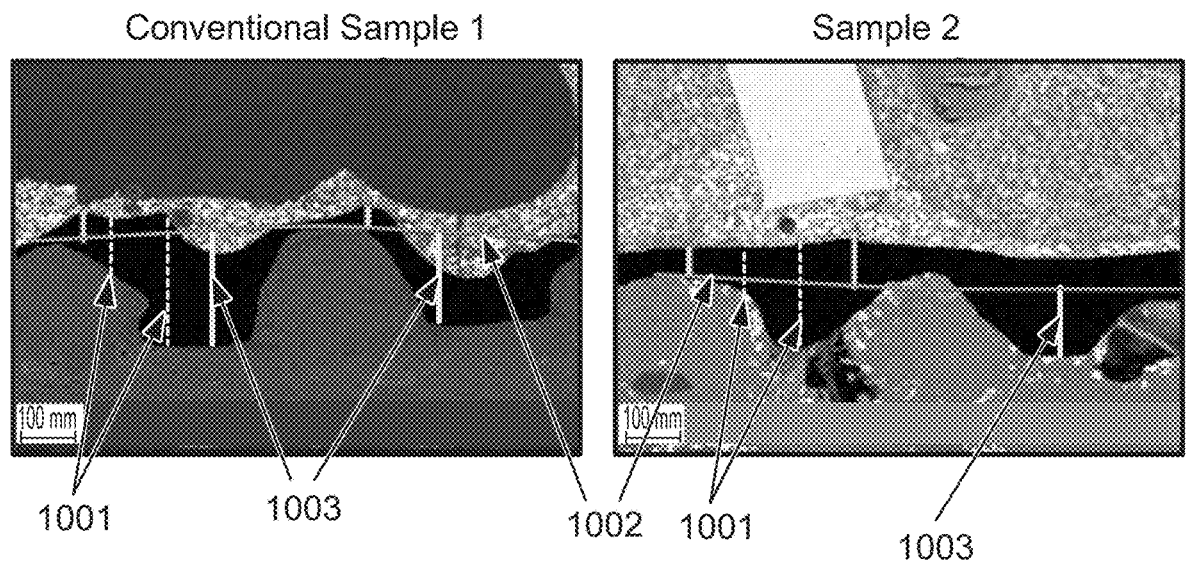
FIG. 10C includes an image of a coated abrasive article edited for front fill measurements.
Figure 10C:
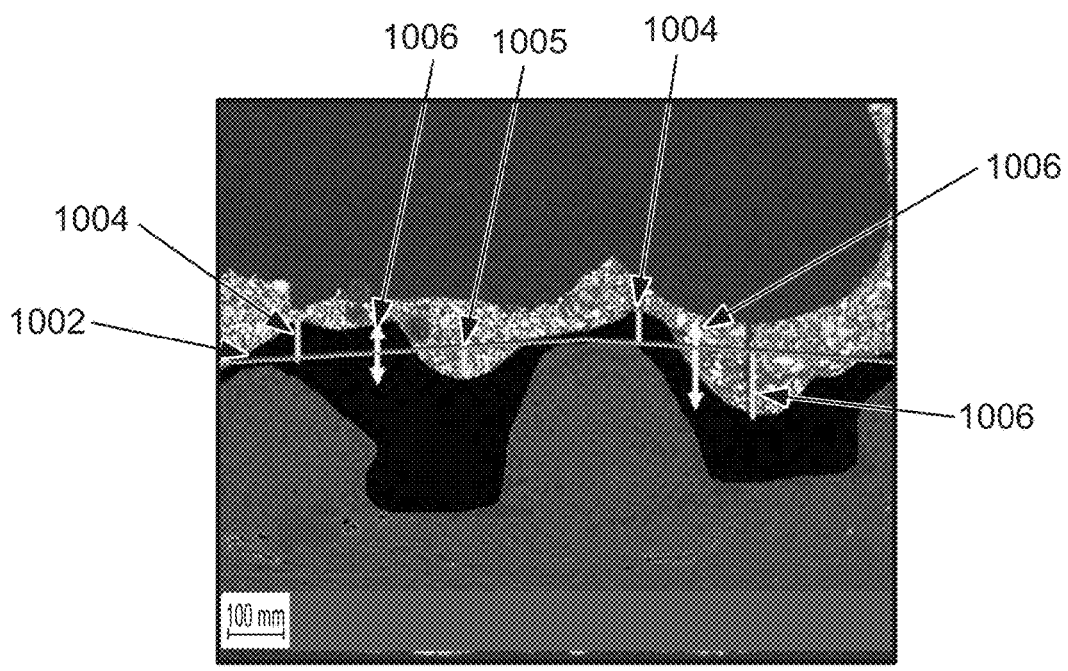
Figure 11:
FIG. 11 includes an image of an abrasive article with a colored make layer.

Average make coat thickness can be measured according to the following procedure. Abrasive articles are cut through the middle to reveal a cross-section. The articles are then cut into 2-inch segments and mounted on an epoxy puck. Two 2-inch segments are then imaged, and the make layer is identified by coloring in the layer using the imaging software. FIG. 10 includes an example image of an abrasive article including a colored make layer. Image analysis is used to overlay vertical gridlines, and the line segments overlapping the make layer are identified and isolated. Each line segment corresponds to a make coat thickness measurement. The average of all segments is taken. Approximately 150-200 overlapping line segments were made per two-inch sample segment, resulting in over 300 measurements for each sample.

Average make coat thickness near standing grains can be measured according to the following procedure. The same cross-sectional images for average make coat thickness can also be used for average make coat thickness near standing grains. Only standing grains showing their cross-sectional rectangular area with their short side in contact with the make coat are considered. For example, in FIG. 1, grain 102 would be considered but grain 103 would not. Additionally, only isolated grains were considered. Standing grains in contact with another grain were not considered for average make coat thickness near standing grains measurements. Measurements were made from the highest point of make contacting the grain side down to the lowest point of make contacting the backing on both sides of grain. The line of measurement is made perpendicular to the backing plane.

Front fill thickness, front fill roughness, and backing deviation are measured according to the following procedures. Abrasive articles are cross-sectioned and mounted to a puck and imaged using SEM. 10 images of width 1000-1200 nm are taken and analyzed for measurements according to the methods below. Example images with colored front fill for front fill thickness and backing deviation measurements can be seen in FIGS. 10A and 10B. An example image with colored front fill for front fill roughness measurements can be seen in FIG. 10C.

Front fill thickness is measured using methods similar to those described above for make thickness. ImageJ software is used to identify and color the front fill as shown in FIG. 10. Image analysis is used to overlay vertical gridlines, and the line segments overlapping the front fill were identified and isolated. Each line segment corresponds to a front fill thickness measurement. About 50 measurements per image were taken. Lines 1001 are exemplary front fill measurements. The average of all segments for each sample is calculated.

Backing deviation is measured according to the following process using the same images as front fill thickness. An imaginary line 1002 is drawn across the tops of the backing fibers. Lines corresponding to backing deviation measurements 1003 are drawn from line 1002 to the bottom of the "valleys" in the backing. The average of all measurements for each sample is taken.

Front fill roughness is measured according to the following process using the same images as front fill thickness and backing deviation. An imaginary line 1002 is drawn across the tops of the backing fibers. The greatest height of front fill 1004 above each backing "peak" is measured from imaginary line 1002. The lowest height of front fill 1005 in each backing "valley" is measured from imaginary line 1002. The difference 1006 between measurements 1004 and 1005 is calculated and recorded as the front fill roughness. The average of all measurements for each sample was taken.

In an embodiment, the coated abrasive article can have a make coat of a particular average thickness that may facilitate improved performance and/or manufacturing of the abrasive article. In an embodiment, the average thickness of the make coat, Ta, can be at least 50 microns or at least 60 microns or at least 70 microns or at least 80 microns or at least 90 microns or at least 100 microns or at least 110 microns or at least 120 microns or at least 130 microns or at least 140 microns or at least 150 microns or at least 160 microns. In another embodiment, the average thickness of the make coat, Ta, can be not greater than not greater than 1 mm or not greater than 800 microns or not greater than 700 microns or not greater than 600 microns or not greater than 500 microns or not greater than 400 microns or not greater than 300 microns or not greater than 275 microns or not greater than 250 microns or not greater than 225 microns or not greater than 200 microns. It will be appreciated that Ta can be between any of the minimum and maximum values noted above, including, for example, but not limited to, at least 50 microns, and no greater than 800 microns, or at least 80 microns and no greater than 300 microns.

In an embodiment, the coated abrasive article can have a make coat of a particular average thickness at the sides of the abrasive particles, Tg, that may facilitate improved performance and/or manufacturing of the abrasive article. In an embodiment, Tg can be at least 50 microns or at least 60 microns or at least 70 microns or at least 80 microns or at least 90 microns or at least 100 microns or at least 110 microns or at least 120 microns or at least 130 microns or at least 140 microns or at least 150 microns. In another embodiment, Tg can be not greater than 1 mm or not greater than 800 microns or not greater than 700 microns or not greater than 600 microns or not greater than 500 microns or not greater than 400 microns or not greater than 300 microns. It will be appreciated that Tg can be between any of the minimum and maximum values noted above, including, for example, but not limited to, at least 50 microns, and no greater than 800 microns, or at least 80 microns and no greater than 300 microns.

In an embodiment, the coated abrasive article can have a make coat of a particular thickness standard deviation at the sides of the abrasive particles, STDT, that may facilitate improved performance and/or manufacturing of the abrasive article. In an embodiment, STDT can be at least 1 micron or at least 2 microns or at least 3 microns or at least 4 microns or at least 5 microns or at least 7 microns or at least 10 microns or at least 12 microns or at least 15 microns or at least 18 microns or at least 20 microns or at least 22 microns or at least 25 microns or at least 28 microns or at least 30 microns. In another embodiment, STDT can be not greater than 100 microns or not greater than 90 microns or not greater than 85 microns or not greater than 80 microns or not greater than 75 microns or not greater than 70 microns or not greater than 65 microns or not greater than 60 microns or not greater than 55 microns or not greater than 50 microns or not greater than 45 microns or not greater than 40 microns or not greater than 35 microns or not greater than 30 microns or not greater than 25 microns or not greater than 20 microns or not greater than 15 microns or not greater than 10 microns. It will be appreciated that STDT can be between any of the minimum and maximum values noted above, including, for example, but not limited to, at least 5 microns, and no greater than 100 microns, or at least 10 microns and no greater than 45 microns.

In an embodiment, the coated abrasive article can have a make coat of a particular thickness standard deviation at the sides of the abrasive particles, STDTg, that may facilitate improved performance and/or manufacturing of the abrasive article. In an embodiment STDTg can be at least 1 micron or at least 5 microns or at least 10 microns or at least 15 microns or at least 20 microns or at least 25 microns or at least 30 microns. In another embodiment, STDTg can be not greater than 100 microns or not greater than 90 microns or not greater than 85 microns or not greater than 80 microns or not greater than 75 microns or not greater than 70 microns or not greater than 65 microns or not greater than 60 microns or not greater than 55 microns or not greater than 50 microns or not greater than 45 microns or not greater than 40 microns or not greater than 35 microns or not greater than 30 microns. It will be appreciated that STDTg can be between any of the minimum and maximum values noted above, including, for example, but not limited to, at least 5 microns, and no greater than 100 microns, or at least 10 microns and no greater than 45 microns.

In an embodiment, the coated abrasive article can have a make coat of a particular thickness ratio, Tg/Ta, that may facilitate improved performance and/or manufacturing of the abrasive article. In an embodiment Tg/Ta can be not greater than 1.45 or not greater than 1.43 or not greater than 1.40 or not greater than 1.38 or not greater than 1.35 or not greater than 1.33 or not greater than 1.30 or not greater than 1.28 or not greater than 1.25 or not greater than 1.23 or not greater than 1.20 or not greater than 1.18 or not greater than 1.15 or not greater than 1.13 or not greater than 1.10 or not greater than 1.08 or not greater than 1.05 or not greater than 1.03. In another embodiment, Tg/Ta can be at least 0.70 or at least 0.80 or at least 0.90 or at least 0.98 or at least 1.00 or at least 1.03 or at least 1.05 or at least 1.08. It will be appreciated that Tg/Ta can be between any of the minimum and maximum values noted above, including, for example, but not limited to, at least 0.8, and no greater than 1.45, or at least 0.98 and no greater than 1.20.

Figure 2A:
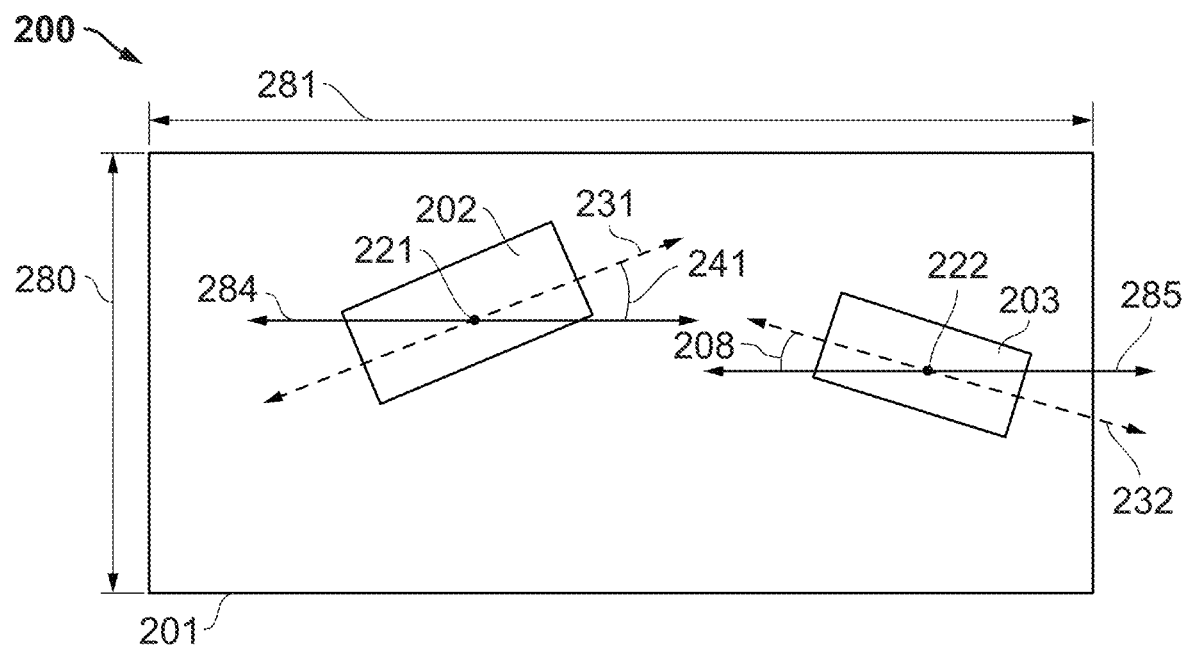
FIG. 2A includes a top-view illustration of a portion of a coated abrasive article according to an embodiment.
Figure 2B:
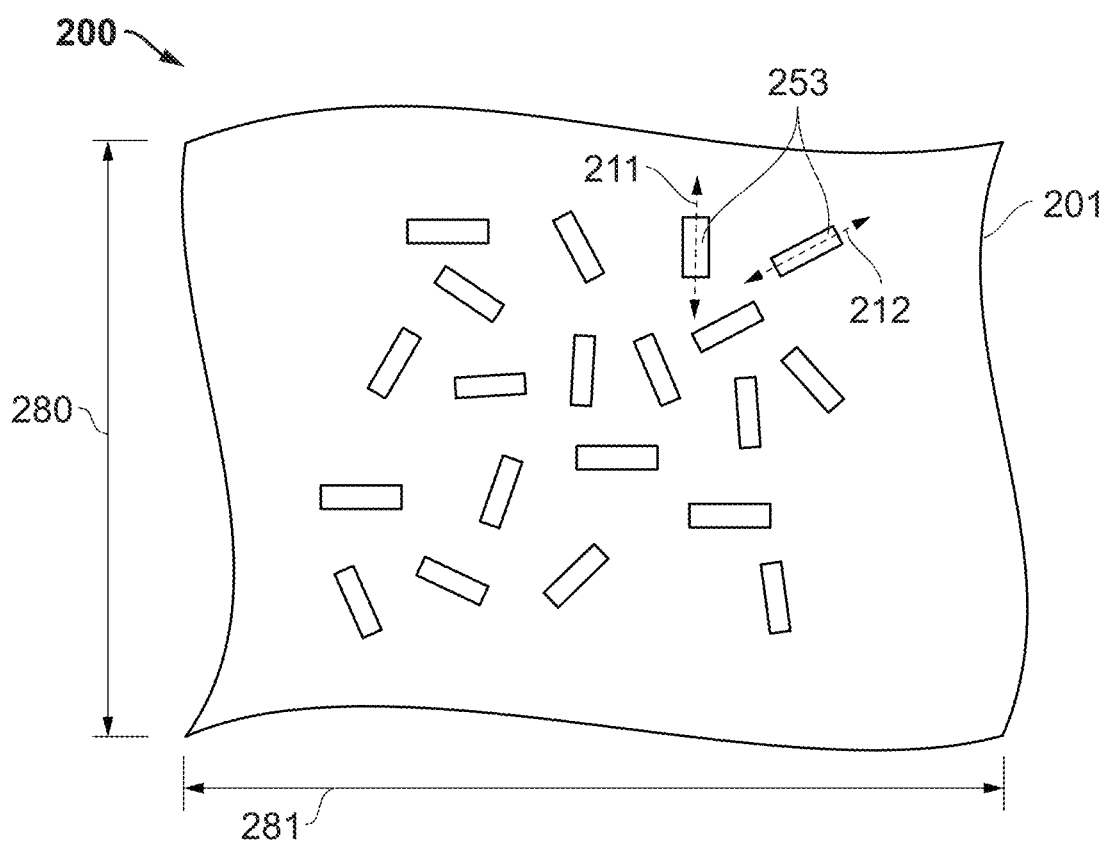
FIG. 2B includes a top-view illustration of a portion of a coated abrasive article according to an embodiment.

FIG. 2A includes an illustration of a portion of a coated abrasive article 200 according to an embodiment. As shown in FIG. 2, the coated abrasive article 200 can include a backing 201 having a longitudinal axis 280 and a lateral axis 281. The abrasive article 200 can include a backing 201 having a major surface and an abrasive layer forming an abrasive surface overlying the major surface of the backing. The abrasive layer can form a single layer of abrasive particles 202 and 203 adhered to the major surface of the backing. FIG. 2B also includes an illustration of a portion of a coated abrasive with abrasive particles 202 and 203.

In an embodiment, the abrasive particles may have a random rotational orientation relative to each other. The randomness of the rotational orientation is evaluated by creating a histogram or distribution of measured orientations from randomly sampled areas from a given abrasive article. The process for measuring the rotational orientation of particles on a substrate is started by obtaining a coated abrasive sample that does not include overlying layers on the particles or cleaning the coated abrasive sample to expose the particles, such that the particles are clearly visible. If a coated abrasive article includes layers overlying the particles (e.g., size coat, supersize coat, etc.) a gentle sandblasting operation can be conducted to selectively remove the overlying layers and expose the underlying abrasive particles. Care should be taken during the sandblasting operation to ensure that the particles are not damaged or moved. The selective removal operation may be conducted in stages to ensure that only the overlying layers are removed but the underlying particles are not damaged or altered.

Figure 3:
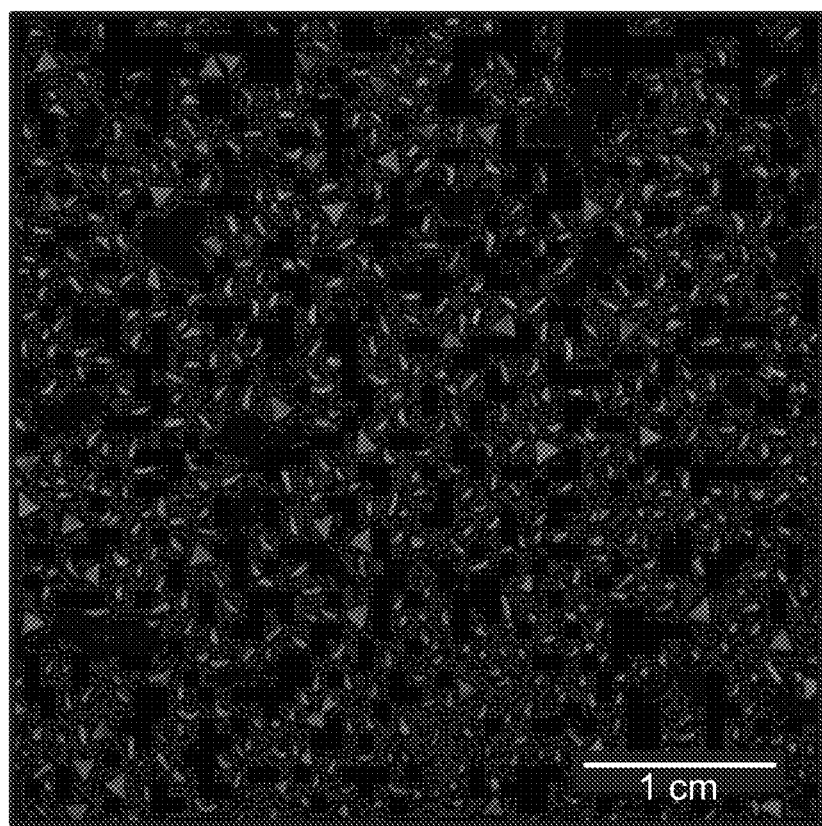
FIG. 3 includes an exemplary image of a portion of an abrasive article having abrasive particles in a random orientation.

After obtaining a sample with the particles exposed, at least two randomly selected regions of the sample are imaged using a suitable device, such as a Cannon Powershot S110 camera with a resolution of 338 pixels/cm. From these images, the location and orientation of each particle relative to the edge of the sample are cataloged using MATLAB image analysis software. The orientation of the particle is based on the angle of the major axis of the abrasive particles as viewed top-down relative to an edge of the coated abrasive. The same axis should be used to evaluate all sample images. The orientation of each particle is defined by an orientation angle between -90 degrees and +90 degrees. The orientation angles are then plotted in a plot of orientation angle (x-axis) versus frequency (y-axis) to create a histogram of the orientation angles. If the histogram has an essentially flat profile, such that the frequency for any given orientation angle is nearly the same as the frequency for any other orientation angle, the histogram demonstrates that the particles generally have no primary orientation mode, and therefore, the particles have a random orientation. FIG. 3 includes an exemplary image of a portion of an abrasive article having abrasive particles in a random orientation.

It should be noted that while certain embodiments herein can have particles arranged in a random orientation, other embodiments may include particles arranged in a non-random or controlled distribution.

According to one embodiment, an abrasive particle 202 can be overlying the backing 201 in a first position having a first rotational orientation relative to a lateral axis 281 defining the width of the backing 201 and perpendicular to a longitudinal axis 280. In particular, the abrasive particle 202 can have a predetermined rotational orientation defined by a first rotational angle between a lateral axis 284 parallel to the lateral axis 281 and a dimension of the abrasive particle 202. Notably, reference herein to a dimension can be a reference to a bisecting axis 231 of the abrasive particle 202 extending through a center point 221 of the abrasive particle 202 as viewed top-down. Moreover, the predetermined rotational orientation can be defined as the smallest angle 241 with the lateral axis 284 extending through the center point 221. As illustrated in FIG. 2A, the abrasive particle 202 can have a predetermined rotational angle defined as the smallest angle 241 between the bisecting axis 231 and the lateral axis 284, wherein the lateral axis is parallel to the lateral axis 281. It will be appreciated that the lateral axis 281 may also be a radial axis where the backing 201 has a circular or elliptical shape. In accordance with an embodiment, the angle 241 defining the rotational orientation of the abrasive particle 202 relative to the lateral axis 284 can be any value within a range between at least 0 degrees and not greater than 90 degrees.

As further illustrated in FIG. 2A, the abrasive particle 203 can be at a second position overlying the backing 201 and having a predetermined rotational orientation. Notably, the predetermined rotational orientation of the abrasive particle 203 can be characterized as the smallest angle between the lateral axis 285 parallel to the lateral axis 281 of the backing and a bisecting axis 232 of the abrasive particle 203 extending through a center point 222 of the abrasive particle 203. In accordance with an embodiment, the rotational angle 208 can be any value within a range of at least 0 degrees to 90 degrees.

In accordance with an embodiment, the abrasive particle 202 can have a predetermined rotational orientation as defined by the rotational angle 241 that is different than the predetermined rotational orientation of the abrasive particle 203 as defined by the rotational angle 208. In particular, the difference between the rotational angle 241 and rotational angle 208 for the abrasive particles 202 and 203 can define a predetermined rotational orientation difference. In particular instances, the predetermined rotational orientation difference can be any value within a range of at least 0 degrees and not greater than 90 degrees.

FIG. 2B includes a top-view illustration of a portion of a coated abrasive article according to an embodiment. As illustrated, the abrasive article 200 can include a plurality of abrasive particles arranged at different positions on the backing 201, wherein the abrasive particles 253 define a random distribution of the particles on the backing. Moreover, the abrasive particles 253 have a random rotational orientation with respect to each other, such that the rotational orientation of the abrasive particles 253 varies from particle-to-particle in a random manner. According to one aspect, the random rotational orientation of the abrasive particles is such that the rotational angle of one abrasive particle in the group cannot be used to predict the rotational orientation of any of the immediately adjacent particles. Thus, a group of abrasive particles having a random rotational orientation lack any short-range (i.e., immediately adjacent) or long-range order with respect to their rotational angles. It will be appreciated that any particles attached to the backing using the systems and processes of the embodiments herein can have a random rotational orientation with respect to each other.

The coated abrasive articles of the embodiments herein can have at least a majority of the total content (weight or number) of abrasive particles having a random rotational orientation on the backing. In still other instances, at least 10% of the total number of shaped abrasive particles or at least 20% or at least 30% or at least 40% or at least 50% or at least 60% or at least 70% or at least 80% or at least 90% or essentially all of the shaped abrasive particles have a random rotational orientation. In one embodiment, all of the abrasive particles on the backing have a random rotational orientation.

Figure 4A:
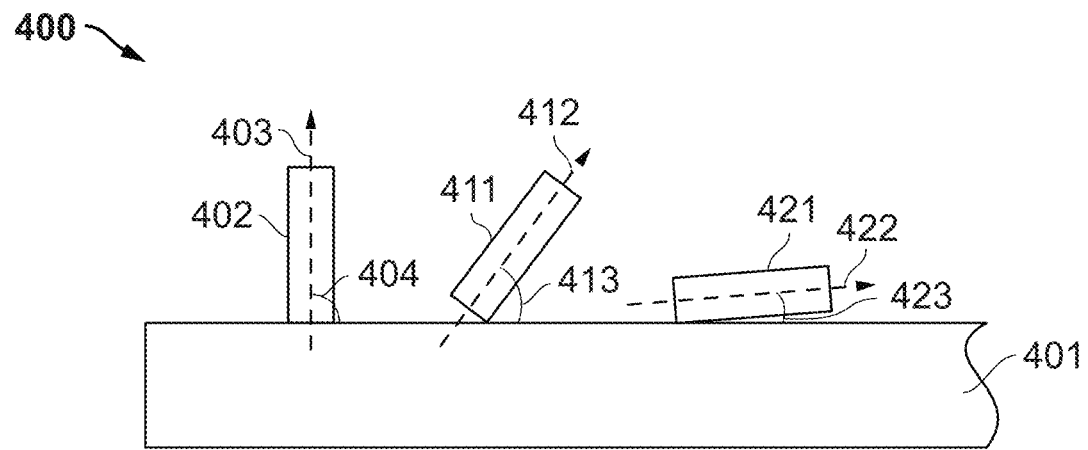
FIG. 4A includes a side-view illustration of abrasive particles on a backing according to an embodiment.
Figure 4B:
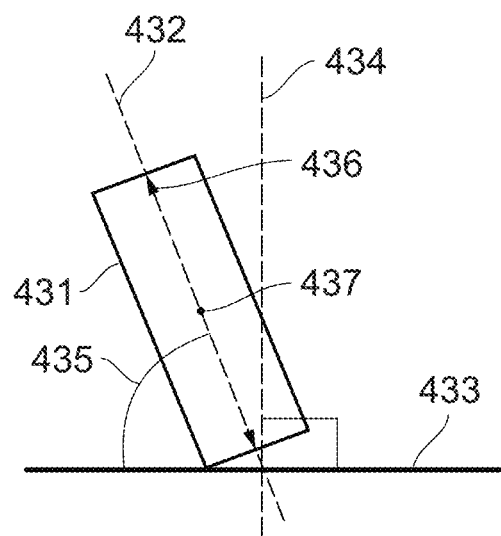
FIG. 4B includes a side-view illustration of a particle on a backing having a tilt angle according to an embodiment.

FIG. 4A includes a side-view illustration of abrasive particles on a backing according to an embodiment. The methods disclosed in the embodiments herein can facilitate the formation of coated abrasive articles having a particular distribution and orientation of abrasive particles. Notably, without wishing to be tied to a particular theory, it is noted that the projection rate and efficiency of the process disclosed herein may facilitate improved control of the tilt angle of the abrasive particles adhered to the backing. To better understand these features, FIG. 4A provides a side-view illustration of three abrasive particles in various orientations. It will be appreciated that the coated abrasive articles of the embodiments herein can have various contents of particles in the depicted orientations as described in more detail herein. The first particle 402 can have a particle axis 403 extending at a particular tilt angle 404 relative to the surface of the backing 401. The particle axis 403 can be parallel to the longitudinal axis of the first particle 402 that defines the length of the first particle 402. The first particle 402 is representative of a particle in a standing orientation having a tilt angle 404 within a range of greater than 65 degrees to 90 degrees. The second particle 411 can have a particle axis 412 extending at a particular tilt angle 413 relative to the surface of the backing 401. The particle axis 412 can be parallel to a longitudinal axis of the second particle 411 that defines the length of the second particle 411. The second particle 411 is representative of a particle in a slanted orientation having a tilt angle 413 within a range of greater than 5 degrees to 65 degrees. The third particle 421 can have a particle axis 422 extending at a particular tilt angle 423 relative to the surface of the backing 401. The particle axis 422 can be parallel to a longitudinal axis of the third particle 421 that defines the length of the third particle 421. The third particle 421 is representative of a particle in a flat orientation having a tilt angle 423 within a range of 0 degrees to not greater than 5 degrees (i.e., not greater than 5 degrees). FIG. 4B includes a side-view illustration of a particle on a backing having a particular tilt angle according to an embodiment. As illustrated, the particle 431 can be a shaped abrasive particle as described in embodiments herein. The particle 431 can have a longitudinal axis 436 as defined later in this application. The backing 433 can define a substantially planar surface and have an axis 434 extending normal to the substantially planar surface of the backing 433. The tilt angle 435 is the smallest angle between the planar surface of the backing 433 and an axis 432, which extends parallel to the longitudinal axis 436 of the particle 431. Certain particles can have longitudinal axes along various surfaces, which may result in different tilt angles. In such instances, the axis defining the largest angle is the tilt angle.

Figure 4C:
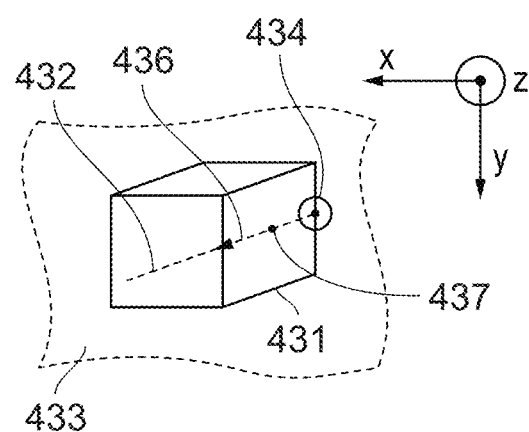
FIG. 4C includes a top-down illustration of the particle of FIG. 4B.

FIG. 4C includes a top-down illustration of the particle of FIG. 4B. In certain instances, a top-down view may provide a suitable vantage for identifying the direction of the tilt and thus can be suitable for measuring the tilt angle.

Figure 4D:
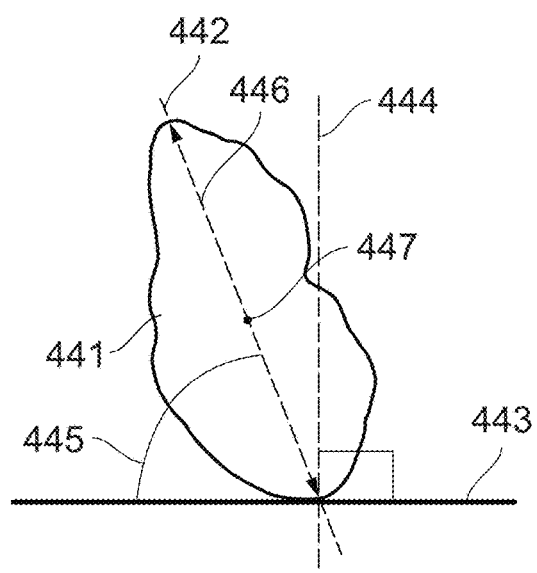
FIG. 4D includes a side-view illustration of a particle on a backing having a tilt angle according to an embodiment.

FIG. 4D includes a side-view illustration of a particle on a backing having a particular tilt angle according to an embodiment. As illustrated, the particle 441 can have a longitudinal axis 446 as defined later in this application. The particle 441 can be an abrasive particle, and more particularly, can be a non-shaped abrasive particle. The backing 443 can define a substantially planar surface and have an axis 444 extending normal to the substantially planar surface of the backing 443. The tilt angle 445 can be the smallest angle between an axis 442, which extends parallel to the longitudinal axis 446 and the surface of the backing 443. It will be appreciated that certain particles, such as equiaxed particles, will not have a tilt angle.

Figure 4E:
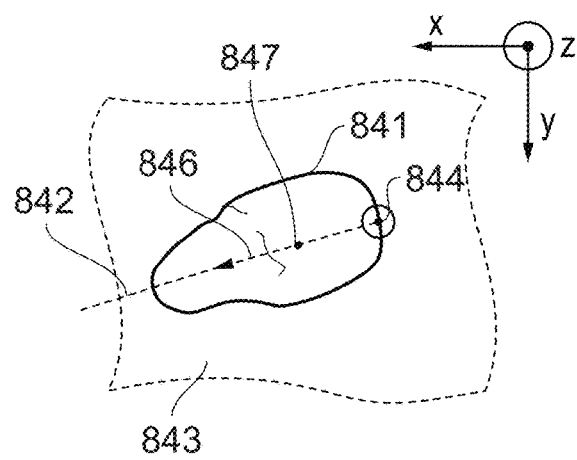
FIG. 4E includes a top-down illustration of the particle of FIG. 4D.

FIG. 4E includes a top-down illustration of the particle of FIG. 4D. The top-down view may be used to evaluate the tilt angle of the particle. As depicted, the top-down view may be the best view for evaluating the tilt angle as a side-view may not necessarily ensure the smallest angle is identified. A combination of top-down and side-view illustrations may be suitable for identifying and evaluating the tilt angle 445.

In one aspect, a coated abrasive article may include a plurality of abrasive particles, wherein the tilt angle of the abrasive particles is controlled, which may facilitate improved performance of the coated abrasive. For example, at least a portion of the shaped abrasive particles have a tilt angle greater than 45 degrees. In further aspects, a portion includes at least 10% of the total number of shaped abrasive particles or at least 20% or at least 30% or at least 40% or at least 50% or at least 60% or at least 70% or at least 80% or at least 90% or essentially all of the shaped abrasive particles have a tilt angle greater than 45 degrees.

In an embodiment, the coated abrasive article may have a particular percentage of standing particles that may facilitate improved performance and/or manufacturing of the abrasive article. Standing particles can be defined as particles having a tilt angle of 65 to 90 degrees In an embodiment, the standing abrasive particles can include at least 10% of the total number of the abrasive particles or at least 20% or at least 30% or at least 40% or at least 50% or at least 55% or at least 57% or at least 60% or at least 62% or at least 65% or at least 67% or at least 70% or at least 72% or at least 75% or at least 77% or at least 80% or at least 82% or at least 85% or at least 87% or at least 90% of the total number of the abrasive particles. In another embodiment, the standing abrasive particles can include not greater than 99.9% of the total number of the abrasive particles or not greater than 99% or not greater than 98% or not greater than 97% or not greater than 96% or not greater than 95% of the total number of the abrasive particles. It will be appreciated that the percentage of standing particles can be between any of the minimum and maximum values noted above, including, for example, but not limited to, at least 20% and not greater than 99% or at least 50% and not greater than 95%.

In an embodiment, the coated abrasive article may have a particular percentage of slanted particles that may facilitate improved performance and/or manufacturing of the abrasive article. Slanted particles can be defined as particles having a tilt angle of 5 to 65 degrees. In an embodiment, the slanted abrasive particles can include at least 1% of the total number of the abrasive particles or at least 2% or at least 3% or at least 4% or at least 5% or at least 6% or at least 7% or at least 8% or at least 9% or at least 10% or at least 11% or at least 12% or at least 13% or at least 14% or at least 15% or at least 16% or at least 17% or at least 18% or at least 20% or at least 25% of the total number of the abrasive particles. In another embodiment, the slanted abrasive particles can include not greater than 90% of the total number of the abrasive particles or not greater than 85% or not greater than 80% or not greater than 75% or not greater than 70% or not greater than 65% or not greater than 60% or not greater than 55% or not greater than 50% or not greater than 45% or not greater than 40% or not greater than 35% or not greater than 30% or not greater than 25% or not greater than 20% or not greater than 18% or not greater than 15% or not greater than 12% or not greater than 10% of the total number of the abrasive particles. It will be appreciated that the percentage of slanted particles can be between any of the minimum and maximum values noted above, including, for example, but not limited to, at least 5% and not greater than 80% or at least 15% and not greater than 35%.

In an embodiment, the coated abrasive article may have a particular percentage of well oriented particles that may facilitate improved performance and/or manufacturing of the abrasive article. Well oriented particles can be defined as particles having a tilt angle of 5 to 90 degrees and include slanted and standing particles. In an embodiment, the well oriented abrasive particles can include at least 60% of the total number of the abrasive particles or at least 62% or at least 65% or at least 67% or at least 70% or at least 72% or at least 75% or at least 77% or at least 80% or at least 82% or at least 85% or at least 87% or at least 90% or at least 92% or at least 95% of the total number of the abrasive particles. In another embodiment, the well oriented abrasive particles can not greater than 99.9% of the total number of the abrasive particles or not greater than 99% or not greater than 98% or not greater than 97% or not greater than 96% or not greater than 95%. It will be appreciated that the percentage of well oriented particles can be between any of the minimum and maximum values noted above, including, for example, but not limited to, at least 5% and not greater than 99% or at least 15% and not greater than 95%.

In an embodiment, the coated abrasive article may have a particular percentage of fallen particles that may facilitate improved performance and/or manufacturing of the abrasive article. Fallen particles can be defined as particles having a tilt angle of 0 to 5 degrees. In an embodiment, the fallen abrasive particles at least 0.1% of the total number of the abrasive particles or at least 0.2% or at least 0.4% or at least 0.6% or at least 0.8% or at least 1% or at least 1.5% or at least 2% or at least 2.5% or at least 3% or at least 3.5% or at least 4% or at least 4.5% or at least 5% or at least 6% or at least 7% or at least 8% or at least 9% or at least 10% of the total number of the abrasive particles. In another embodiment, the fallen abrasive particles can include not greater than 20% of the total number of the abrasive particles or not greater than 18% or not greater than 15% or not greater than 14% or not greater than 13% or not greater than 12% or not greater than 11% or not greater than 10% or not greater than 9% or not greater than 8% or not greater than 7% or not greater than 6% of the total number of the abrasive particles. It will be appreciated that the percentage of fallen particles can be between any of the minimum and maximum values noted above, including, for example, but not limited to, at least 0.2% and not greater than 15% or at least 1% and not greater than 9%.

In an embodiment, the coated abrasive article may have a particular percentage of inverted particles that may facilitate improved performance and/or manufacturing of the abrasive article Inverted particles can be defined as particles having a tilt angle of 5 to 90 degrees as well a tip, corner or point extending into the make coat, and a planar surface or surfaces such as a base, opposite the tip on the other end of the of the abrasive particle. Only particles having a tip on one end of its longitudinal axis and at least one planar surface on the opposite end of the longitudinal axis can be inverted. Exemplary particle shapes that can be in an inverted orientation include triangles, 3-PT stars, pentagons, and pyramids. Particles having planar surfaces on both ends of their longitudinal axis (e.g. rods or cylinders, rectangular prisms.) and particles having points on both ends of their longitudinal axis (e.g. toothpick shaped, diamond shaped, 4 point starts) cannot be in an inverted orientation. In an embodiment, the inverted abrasive particles at least 0.1% of the total number of the abrasive particles or at least 0.2% or at least 0.4% or at least 0.6% or at least 0.8% or at least 1% or at least 1.5% or at least 2% or at least 2.5% or at least 3% or at least 3.5% or at least 4% or at least 4.5% or at least 5% of the total number of the abrasive particles. In another embodiment, the inverted abrasive particles can include not greater than 20% of the total number of the abrasive particles or not greater than 18% or not greater than 15% or not greater than 12% or not greater than 10% or not greater than 9% or not greater than 8% or not greater than 7% or not greater than 6% or not greater than 5% of the total number of the abrasive particles. It will be appreciated that the percentage of inverted particles can be between any of the minimum and maximum values noted above, including, for example, but not limited to, at least 0.2% and not greater than 15% or at least 1% and not greater than 9%.

In an embodiment, the coated abrasive particle may have a particular ratio (Pst/Psl) of standing particles (Pst) to slanted particles (Psl) that may facilitate improved performance and/or manufacturing of the abrasive article. In an embodiment, Pst/Psl can be at least 1 or at least 1.2 or at least 1.4 or at least 1.6 or at least 1.8 or at least 2.0 or at least 2.2 or at least 2.4 or at least 2.6 or at least 2.8 or at least 3.0 or at least 3.5 or at least 4.0 or at least 4.5 or at least 5.0 or at least 5.5 or at least 6.0 or at least 6.5 or at least 7.0 or at least 7.5 or at least 8.0 or at least 8.5 or at least 9.0 or at least 10.0 or at least 11 or at least 12 or at least 13 or at least 14 or at least 15 or at least 16 or at least 17 or at least 18 or at least 19 or at least 20. In another embodiment, Pst/Psl can be not greater than 100 or not greater than 95 or not greater than 90 or not greater than 80 or not greater than 70 or not greater than 60 or not greater than 50 or not greater than 40 or not greater than 30 or not greater than 28 or not greater than 25 or not greater than 22 or not greater than 20 or not greater than 19 or not greater than 18 or not greater than 17 or not greater than 16 or not greater than 15 or not greater than 14 or not greater than 13 or not greater than 12 or not greater than 11 or not greater than 10. It will be appreciated that Pst/Psl can be between any of the minimum and maximum values noted above, including, for example, but not limited to, at least 1.2 and not greater than 95 or at least 2.0 and not greater than 40.

In an embodiment, the coated abrasive particle may have a particular ratio (Pst/Pf) of standing particles (Pst) to fallen particles (Pf) that may facilitate improved performance and/or manufacturing of the abrasive article. In an embodiment, Pst/Pf can be at least 2.0 or at least 2.2 or at least 2.4 or at least 2.6 or at least 2.8 or at least 3.0 or at least 3.2 or at least or at least 3.4 or at least 3.6 or at least 3.8 or at least 4.0 or at least 4.2 or at least 4.4 or at least 4.6 or at least 4.8 or at least 5.0 or at least 5.2 or at least 5.4 or at least 5.6 or at least 5.8 or at least 6.0 or at least 6.2 or at least 6.4 or at least 6.6 or at least 6.8 or at least 7.0 or at least 7.2 or at least 7.4 or at least 7.6 or at least 7.8 or at least 8.0. In another embodiment, Pst/Pf can be not greater than 1000 or not greater than 800 or not greater than 500 or not greater than 200 or not greater than 100 or not greater than 90 or not greater than 80 or not greater than 70 or not greater than or not greater than 60 or not greater than 50 or not greater than 40 or not greater than 30 or not greater than 20. It will be appreciated that Pst/Pf can be between any of the minimum and maximum values noted above, including, for example, but not limited to, at least 2.0 and not greater than 500 or at least 2.6 and not greater than 70.

In an embodiment, the coated abrasive particle may have a particular ratio (Psl/Pf) of slanted particles (Psl) to fallen particles (Pf) that may facilitate improved performance and/or manufacturing of the abrasive article. In an embodiment, Psl/Pf can be at least 0.5 or at least 0.6 or at least 0.7 or at least 0.8 or at least 0.9 or at least 1 or at least 1.2 or at least 1.4 or at least 1.6 or at least 1.8 or at least 2.0 or at least 2.2 or at least 2.4 or at least 2.6 or at least 2.8 or at least 3.0 or at least 3.2 or at least or at least 3.4 or at least 3.6 or at least 3.8 or at least 4.0 or at least 4.2 or at least 4.4 or at least 4.6 or at least 4.8 or at least 5.0 or at least 5.2 or at least 5.4 or at least 5.6. In another embodiment, Psl/Pf can be not greater than 100 or not greater than 95 or not greater than 90 or not greater than 80 or not greater than 70 or not greater than 60 or not greater than 50 or not greater than 40 or not greater than 30 or not greater than 20 or not greater than 10 or not greater than 8 or not greater than 6. It will be appreciated that Psl/Pf can be between any of the minimum and maximum values noted above, including, for example, but not limited to, at least 2.0 and not greater than 95 or at least 2.6 and not greater than 70.

In an embodiment, the coated abrasive particle may have a particular ratio (Pst/Pi) of standing particles (Pst) to inverted particles (Pi) that may facilitate improved performance and/or manufacturing of the abrasive article. In an embodiment, Pst/Pi can be at least 1 or at least 2.0 or at least 3.0 or at least 4.0 or at least 5.0 or at least 6 or at least 7 or at least 8 or at least 9 or at least 10 or at least 12 or at least 15 or at least 18 or at least 20 or at least 25 or at least 30 or at least 40 or at least 50. In another embodiment, Pst/Pi cannot greater than 100 or not greater than 95 or not greater than 90 or not greater than 80 or not greater than 70 or not greater than 60 or not greater than 50 or not greater than 40 or not greater than 30 or not greater than 20 or not greater than 10. It will be appreciated that Pst/Pi can be between any of the minimum and maximum values noted above, including, for example, but not limited to, at least 2.0 and not greater than 80 or at least 6 and not greater than 20.

In an embodiment, the coated abrasive particle may have a particular ratio (Psl/Pi) of slanted particles (Psl) to inverted particles (Pi) that may facilitate improved performance and/or manufacturing of the abrasive article. In an embodiment, Psl/Pi can be at least 0.6 or at least 0.7 or at least 0.8 or at least 0.9 or at least 1 or at least 1.2 or at least 1.4 or at least 1.6 or at least 1.8 or at least 2.0 or at least 2.2 or at least 2.4 or at least 2.6 or at least 2.8 or at least 3.0 or at least 3.2 or at least or at least 3.4 or at least 3.6 or at least 3.8 or at least 4.0 or at least 4.2 or at least 4.4 or at least 4.6 or at least 4.8 or at least 5.0 or at least 5.2 or at least 5.4 or at least 5.6. In another embodiment, Psl/Pi can be not greater than 100 or not greater than 95 or not greater than 90 or not greater than 80 or not greater than 70 or not greater than 60 or not greater than 50 or not greater than 40 or not greater than 30 or not greater than 20 or not greater than 10 or not greater than 8 or not greater than 6 or not greater than 4 or not greater than 3 or not greater than 2 or not greater than 1.5. It will be appreciated that Psl/Pi can be between any of the minimum and maximum values noted above, including, for example, but not limited to, at least 2.0 and not greater than 95 or at least 2.6 and not greater than 70.

In an embodiment, the coated abrasive particle may have a particular ratio (Pf/Pi) of fallen particles (Pf) to inverted particles (Pi) that may facilitate improved performance and/or manufacturing of the abrasive article. In an embodiment, Pf/Pi can be at least 0.6 or at least 0.7 or at least 0.8 or at least 0.9 or at least 1 or at least 1.2 or at least 1.4 or at least 1.6 or at least 1.8 or at least 2.0 or at least 2.2 or at least 2.4 or at least 2.6 or at least 2.8 or at least 3.0 or at least 3.2 or at least or at least 3.4 or at least 3.6 or at least 3.8 or at least 4.0 or at least 4.2 or at least 4.4 or at least 4.6 or at least 4.8 or at least 5.0. In another embodiment, Pf/Pi can be not greater than 100 or not greater than 95 or not greater than 90 or not greater than 80 or not greater than 70 or not greater than 60 or not greater than 50 or not greater than 40 or not greater than 30 or not greater than 20 or not greater than 10 or not greater than 8 or not greater than 6 or not greater than 4 or not greater than 3 or not greater than 2 or not greater than 1.5. It will be appreciated that Pf/Pi can be between any of the minimum and maximum values noted above, including, for example, but not limited to, at least 2.0 and not greater than 95 or at least 2.6 and not greater than 70.

Figures 5A, 5B:
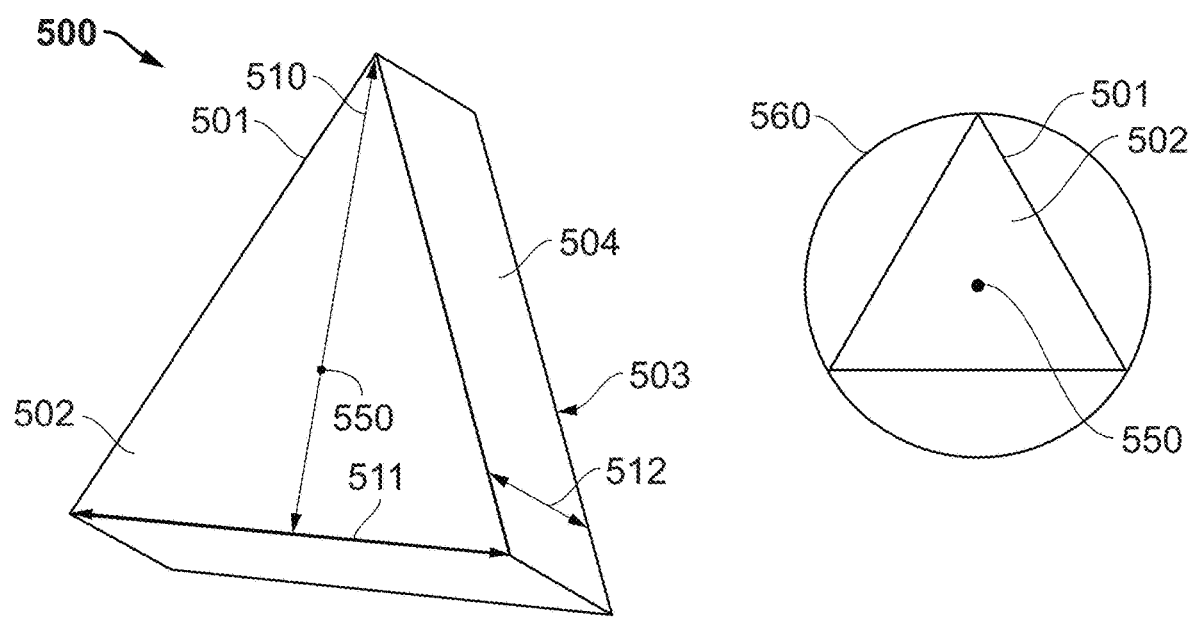
FIG. 5A includes a perspective view illustration of a shaped abrasive particle according to an embodiment.
FIG. 5B includes a top-down view illustration of a shaped abrasive particle according to an embodiment.

Embodiments herein have referred to particles, which can include abrasive particles, secondary particles, or any combination thereof. Various types of abrasive particles and/or secondary particles can be used with abrasive articles described in the embodiments herein. FIG. 5A includes a perspective view illustration of a shaped abrasive particle in accordance with an embodiment. The shaped abrasive particle 500 can include a body 501 including a major surface 502, a major surface 503, and a side surface 504 extending between the major surfaces 502 and 503. As illustrated in FIG. 5A, the body 501 of the shaped abrasive particle 500 can be a thin-shaped body, wherein the major surfaces 502 and 503 are larger than the side surface 504. Moreover, the body 501 can include a longitudinal axis 510 extending from a point to a base and through the midpoint 550 on a major surface 502 or 503. The longitudinal axis 510 can define the longest dimension of the body along a major surface and through the midpoint 550 of the major surface 502.

In certain particles, if the midpoint of a major surface of the body is not readily apparent, one may view the major surface top-down, draw a closest-fit circle around the two-dimensional shape of the major surface and use the center of the circle as the midpoint of the major surface. FIG. 5B includes a top-down illustration of the shaped abrasive particle of FIG. 5A. Notably, the body 501 includes a major surface 502 having a triangular two-dimensional shape. The circle 560 is drawn around the triangular shape to facilitate the location of the midpoint 550 on the major surface 502.

Referring again to FIG. 5A, the body 501 can further include a lateral axis 511 defining a width of the body 501 extending generally perpendicular to the longitudinal axis 510 on the same major surface 502. Finally, as illustrated, the body 501 can include a vertical axis 512, which in the context of thin-shaped bodies can define a height (or thickness) of the body 501. For thin-shaped bodies, the length of the longitudinal axis 510 is greater than the vertical axis 512. As illustrated, the thickness 512 can extend along the side surface 504 between the major surfaces 502 and 503 and perpendicular to the plane defined by the longitudinal axis 510 and lateral axis 511. It will be appreciated that reference herein to length, width, and height of the abrasive particles may be a reference to average values taken from a suitable sampling size of abrasive particles of a larger group, including, for example, a group of abrasive particles affixed to a fixed abrasive.

FIG. 5A includes an illustration of a shaped abrasive particle having a two-dimensional shape as defined by the plane of the upper major surface 502 or major surface 503, which has a generally triangular two-dimensional shape. It will be appreciated that the shaped abrasive particles of the embodiments herein are not so limited and can include other two-dimensional shapes. For example, the shaped abrasive particles of the embodiment herein can include particles having a body with a two-dimensional shape as defined by a major surface of the body from the group of shapes including polygons, regular polygons, irregular polygons, irregular polygons including arcuate or curved sides or portions of sides, ellipsoids, numerals, Greek alphabet characters, Latin alphabet characters, Russian alphabet characters, Kanji characters, complex shapes having a combination of polygons shapes, shapes including a central region and a plurality of arms (e.g., at least three arms) extending from a central region (e.g., star shapes), and a combination thereof. Particular polygonal shapes include rectangular, trapezoidal, quadrilateral, pentagonal, hexagonal, heptagonal, octagonal, nonagonal, decagonal, and any combination thereof. In another instance, the finally formed shaped abrasive particles can have a body having a two-dimensional shape such as an irregular quadrilateral, an irregular rectangle, an irregular trapezoid, an irregular pentagon, an irregular hexagon, an irregular heptagon, an irregular octagon, an irregular nonagon, an irregular decagon, and a combination thereof. An irregular polygonal shape is one where at least one of the sides defining the polygonal shape is different in dimension (e.g., length) with respect to another side. As illustrated in other embodiments herein, the two-dimensional shape of certain shaped abrasive particles can have a particular number of exterior points or external corners. For example, the body of the shaped abrasive particles can have a two-dimensional polygonal shape as viewed in a plane defined by a length and width, wherein the body comprises a two-dimensional shape having at least 4 exterior points (e.g., a quadrilateral), at least 5 exterior points (e.g., a pentagon), at least 6 exterior points (e.g., a hexagon), at least 7 exterior points (e.g., a heptagon), at least 8 exterior points (e.g., an octagon), at least 9 exterior points (e.g., a nonagon), and the like.

Figure 7:
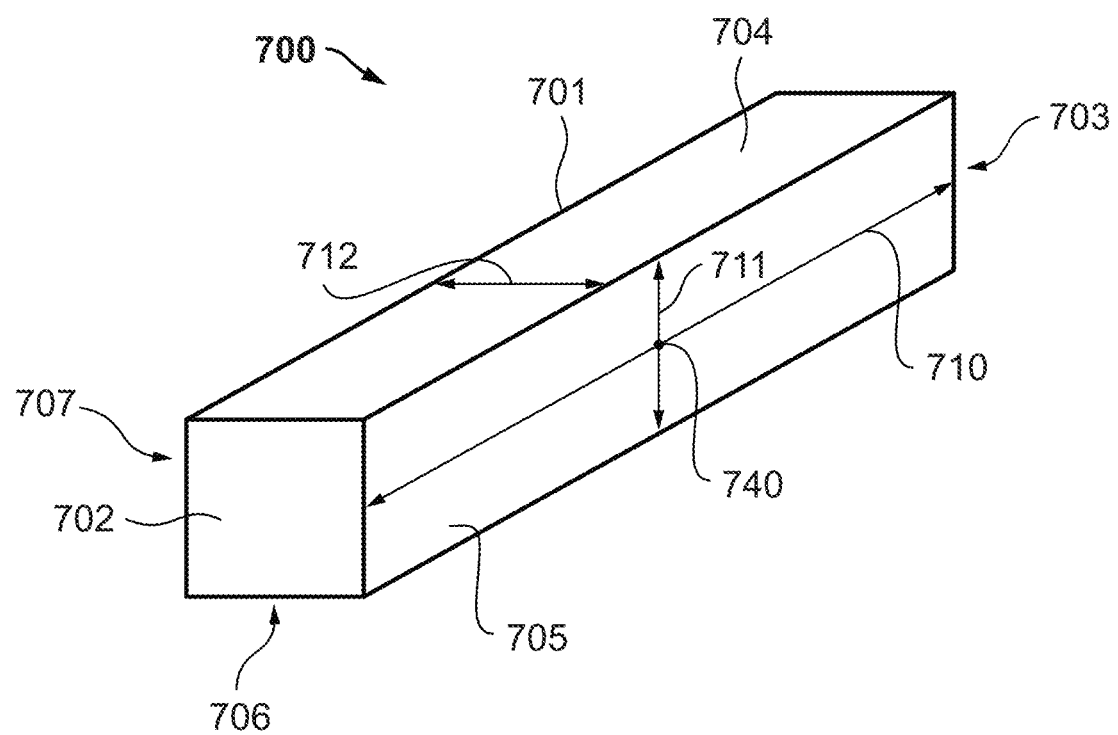
FIG. 7 includes a perspective view illustration of a shaped abrasive particle according to an embodiment.

FIG. 7 includes a perspective view illustration of a shaped abrasive particle according to another embodiment. Notably, the shaped abrasive particle 700 can include a body 701 including a surface 702 and a surface 703, which may be referred to as end surfaces 702 and 703. The body can further include major surfaces 704, 705, 706, 707 extending between and coupled to the end surfaces 702 and 703. The shaped abrasive particle of FIG. 7 is an elongated shaped abrasive particle having a longitudinal axis 710 that extends along the major surface 705 and through the midpoint 740 between the end surfaces 702 and 703. For particles having an identifiable two-dimensional shape, such as the shaped abrasive particles of FIGS. 5 and 7, the longitudinal axis is the dimension that would be readily understood to define the length of the body through the midpoint on a major surface. For example, in FIG. 7, the longitudinal axis 710 of the shaped abrasive particle 700 extends between the end surfaces 702 and 703 parallel to the edges defining the major surface as shown. Such a longitudinal axis is consistent with how one would define the length of a rod. Notably, the longitudinal axis 710 does not extend diagonally between the corners joining the end surfaces 702 and 703 and the edges defining the major surface 705, even though such a line may define the dimension of greatest length. To the extent that a major surface has undulations or minor imperfections from a perfectly planar surface, the longitudinal axis can be determined using a top-down, two-dimensional image that ignores the undulations.

It will be appreciated that the surface 705 is selected for illustrating the longitudinal axis 710, because the body 701 has a generally square cross-sectional contour as defined by the end surfaces 702 and 703. As such, the surfaces 704, 705, 706, and 707 can be approximately the same size relative to each other. However, in the context of other elongated abrasive particles, the surfaces 702 and 703 can have a different shape, for example, a rectangular shape, and as such, at least one of the surfaces 704, 705, 706, and 707 may be larger relative to the others. In such instances, the largest surface can define the major surface, and the longitudinal axis would extend along the largest of those surfaces through the midpoint 740 and may extend parallel to the edges defining the major surface. As further illustrated, the body 701 can include a lateral axis 711 extending perpendicular to the longitudinal axis 710 within the same plane defined by the surface 705. As further illustrated, the body 701 can further include a vertical axis 712 defining a height of the abrasive particle, wherein the vertical axis 712 extends in a direction perpendicular to the plane defined by the longitudinal axis 710 and lateral axis 711 of the surface 705.

It will be appreciated that like the thin-shaped abrasive particle of FIG. 5, the elongated shaped abrasive particle of FIG. 7 can have various two-dimensional shapes, such as those defined with respect to the shaped abrasive particle of FIG. 5. The two-dimensional shape of the body 701 can be defined by the shape of the perimeter of the end surfaces 702 and 703. The elongated shaped abrasive particle 700 can have any of the attributes of the shaped abrasive particles of the embodiments herein.

Figure 8A:
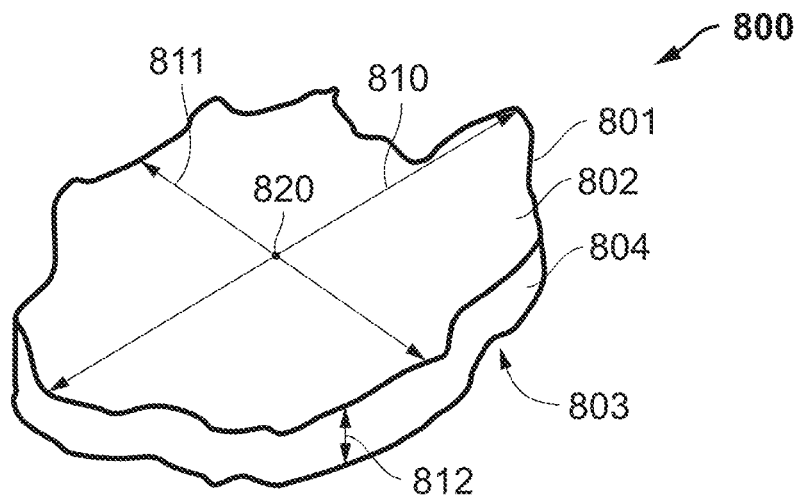
FIG. 8A includes a perspective view illustration of a controlled height abrasive particle according to an embodiment.

FIG. 8A includes a perspective view illustration of a controlled height abrasive particle according (CHAP) to an embodiment. As illustrated, the CHAP 800 can include a body 801 including a first major surface 802, a second major surface 803, and a side surface 804 extending between the first and second major surfaces 802 and 803. As illustrated in FIG. 8A, the body 801 can have a thin, relatively planar shape, wherein the first and second major surfaces 802 and 803 are larger than the side surface 804 and substantially parallel to each other. Moreover, the body 801 can include a longitudinal axis 810 extending through the midpoint 820 and defining a length of the body 801. The body 801 can further include a lateral axis 811 on the first major surface 802, which extends through the midpoint 820 of the first major surface 802, perpendicular to the longitudinal axis 810, and defining a width of the body 801.

The body 801 can further include a vertical axis 812, which can define a height (or thickness) of the body 801. As illustrated, the vertical axis 812 can extend along the side surface 804 between the first and second major surfaces 802 and 803 in a direction generally perpendicular to the plane defined by the axes 810 and 811 on the first major surface. For thin-shaped bodies, such as the CHAP illustrated in FIG. 8A, the length can be equal to or greater than the width, and the length can be greater than the height. It will be appreciated that reference herein to length, width, and height of the abrasive particles may be referenced to average values taken from a suitable sampling size of abrasive particles of a batch of abrasive particles.

Unlike the shaped abrasive particles of FIGS. 5A, 5B, and 7, the CHAP of FIG. 8A does not have a readily identifiable two-dimensional shape based on the perimeter of the first or second major surfaces 802 and 803. Such abrasive particles may be formed in a variety of ways, including but not limited to, fracturing of a thin layer of material to form abrasive particles having a controlled height but with irregularly formed, planar, major surfaces. For such particles, the longitudinal axis is defined as the longest dimension on the major surface that extends through a midpoint on the surface. To the extent that the major surface has undulations, the longitudinal axis can be determined using a top-down, two-dimensional image that ignores the undulations. Moreover, as noted above in FIG. 5B, a closest-fit circle may be used to identify the midpoint of the major surface and identification of the longitudinal and lateral axes.

Figure 8B:
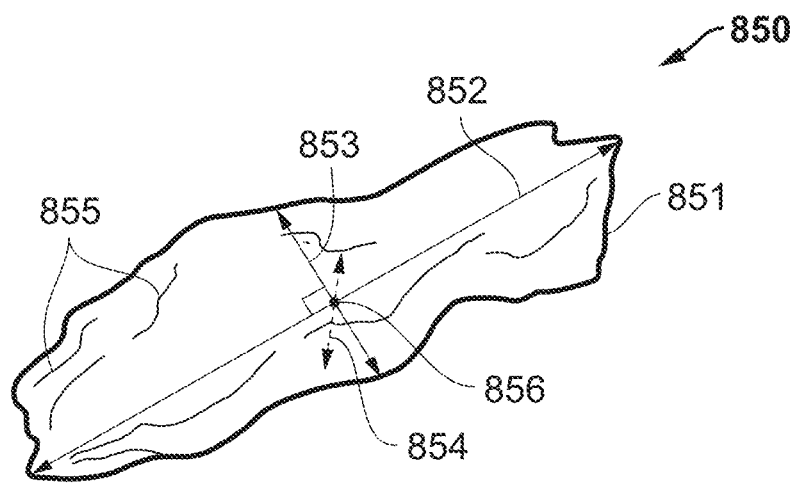
FIG. 8B includes a perspective view illustration of a non-shaped particle according to an embodiment.

FIG. 8B includes an illustration of a non-shaped particle, which may be an elongated, non-shaped abrasive particle or a secondary particle, such as a diluent grain, a filler, an agglomerate, or the like. Shaped abrasive particles may be formed through particular processes, including molding, printing, casting, extrusion, and the like. Shaped abrasive particles can be formed such that each particle has substantially the same arrangement of surfaces and edges relative to each other. For example, a group of shaped abrasive particles generally have the same arrangement and orientation and or two-dimensional shape of the surfaces and edges relative to each other. As such, the shaped abrasive particles have a relatively high shape fidelity and consistency in the arrangement of the surfaces and edges relative to each other. Moreover, constant height abrasive particles (CHAPs) can also be formed through particular processes that facilitate the formation of thin-shaped bodies that can have irregular two-dimensional shapes when viewing the major surface top-down. CHAPs can have less shape fidelity than shaped abrasive particles but can have substantially planar and parallel major surfaces separated by a side surface.

By contrast, non-shaped particles can be formed through different processes and have different shape attributes compared to shaped abrasive particles and CHAPs. For example, non-shaped particles are typically formed by a comminution process wherein a mass of material is formed and then crushed and sieved to obtain abrasive particles of a certain size. However, a non-shaped particle will have a generally random arrangement of surfaces and edges, and generally will lack any recognizable two-dimensional or three-dimensional shape in the arrangement of the surfaces and edges. Moreover, non-shaped particles do not necessarily have a consistent shape with respect to each other, and therefore have a significantly lower shape fidelity compared to shaped abrasive particles or CHAPs. The non-shaped particles generally are defined by a random arrangement of surfaces and edges for each particle and with respect to other non-shaped particles FIG. 8B includes a perspective view illustration of a non-shaped particle. The non-shaped particle 850 can have a body 851 including a generally random arrangement of edges 855 extending along the exterior surface of the body 851. The body can further include a longitudinal axis 852 defining the longest dimension of the particle. The longitudinal axis 852 defines the longest dimension of the body as viewed in two-dimensions. Thus, unlike shaped abrasive particles and CHAPs, where the longitudinal axis is measured on the major surface, the longitudinal axis of a non-shaped particle is defined by the points on the body furthest from each other as the particle is viewed in two-dimensions using an image or vantage that provides a view of the particle's longest dimension. That is, an elongated particle, but non-shaped particles, such as illustrated in FIG. 8B, should be viewed in a perspective that makes the longest dimension apparent to properly evaluate the longitudinal axis. The body 851 can further include a lateral axis 853 extending perpendicular to the longitudinal axis 852 and defining a width of the particle. The lateral axis 853 can extend perpendicular to the longitudinal axis 852 through the midpoint 856 of the longitudinal axis in the same plane used to identify the longitudinal axis 852. The abrasive particle may have a height (or thickness) as defined by the vertical axis 854. The vertical axis 854 can extend through the midpoint 856 but in a direction perpendicular to the plane used to define the longitudinal axis 852 and lateral axis 853. To evaluate the height, one may have to change the perspective of view of the abrasive particle to look at the particle from a different vantage than is used to evaluate the length and width.

In an embodiment, the plurality of abrasive particles 102 and 103 of the coated abrasive article can include shaped abrasive particles. In an embodiment, the shaped abrasive particles can be 3-PT star-shaped abrasive particles. The abrasive particles can have a length (l), a width (w), and a thickness (t), wherein the width≥thickness and the length-≥thickness. The particles can have a primary aspect ratio based on the length:width of the body. The particles can have a secondary aspect ratio based on the length:thickness of the body. The particles can also have a tertiary aspect ratio, based on the width:thickness of the body. The particles 102 and 103 can be an elongated abrasive particle, having a primary aspect ratio greater than 1.1:1.

In an embodiment, the plurality of shaped abrasive particles can include a plurality of shaped abrasive particles having a 3-PT star two-dimensional shape as viewed in a plane of a length and width of the body. The body can include at least 3 exterior corners and at least 4 side surface sections, or at least 5 side surface sections or at least 6 side surface sections. In an embodiment, the plurality of shaped abrasive particles can include a body having at least 3 exterior corners, where the sum of the angles of the exterior corners is less than 180 degrees. In an embodiment, the plurality of shaped abrasive particles can include a body having at least 3 exterior corners, where each of the exterior corners defines an angle less than 60 degrees or less than 59 degrees or less than 58 degrees or less than 57 degrees or less than 56 degrees or less than 55 degrees. In an embodiment, the plurality of shaped abrasive particles can include a body having at least 3 exterior corners and at least 3 interior corners, where each of the interior corners have an interior corner angle value greater than any of the exterior corner values of any of the at least 3 exterior corners.

Exterior corners can be identified using the "rubber band test". If a rubber band were to be stretched around the body of the abrasive particle, the corners that contact the rubber band and cause deflection of the rubber band would be exterior corners.

The 3-pointed star abrasive particles of the embodiments herein are a particular type of shaped abrasive particle.

Shaped abrasive particles may be formed through particular processes, including molding, printing, casting, extrusion, and the like. Shaped abrasive particles can be formed such that each particle has substantially the same arrangement of surfaces and edges relative to each other. For example, a group of shaped abrasive particles generally have the same arrangement and orientation and or two-dimensional shape of the surfaces and edges relative to each other. As such, the shaped abrasive particles have a relatively high shape fidelity and consistency in the arrangement of the surfaces and edges relative to each other. Moreover, constant height abrasive particles (CHAPs) can also be formed through particular processes that facilitate the formation of thin-shaped bodies that can have irregular two-dimensional shapes when viewing the major surface top-down. CHAPs can have less shape fidelity than shaped abrasive particles, but can have substantially planar and parallel major surfaces separated by a side surface.

By contrast, non-shaped particles can be formed through different processes and have different shape attributes compared to shaped abrasive particles and CHAPs. For example, non-shaped particles are typically formed by a comminution process wherein a mass of material is formed and then crushed and sieved to obtain abrasive particles of a certain size. However, a non-shaped particle will have a generally random arrangement of surfaces and edges, and generally will lack any recognizable two-dimensional or three-dimensional shape in the arrangement of the surfaces and edges. Moreover, non-shaped particles do not necessarily have a consistent shape with respect to each other, and therefore have a significantly lower shape fidelity compared to shaped abrasive particles or CHAPs. The non-shaped particles generally are defined by a random arrangement of surfaces and edges for each particle and with respect to other non-shaped particles.

Figure 6A:
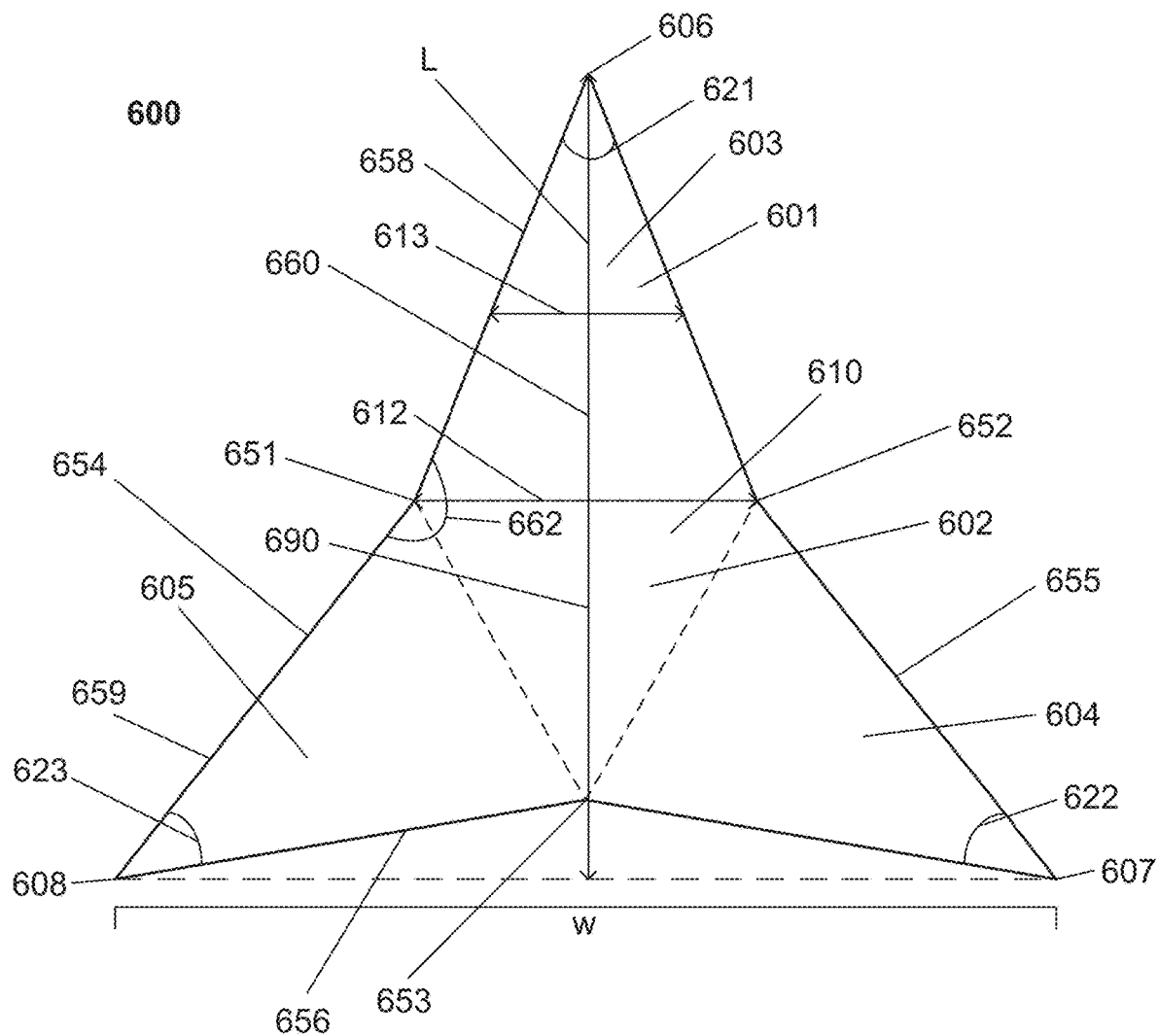
FIG. 6A includes an image of a 3-PT star shaped abrasive particle.
Figure 6B:
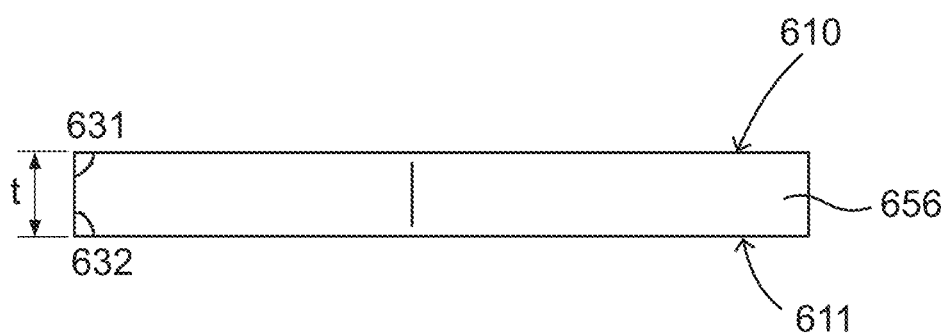
FIG. 6B includes an illustration of a side view of the shaped abrasive particle of FIG. 6A.

FIG. 6A includes a top view image of a 3-PT star-shaped abrasive particle according to a particular embodiment. As illustrated, the shaped abrasive particle 600 can define a star-shaped body, as viewed in two dimensions. In particular, the shaped abrasive particle 600 can include a body 601 having a central portion 602 and a first arm 603, a second arm 604, and a third arm 605 extending from the central portion 602. The body 601 can have a length (l) measured as the longest dimension along a side of the particle and a width (w), measured as the longest dimension of the particle between a midpoint 653 of a side through the midpoint 690 of the body 601 to a first tip 606 of the first arm 603. The width can extend in a direction perpendicular to the dimension of the length. The body 601 can have a thickness (t), extending in a direction perpendicular to the upper surface or first major surface 610 of the body 601 defining the third side surface 656 between the upper surface or first major surface 610 and the base surface 611 as illustrated in FIG. 6B, which is a side view illustration of the image of the particle of FIG. 6A.

The shaped abrasive particle 600 can have a body 601 in the form of a 3-PT star defined by the first arm 603, second arm 604, and the third arm 605 extending from the central portion 602. According to one particular embodiment, at least one of the arms, including, for example, the first arm 603, can have a midpoint width 613 that is less than a central portion width 612. The central portion 602 can be defined as a region between the midpoints 651, 652, and 653 of the first side surface 654, second side surface 655, and third side surface 656, respectively. The central portion width 612 of the first arm 603 can be the width of the dimension between the midpoints 651 and 652. The midpoint width 613 can be the width of the line at a midpoint between the line of the central portion width 612 and the tip 606 of the first arm 603 along a first axis 660. In certain instances, the midpoint width 613 can be not greater than about 90% of the central portion width 612, such as not greater than about 80%, not greater than about 70%, not greater than about 5%, or even not greater than about 60%. Still, the midpoint width 613 can be at least about 10%, such as at least about 20%, at least about 30%, or even at least about 40% of the central portion width 612. It will be appreciated that the midpoint width 613 can have a width relative to the central portion width 612 within a range between any of the above minimum and maximum percentages.

Moreover, the body 601 can have at least one arm, such as the first arm 603, having a tip width at the tip 606 of the first arm 603 that is less than a midpoint width 613. In such instances wherein the tip 606 is sharply formed, the tip width may be considered 0. In instances wherein the tip 606 has a radius of curvature, the tip width may be considered the diameter of the circle defined by the radius of curvature. According to one embodiment, the tip width 614 can be not greater than about 90% of the midpoint width 613, such as not greater than about 80%, not greater than about 70%, not greater than about 60%, not greater than about 50%, not greater than about 40%, not greater than about 30%, not greater than about 20%, or even not greater than about 10%. Still, in certain non-limiting embodiments, the tip width 614 can be at least about 1%, such as at least about 2%, at least about 3%, at least about 5%, or even at least about 10% of the midpoint width 613. It will be appreciated that the tip width 614 can have a width relative to the midpoint width 613 within a range between any of the above minimum and maximum percentages.

As further illustrated, the body 601 can have a first arm 603 including a first tip 606 defining a first tip angle 621 between the first side surface 654 and the second side surface 655. According to an embodiment, the first tip angle can be less than about 60 degrees, such as not greater than about 55 degrees, not greater than about 50 degrees, not greater than about 45 degrees, or even not greater than about 40 degrees. Still, the first tip angle can be at least about 5 degrees, such as at least about 8 degrees, at least about 10 degrees, at least about 15 degrees, at least about 20 degrees, at least about 25 degrees, or even at least about 30 degrees. The first tip angle can be within a range between any of the minimum and maximum values noted above.

The body 601 can include a second arm 604 having a second tip 607 defining a second tip angle 622 between the second side surface 655 and third side surface 656. The second tip angle can be substantially the same as the first tip angle, such as within 5% of the angle numerical value. Alternatively, the second tip angle can be substantially different relative to the first tip angle.

The body 601 can include a third arm 605 having a third tip 608 defining a third tip angle 623 between the first side surface 654 and third side surface 656. The third tip angle can be substantially the same as the first tip angle or second tip angle, such as within 5% of the angle numerical value. Alternatively, the third tip angle can be substantially different relative to the first tip angle or the second tip angle.

The body 601 can have a total angle, which is a sum of the value of the first tip angle, second tip angle, and third tip angle, which can be less than about 180 degrees. In other embodiments, the total angle can be not greater than about 175 degrees, such as not greater than about 170 degrees, not greater than about 15 degrees, not greater than about 150 degrees, such as not greater than about 140 degrees, not greater than about 130 degrees, not greater than about 125 degrees, or even not greater than about 120 degrees. Still, in one non-limiting embodiment, the body 601 can have a total angle of at least about 60 degrees, such as at least about 70 degrees, at least about 80 degrees, at least about 90 degrees, such as at least about 95 degrees, at least about 100 degrees, or even at least about 105 degrees. It will be appreciated that the total sum angle can be within a range between any of the minimum and maximum values noted above.

Figure 6C:
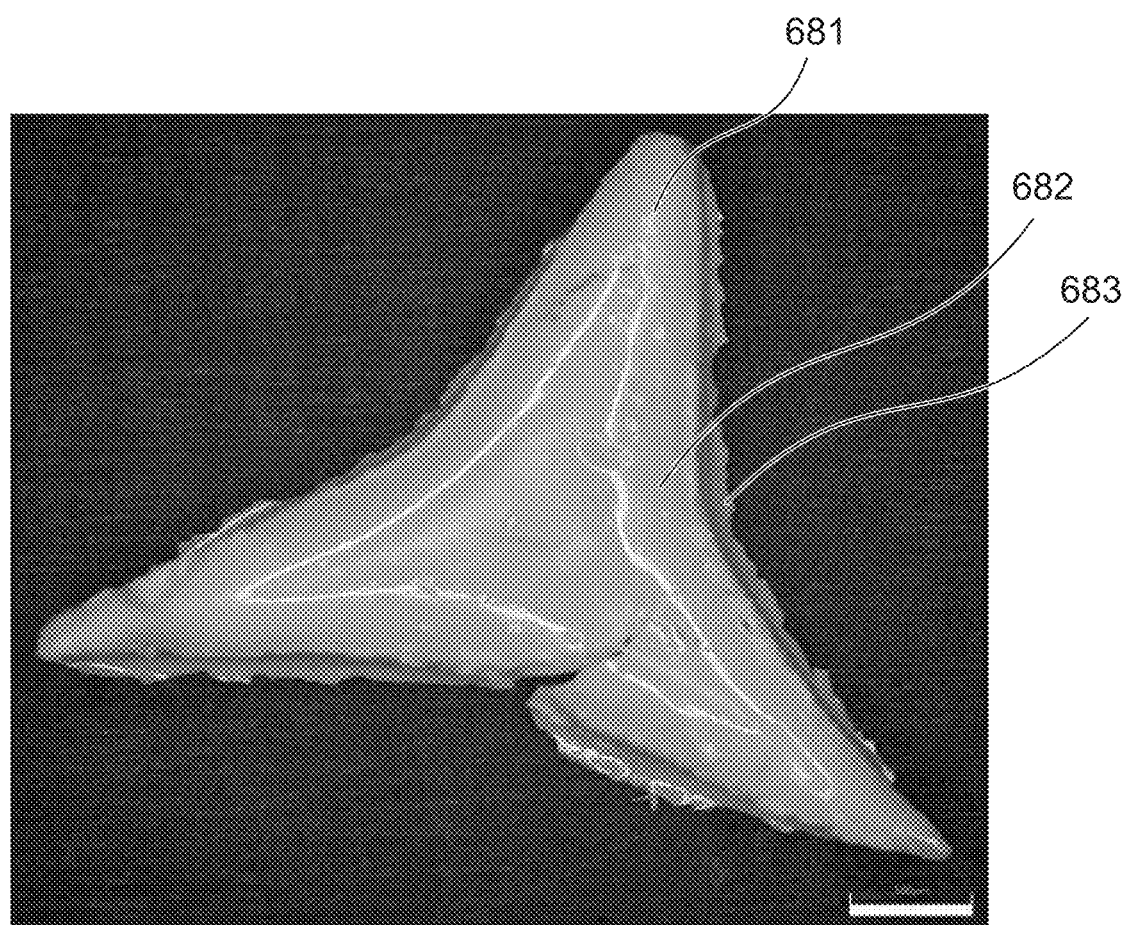
FIG. 6C includes an image of 3-PT star shaped abrasive particle.

As noted herein, the body 601 can have a first side surface 654 extending between the first arm 606 and the third arm 608. In certain instances, the first side surface 654 can have an arcuate contour. For example, turning briefly to FIG. 6C, a top view image of a shaped abrasive particle according to an embodiment is provided. Notably, the shaped abrasive particle of FIG. 6C can include a 3-PT star having a body 681 and an arcuate side surface 682 extending between two points. In particular instances, the side surface 682 can have a concave contour defining a curved portion extending inward toward the central portion 683 of the body 681.

Referring again to FIG. 6A, the body 601 can have a first side surface 654 having a first side section 658 and a second side section 659. The first side section 658 can extend between the first tip 606 and the midpoint 651, and the second side section 659 can extend between the third tip 608 and the midpoint 651. The first side section 658 and second side section 659 can define an interior angle 662 that can be obtuse. For example, the interior angle 662 can be greater than about 90 degrees, such as greater than about 95 degrees, greater than about 100 degrees, greater than about 110 degrees, or even greater than about 120 degrees. Still, in one non-limiting embodiment, the interior angle 662 can be not greater than about 320 degrees, such as not greater than about 300 degrees, or even not greater than about 270 degrees. It will be appreciated that the interior angle can be within a range between any of the minimum and maximum values noted above.

The first side section 658 can extend for a significant portion of the length of the first side surface 654. For example, the first side section 658 can extend for at least about 20%, such as at least about 25%, at least about 30%, at least about 35%, or even at least about 40% of a total length of the first side surface 654. Still, in one non-limiting embodiment, the first side section 658 can have a length (ls1) between the midpoint 651 and the first tip 606 of not greater than about 80%, such as not greater than about 75%, not greater than about 70%, or even not greater than about 5% of the total length of the side surface 654. It will be appreciated that the length of the first side section 658 can be within a range between any of the minimum and maximum percentages noted above.

The second side section 659 can extend for a significant portion of the length of the first side surface 654. For example, the second side section 659 can extend for at least about 20%, such as at least about 25%, at least about 30%, at least about 35%, or even at least about 40% of a total length of the first side surface 654. Still, in one non-limiting embodiment, the second side section 659 can have a length (ls2) between the midpoint 651 and the third tip 608 of not greater than about 80%, such as not greater than about 75%, not greater than about 70%, or even not greater than about 5% of the total length of the side surface 654 as a straight line between the first tip 606 and the third tip 608. It will be appreciated that the length of the second side section 659 can be within a range between any of the minimum and maximum percentages noted above.

The body 601 can include a first average side surface angle 631 between the side surfaces 654, 655, and 656 and the upper surface or first major surface 610. The body can also include a second side surface angle 632 between the side surfaces 654, 655, and 656 and the second major surface or base surface 612.

In an embodiment, the abrasive particles may include a particular first side surface angle that may facilitate improved performance and/or manufacturing of the abrasive particles. In an embodiment, the first side surface angle can be within a range of at least 70 degrees and not greater than 94 degrees or within a range of at least 80 degrees and not greater than 93 degrees or within a range of at least 83 degrees and not greater than 92 degrees or within a range of at least 85 degrees and not greater than 91 degrees.

In an embodiment, the abrasive particles may include a particular second side surface angle that may facilitate improved performance and/or manufacturing of the abrasive particles. In an embodiment, the second side surface angle can be within a range of at least 70 degrees and not greater than 94 degrees or within a range of at least 80 degrees and not greater than 93 degrees or within a range of at least 83 degrees and not greater than 92 degrees or within a range of at least 85 degrees and not greater than 91 degrees.

While the foregoing body 601 of the 3-PT star has been shown to have an upper surface 610 having a two-dimensional shape, as viewed in the plane of the length and width of the body, that is substantially the same as the two-dimensional shape of the base surface or second major surface 611 of the body 601, other shapes are contemplated. For example, in one embodiment, the cross-sectional shape of the body at the base surface can define a base surface shape from the group consisting of a 3-PT star, a 4-PT star, a cross-shape, a polygon, ellipsoids, numerals, Greek alphabet characters, Latin alphabet characters, Russian alphabet characters, complex shapes having a combination of polygonal shapes, and a combination thereof. Moreover, the cross-sectional shape of the body at the upper surface can define an upper surface shape, which can be different than the base surface shape and selected from the group of a 3-PT star, a 4-PT star, a cross-shape, a polygon, ellipsoids, numerals, Greek alphabet characters, Latin alphabet characters, Russian alphabet characters, complex shapes having a combination of polygonal shapes, and a combination thereof.

In particular instances, the upper surface shape can have an arcuate form of the base surface shape. For example, the upper surface shape can define an arcuate 3-PT two-dimensional shape, wherein the arcuate 3-PT two-dimensional shape defines arms having rounded ends. In particular, the arms as defined at the base surface can have a smaller radius of curvature at the tip as compared to the radius of curvature of the corresponding tip at the upper surface.

As described in other embodiments herein, it will be appreciated that at least one of the arms of the body 601 may be formed to have a twist, such that the arm twists around a central axis. For example, the first arm 603 may twist around the axis 660. Moreover, the body 601 can be formed such that at least one arm extends in an arcuate path from the central region.

In an embodiment, the plurality of shaped abrasive particles may define a first group of abrasive particles. In an embodiment, the first group of abrasive particles may include at least two different types of shaped abrasive particles, wherein the two different types of shaped abrasive particles are different from each other based on at least one characteristic selected from the group of particle size, two-dimensional shape, three-dimensional shape, composition, hardness, toughness, friability, density, grain size, agglomeration state, lateral position, longitudinal position, rotational orientation, or any combination thereof.

In an embodiment, the abrasive article may include a second group of abrasive particles different than the first group of abrasive particles. The second group of abrasive particles can be different from the first group of abrasive particles based on at least one characteristic selected from the group of particle size, two-dimensional shape, three-dimensional shape, composition, hardness, toughness, friability, density, grain size, agglomeration state, lateral position, longitudinal position, rotational orientation, or any combination thereof. In a further embodiment, the second group of abrasive particles comprises diluent abrasive particles. In another embodiment, the second group of particles can include randomly shaped or non-shaped abrasive particles.

Shaped abrasive particles may be formed through particular processes, including molding, printing, casting, extrusion, and the like. Shaped abrasive particles can be formed such that each particle has substantially the same arrangement of surfaces and edges relative to each other. For example, a group of shaped abrasive particles generally have the same arrangement and orientation and or two-dimensional shape of the surfaces and edges relative to each other. As such, the shaped abrasive particles have a relatively high shape fidelity and consistency in the arrangement of the surfaces and edges relative to each other. By contrast, non-shaped particles can be formed through different processes and have different shape attributes compared to shaped abrasive particles/For example, non-shaped particles are typically formed by a comminution process wherein a mass of material is formed and then crushed and sieved to obtain abrasive particles of a certain size. However, a non-shaped particle will have a generally random arrangement of surfaces and edges, and generally will lack any recognizable two-dimensional or three-dimensional shape in the arrangement of the surfaces and edges. Moreover, non-shaped particles do not necessarily have a consistent shape with respect to each other, and therefore have a significantly lower shape fidelity compared to shaped abrasive particles. The non-shaped particles generally are defined by a random arrangement of surfaces and edges for each particle and with respect to other non-shaped particles.

In an embodiment, the abrasive article can include a certain percentage of cracked abrasive particles that may facilitate improved performance or manufacturing of the abrasive article. As defined herein, cracks in the plurality of shaped abrasive particles include cracks visible with a magnification such that the width of the particle is equal to 50% to 95% of the field of view. In an embodiment, the abrasive article can include a plurality of shaped abrasive particles having at least 3 interior corners where not greater than 50% of the total number of shaped abrasive particles have a crack at an interior corner on the first major surface or not greater than 45% or not greater than 40% or not greater than 35% or not greater than 30% or not greater than 25% or not greater than 20% or not greater than 18% or not greater than 16% or not greater than 14% or not greater than 12% or not greater than 10% or not greater than 9% or not greater than 8% or not greater than 7% or not greater than 6% or not greater than 5% or not greater than 4% or not greater than 3% or not greater than 2% or not greater than 1%. In an embodiment, the abrasive article can include a plurality of shaped abrasive particles having at least 3 interior corners where not greater than 50% of the total number of shaped abrasive particles have a crack at an interior corner on the first major surface or not greater than 45% or not greater than 40% or not greater than 35% or not greater than 30% or not greater than 25% or not greater than 20% or not greater than 18% or not greater than 16% or not greater than 14% or not greater than 12% or not greater than 10% or not greater than 9% or not greater than 8% or not greater than 7% or not greater than 6% or not greater than 5% or not greater than 4% or not greater than 3% or not greater than 2% or not greater than 1%. In an embodiment, the abrasive article can include a plurality of shaped abrasive particles having a body having at least 3 interior corners, and wherein at least 0.01% of the total number of shaped abrasive particles have a crack at an interior corner on the first major surface or at least 0.5% or at least 1% or at least 2% or at least 3% or at least 4% or at least 5% or at least 8% or at least 10%. In an embodiment, the abrasive article can include a plurality of shaped abrasive particles having a body having at least 3 interior corners, and wherein at least 0.01% of the total number of shaped abrasive particles have a crack at an interior corner on the second major surface or at least 0.5% or at least 1% or at least 2% or at least 3% or at least 4% or at least 5% or at least 8% or at least 10%. It will be appreciated that the percentage of the plurality of shaped abrasive particles having a crack at an interior corner may be between any of the minimum and maximum values noted above, including, for example, but not limited to at least 0.5% and not greater than 50% or at least 5% and not greater than 30%.

In an embodiment, the abrasive article may include a plurality of shaped abrasive particles of a particular material that may facilitate improved manufacturing or performance of the abrasive article. In an embodiment, the abrasive article may include a plurality of shaped abrasive particles including a ceramic material. In an embodiment, the abrasive article may include a plurality of shaped abrasive particles including at least one of a nitride, oxide, carbide, boride, oxynitride, oxyboride, diamond, carbon-containing material, or any combination thereof. In an embodiment, the abrasive article may include a plurality of shaped abrasive particles including an oxide compound or complex, such as aluminum oxide, zirconium oxide, titanium oxide, yttrium oxide, chromium oxide, strontium oxide, silicon oxide, magnesium oxide, rare-earth oxides, or any combination thereof.

In an embodiment, the plurality of shaped abrasive particles can include a particular percentage of alumina that may facilitate improved performance and/or manufacturing of the abrasive article. In an embodiment, the shaped abrasives particles can include at least 80 wt. % alumina or at least 90 wt. % alumina or at least 91 wt. % alumina or at least 92 wt. % alumina or at least 93 wt. % alumina or at least 94 wt. % alumina or at least 95 wt. % alumina or at least 96 wt. % alumina or at least 97 wt. % alumina. In an embodiment, the shaped abrasive particles can include not greater than 99.5 wt. % alumina or not greater than 99 wt. % alumina or not greater than 98.5 wt. % alumina or not greater than 97.5 wt. % alumina or not greater than 97 wt. % alumina not greater than 96 wt. % alumina or not greater than 94 wt. % alumina. It will be appreciated that the percentage of alumina in the plurality of shaped abrasive particles may be between any of the minimum and maximum values noted above, including, for example, but not limited to, at least 80 wt. % and no greater than 99 wt. % or at least 93 wt. % and no greater than 97 wt. %.

In an embodiment, each shaped abrasive particle of the plurality of shaped abrasive particles can have a particular density that may facilitate improved manufacturing and/or performance of the abrasive article. In an embodiment, each shaped abrasive particle of the plurality of shaped abrasive particles can have a density of at least 95% theoretical density.

In an embodiment, each shaped abrasive particle of the plurality of shaped abrasive particles may have a particular grain size that may facilitate improved manufacturing and/or performance of the abrasive particles. In an embodiment, each shaped abrasive particle of the plurality of shaped abrasive particles may have an average grain (crystallite) size of not greater than 1 micron or not greater than 0.8 microns or not greater than 0.6 microns or not greater than 0.4 microns or not greater than 0.2 microns as measured according to the uncorrected intercept method. In an embodiment, each shaped abrasive particle of the plurality of shaped abrasive particles may have an average grain (crystallite) size of at least 0.01 microns or at least 0.05 microns. It will be appreciated that the grain size of the plurality of shaped abrasive particles may be between any of the minimum and maximum values noted above, including, for example, but not limited to, at least 0.01 microns and no greater than 1 micron or at least 0.05 microns and no greater than 0.8 microns.

In an embodiment, the abrasive article can include a particular density of shaped abrasive particles that may facilitate improved performance and/or manufacturing of the abrasive article. In an embodiment, the density of the plurality of shaped abrasive particle per square centimeter of the abrasive article may be not greater than about 70 particles/cm$^2$ or not greater than 65 particles/cm$^2$ or not greater than 60 particles/cm$^2$ or not greater than 55 particles/cm$^2$ or not greater than about 50 particles/cm$^2$. In an embodiment, the density of the plurality of shaped abrasive particles per square centimeter of the abrasive article is at least 5 particles/cm$^2$ or at least 10 particles/cm$^2$. It will be appreciated that the density of the plurality of shaped abrasive particles may be between any of the minimum and maximum values noted above, including, for example, but not limited to, at least 5 particles/cm$^2$ and no greater than 60 particles/cm$^2$ or at least 10 particles/cm$^2$ and no greater than 50 particles/cm$^2$.

In an embodiment, the abrasive article can include a particular density of well oriented abrasive particles that may facilitate improved performance and/or manufacturing of the abrasive article. In an embodiment, the density of well oriented abrasive particle per square centimeter of the abrasive article may be at least 42 grains/cm$^2$ or at least 43 grains/cm$^2$ or at least 44 grains/cm$^2$ or at least 45 grains/cm$^2$ or at least 46 grains/cm$^2$ or at least 47 grains/cm$^2$ or at least 48 grains/cm$^2$ or at least 49 grains/cm$^2$ or at least 50 grains/cm$^2$ or at least 51 grains/cm$^2$ or at least 52 grains/cm$^2$ or at least 53 grains/cm$^2$ or at least 54 grains/cm$^2$. In an embodiment, the density of well oriented abrasive particles per square centimeter of the abrasive can be not greater than 100 grains/cm$^2$ or not greater than 95 grains/cm$^2$ or not greater than 90 grains/cm$^2$ or not greater than 85 grains/cm$^2$ or not greater than 80 grains/cm$^2$ or not greater than 75 grains/cm$^2$ or not greater than 70 grains/cm$^2$ or not greater than 65 grains/cm$^2$ or not greater than 60 grains/cm$^2$. It will be appreciated that the density of well oriented abrasive particles may be between any of the minimum and maximum values noted above, including, for example, but not limited to, at least 42 particles/cm$^2$ and no greater than 60 particles/cm$^2$ or at least 49 particles/cm$^2$ and no greater than 70 particles/cm$^2$.

In an embodiment, the abrasive article can include a particular weight of make coat that may facilitate improved performance and/or manufacturing of the abrasive article. In an embodiment, the abrasive article can include at least 1 lbs./rm or at least 2 lbs./rm or at least 3 lbs./rm or at least 4 lbs./rm or at least 5 lbs./rm or at least 6 lbs./rm or at least 7 lbs./rm or at least 8 lbs./rm or at least 9 lbs./rm or at least 10 lbs./rm or at least 11 lbs./rm or at least 12 lbs./rm or at least 13 lbs./rm or at least 14 lbs./rm or at least 15 lbs./rm or at least 16 lbs./rm. In another embodiment, the abrasive article can include not greater than 20 lbs./rm or not greater than 19.5 lbs./rm or not greater than 19 lbs./rm or not greater than 18.5 lbs./rm or not greater than 18 lbs./rm or not greater than 17.5 lbs./rm or not greater than 17 lbs./rm. It will be appreciated that the weight of make coat can be between any of the minimum and maximum values noted above, including, for example, at least 9 lbs./rm and not greater than 20 lbs./rm or at least 12 lbs./rm and not greater than 18.5 lbs/rm.

In an embodiment, the coated abrasive article can include an abrasive surface including the abrasive particles. In an embodiment, a certain percentage of total surface area of the abrasive surface can include the plurality of shaped abrasive particles. In an embodiment, not greater than 90% of a total surface area of the abrasive surface comprises the plurality of shaped abrasive particles or not greater than 80% or not greater than 70% or not greater than 60% or not greater than 50% or not greater than 40% or not greater than 30% or not greater than 20%. In an embodiment, at least 1% of the total surface area of the abrasive surface comprises the plurality of shaped abrasive particles or at least 5% or at least 8% or at least 10% or at least 15% or at least 20% or at least 25% or at least 30% or at least 35% or at least 40% or at least 45% or at least 50%. It will be appreciated that the percentage of total surface area of the abrasive surface including the plurality of shaped abrasive particles may be between any of the minimum and maximum values noted above, including, for example, but not limited to, at least 5% and no greater than 50% or at least 15% and no greater than 80%.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. An abrasive article comprising:
a backing layer including a front fill overlying a backing, wherein front fill comprises (1) a front fill roughness of not greater than 100 microns or (2) an average thickness/roughness ratio of greater than 0.80;
a make coat overlying the backing; and
a plurality of abrasive particles overlying the backing layer, wherein at least 65% of the abrasive particles have a well-oriented tilt orientation.

Embodiment 2. The abrasive article of embodiment 1, wherein the backing comprises a material selected from the group consisting of an inorganic material, an organic material, a naturally-occurring material, a woven material, a non-woven material, a polyester, a polyurethane, a polypropylene, a polyimide, a paper, a metal, a metal alloy, or any combination thereof.

Embodiment 3. The abrasive article of embodiment 1, wherein the front fill comprises calcium carbonate.

Embodiment 4. The abrasive article of embodiment 1, wherein the front fill comprises a viscosity of at least 700 cps or at least 800 cps or at least 900 cps or at least 1000 cps or at least 1100 cps or at least 1200 cps or at least 1300 cps or at least 1400 cps.

Embodiment 5. The abrasive article of embodiment 1, wherein the front fill comprises a viscosity of no greater than 2500 cps or no greater than 2000 cps or no greater than 1900 cps or no greater than 1800 cps or no greater than 1700 cps or no greater than 1600.

Embodiment 6. The abrasive article of embodiment 1, wherein the make coat comprises wollastonite, PF resin, water, or a combination thereof.

Embodiment 7. The abrasive article of embodiment 1, wherein the make coat comprises a viscosity of at least 3500 cps or at least 3750 cps or at least 4000 cps or at least 4250 cps or at least 4500 cps or at least 4750 cps or at least 5000 cps or at least 5250 cps.

Embodiment 8. The abrasive article of embodiment 1, wherein the make coat comprises a viscosity of no greater than 7000 cps or no greater than 6750 cps or no greater than 6500 cps or no greater than 6250 cps or no greater than 6000 cps or no greater than 5750.

Embodiment 9. The abrasive article of embodiment 1, wherein the backing comprises a backing deviation of not greater than 1 mm or not greater than 800 microns or not greater than 600 microns or not greater than 500 microns or not greater than 400 microns or not greater than 300 microns or not greater than 250 microns or not greater than 225 microns or not greater than 200 microns or not greater than 190 microns or not greater than 180 microns or not greater than 175 microns or not greater than 170 microns or not greater than 165 microns or not greater than 160 microns.

Embodiment 10. The abrasive article of embodiment 9, wherein the backing comprises a backing deviation of at least 10 microns or at least 25 microns or at least 50 microns or at least 75 microns or at least 100 microns or at least 110 microns or at least 120 microns or at least 130 microns or at least 140 microns or at least 150 microns.

Embodiment 11. The abrasive article of embodiment 1, wherein front fill comprises a front fill roughness of not greater than 95 microns or not greater than 92 microns or not greater than 90 microns or not greater than 87 microns or not greater than 85 microns or not greater than 82 microns or not greater than 80 microns or not greater than 77 microns or not greater than 75 microns or not greater than 72 microns or not greater than 70 microns or not greater than 67 microns or not greater than 65 microns or not greater than 62 microns or not greater than 60 microns or not greater than 57 microns or not greater than 55 microns or not greater than 52 microns or not greater than 50 microns or not greater than 47 microns or not greater than 45 microns or not greater than 42 microns or not greater than 40 microns or not greater than 37 microns or not greater than 35 microns or not greater than 32 microns or not greater than 30 microns.

Embodiment 12. The abrasive article of embodiment 11, wherein the front fill comprises a front fill roughness of at least 1 micron or at least 2 microns or at least 5 microns or at least 7 microns or at least 10 microns or at least 12 microns or at least 15 microns or at least 17 microns or at least 20 microns or at least 22 microns or at least 25 microns or at least 27 microns or at least 30 microns.

Embodiment 13. The abrasive article of embodiment 1, wherein the average thickness/roughness ratio is at least 0.85 or at least 0.90 or at least 0.95 or at least 1.00 or at least 1.05 or at least 1.10 or at least 1.15 or at least 1.20 or at least 1.25 or at least 1.30 or at least 1.35 or at least 1.40 or at least 1.45 or at least 1.50 or at least 1.55 or at least 1.60 or at least 1.65 or at least 1.70 or at least 1.75 or at least 1.80 or at least 1.85 or at least 1.90 or at least 1.95 or at least 2.00 or at least 2.10 or at least 2.20 or at least 2.30 or at least 2.40 or at least 2.50 or at least 2.60 or at least 2.70 or at least 2.80 or at least 2.90 or at least 3.00 or at least 3.50 or at least 4.00 or at least 4.50 or at least 5.00.

Embodiment 14. The abrasive article of embodiment 13, wherein the average thickness/roughness ratio is not greater than 15 or not greater 12 or not greater than 10 or not greater than 9 or not greater than 8 or not greater than 7 or not greater than 6 or not greater than 5 or not greater than 4 or not greater than 3.

Embodiment 15. The abrasive article of embodiment 1, wherein the front fill comprises an average front fill thickness of at least 20 microns or at least 25 microns or at least 30 microns or at least 35 microns or at least 40 microns or at least 45 microns or at least 50 microns or at least 55 microns or at least 60 microns or at least 65 microns or at least 70 microns or at least 75 microns or at least 80 microns or at least 85 microns or at least 90 microns or at least 95 microns or at least 100 microns.

Embodiment 16. The abrasive article of embodiment 15, wherein the front fill comprises an average front fill thickness of not greater than 1 mm or not greater than 900 microns or not greater than 800 microns or not greater than 700 microns or not greater than 600 microns or not greater than 500 microns or not greater than 400 microns or not greater than 300 microns or not greater than 200 microns or not greater than 175 microns or not greater than 150 microns or not greater than 125 microns.

Embodiment 17. The abrasive article of embodiment 1, wherein the make coat comprises a make coat thickness ratio (Tg/Ta) of not greater than 1.5, wherein Tg is the average thickness of the make coat at the sides of the abrasive particles and the Ta is the average thickness of the make coat or wherein the thickness ratio (Tg/Ta) is not greater than 1.45 or not greater than 1.43 or not greater than 1.40 or not greater than 1.38 or not greater than 1.35 or not greater than 1.33 or not greater than 1.30 or not greater than 1.28 or not greater than 1.25 or not greater than 1.23 or not greater than 1.20 or not greater than 1.18 or not greater than 1.15 or not greater than 1.13 or not greater than 1.10 or not greater than 1.08 or not greater than 1.05 or not greater than 1.03.

Embodiment 18. The abrasive article of embodiment 17, wherein the thickness ratio (Tg/Ta) is at least 0.70 or at least 0.80 or at least 0.90 or at least 0.98 or at least 1.00 or at least 1.03 or at least 1.05 or at least 1.08.

Embodiment 19. The abrasive article of embodiment 1, wherein the average thickness of the make coat at the sides of the abrasive particles (Tg) is at least 50 microns or at least 60 microns or at least 70 microns or at least 80 microns or at least 90 microns or at least 100 microns or at least 110 microns or at least 120 microns or at least 130 microns or at least 140 microns or at least 150 microns.

Embodiment 20. The abrasive article of embodiment 19, wherein the average thickness of the make coat at the sides of the grains (Tg) is not greater than 1 mm or not greater than 800 microns or not greater than 700 microns or not greater than 600 microns or not greater than 500 microns or not greater than 400 microns or not greater than 300 microns.

Embodiment 21. The abrasive article of embodiment 1, wherein the make coat comprises a thickness standard deviation at the sides of the abrasive particles (STDTg) of not greater than 100 microns or not greater than 90 microns or not greater than 85 microns or not greater than 80 microns or not greater than 75 microns or not greater than 70 microns or not greater than 65 microns or not greater than 60 microns or not greater than 55 microns or not greater than 50 microns or not greater than 45 microns or not greater than 40 microns or not greater than 35 microns or not greater than 30 microns.

Embodiment 22. The abrasive article of embodiment 21, wherein the make coat comprises a thickness standard deviation at the sides of the abrasive particles (STDTg) of at least 1 micron or at least 5 microns or at least 10 microns or at least 15 microns or at least 20 microns or at least 25 microns or at least 30 microns.

Embodiment 23. The abrasive article of embodiment 1, wherein the average thickness of the make coat (Ta) is at least 50 microns or at least 60 microns or at least 70 microns or at least 80 microns or at least 90 microns or at least 100 microns or at least 110 microns or at least 120 microns or at least 130 microns or at least 140 microns or at least 150 microns or at least 160 microns.

Embodiment 24. The abrasive article of embodiment 23, wherein the average thickness of the make coat (Ta) is not greater than 1 mm or not greater than 800 microns or not greater than 700 microns or not greater than 600 microns or not greater than 500 microns or not greater than 400 microns or not greater than 300 microns or not greater than 275 microns or not greater than 250 microns or not greater than 225 microns or not greater than 200 microns.

Embodiment 25. The abrasive article of embodiment 1, wherein the make coat comprises a thickness standard deviation (STDT) of not greater than 100 microns or not greater than 90 microns or not greater than 85 microns or not greater than 80 microns or not greater than 75 microns or not greater than 70 microns or not greater than 65 microns or not greater than 60 microns or not greater than 55 microns or not greater than 50 microns or not greater than 45 microns or not greater than 40 microns or not greater than 35 microns or not greater than 30 microns or not greater than 25 microns or not greater than 20 microns or not greater than 15 microns or not greater than 10 microns.

Embodiment 26. The abrasive article of embodiment 25, wherein the make coat comprises a thickness standard deviation (STDT) of at least 1 micron or at least 2 microns or at least 3 microns or at least 4 microns or at least 5 microns or at least 7 microns or at least 10 microns or at least 12 microns or at least 15 microns or at least 18 microns or at least 20 microns or at least 22 microns or at least 25 microns or at least 28 microns or at least 30 microns.

Embodiment 27. The abrasive article of embodiment 1, wherein at least a portion of the abrasive particles comprise a random rotational orientation.

Embodiment 28. The abrasive article of embodiment 27, wherein a portion includes at least 10% of the total number of abrasive particles or at least 20% or at least 30% or at least 40% or at least 50% or at least 60% or at least 70% or at least 80% or at least 90% or essentially all of the abrasive particles have a random rotational orientation.

Embodiment 29. The abrasive article of embodiment 1, further comprising a standing portion of abrasive particles have a standing orientation, wherein the standing portion includes at least 10% of the total number of the abrasive particles or at least 20% or at least 30% or at least 40% or at least 50% or at least 55% or at least 57% or at least 60% or at least 62% or at least 65% or at least 67% or at least 70% or at least 72% or at least 75% or at least 77% or at least 80% or at least 82% or at least 85% or at least 87% or at least 90% of the total number of the abrasive particles.

Embodiment 30. The abrasive article of embodiment 29, wherein the standing portion is not greater than 99.9% of the total number of the abrasive particles or not greater than 99% or not greater than 98% or not greater than 97% or not greater than 96% or not greater than 95% of the total number of the abrasive particles.

Embodiment 31. The abrasive article of embodiment 1, further comprising a slanted portion of abrasive particles have a slanted orientation, wherein the slanted portion includes at least 1% of the total number of the abrasive particles or at least 2% or at least 3% or at least 4% or at least 5% or at least 6% or at least 7% or at least 8% or at least 9% or at least 10% or at least 11% or at least 12% or at least 13% or at least 14% or at least 15% or at least 16% or at least 17% or at least 18% or at least 20% or at least 25% of the total number of the abrasive particles.

Embodiment 32. The abrasive article of embodiment 31, wherein the slanted portion is not greater than 90% of the total number of the abrasive particles or not greater than 85% or not greater than 80% or not greater than 75% or not greater than 70% or not greater than 65% or not greater than 60% or not greater than 55% or not greater than 50% or not greater than 45% or not greater than 40% or not greater than 35% or not greater than 30% or not greater than 25% or not greater than 20% or not greater than 18% or not greater than 15% or not greater than 12% or not greater than 10% of the total number of the abrasive particles.

Embodiment 33. The abrasive article of embodiment 1, further comprising a standing portion of abrasive particles (Pst) having a standing orientation and a slanted portion (Psl) of abrasive particles having a slanted orientation, and further comprising a ratio of the standing portion relative to the slanted portion (PSt/Psl) of at least 1 or at least 1.2 or at least 1.4 or at least 1.6 or at least 1.8 or at least 2.0 or at least 2.2 or at least 2.4 or at least 2.6 or at least 2.8 or at least 3.0 or at least 3.5 or at least 4.0 or at least 4.5 or at least 5.0 or at least 5.5 or at least 6.0 or at least 6.5 or at least 7.0 or at least 7.5 or at least 8.0 or at least 8.5 or at least 9.0 or at least 10.0 or at least 11 or at least 12 or at least 13 or at least 14 or at least 15 or at least 16 or at least 17 or at least 18 or at least 19 or at least 20.

Embodiment 34. The abrasive article of embodiment 33, wherein the ratio of the standing portion relative to the slanted portion (PSt/Psl) is not greater than 100 or not greater than 95 or not greater than 90 or not greater than 80 or not greater than 70 or not greater than 60 or not greater than 50 or not greater than 40 or not greater than 30 or not greater than 28 or not greater than 25 or not greater than 22 or not greater than 20 or not greater than 19 or not greater than 18 or not greater than 17 or not greater than 16 or not greater than 15 or not greater than 14 or not greater than 13 or not greater than 12 or not greater than 11 or not greater than 10.

Embodiment 35. The abrasive article of embodiment 1, further comprising a fallen portion of abrasive particles have a fallen orientation, wherein the fallen portion includes at least 0.1% of the total number of the abrasive particles or at least 0.2% or at least 0.4% or at least 0.6% or at least 0.8% or at least 1% or at least 1.5% or at least 2% or at least 2.5% or at least 3% or at least 3.5% or at least 4% or at least 4.5% or at least 5% or at least 6% or at least 7% or at least 8% or at least 9% or at least 10% of the total number of the abrasive particles.

Embodiment 36. The abrasive article of embodiment 35, wherein the fallen portion is not greater than 20% of the total number of the abrasive particles or not greater than 18% or not greater than 15% or not greater than 14% or not greater than 13% or not greater than 12% or not greater than 11% or not greater than 10% or not greater than 9% or not greater than 8% or not greater than 7% or not greater than 6% of the total number of the abrasive particles.

Embodiment 37. The abrasive article of embodiment 1, further comprising a standing portion of abrasive particles (Pst) having a standing orientation and a fallen portion (Pf) of abrasive particles having a fallen orientation, and further comprising a ratio of the standing portion relative to the fallen portion (PSt/Pf) of 2.0 or at least 2.2 or at least 2.4 or at least 2.6 or at least 2.8 or at least 3.0 or at least 3.2 or at least or at least 3.4 or at least 3.6 or at least 3.8 or at least 4.0 or at least 4.2 or at least 4.4 or at least 4.6 or at least 4.8 or at least 5.0 or at least 5.2 or at least 5.4 or at least 5.6 or at least 5.8 or at least 6.0 or at least 6.2 or at least 6.4 or at least 6.6 or at least 6.8 or at least 7.0 or at least 7.2 or at least 7.4 or at least 7.6 or at least 7.8 or at least 8.0.

Embodiment 38. The abrasive article of embodiment 37, wherein the ratio of the standing portion relative to the fallen portion (PSt/Pf) is not greater than 1000 or not greater than 800 or not greater than 500 or not greater than 200 or not greater than 100 or not greater than 90 or not greater than 80 or not greater than 70 or not greater than or not greater than 60 or not greater than 50 or not greater than 40 or not greater than 30 or not greater than 20.

Embodiment 39. The abrasive article of embodiment 1, further comprising a slanted portion of abrasive particles (Psl) having a slanted orientation and a fallen portion (Pf) of abrasive particles having a fallen orientation, and further comprising a ratio of the slanted portion relative to the fallen portion (PSl/Pf) of at least 0.5 or at least 0.6 or at least 0.7 or at least 0.8 or at least 0.9 or at least 1 or at least 1.2 or at least 1.4 or at least 1.6 or at least 1.8 or at least 2.0 or at least 2.2 or at least 2.4 or at least 2.6 or at least 2.8 or at least 3.0 or at least 3.2 or at least or at least 3.4 or at least 3.6 or at least 3.8 or at least 4.0 or at least 4.2 or at least 4.4 or at least 4.6 or at least 4.8 or at least 5.0 or at least 5.2 or at least 5.4 or at least 5.6.

Embodiment 40. The abrasive article of embodiment 39, wherein the ratio of the slanted portion relative to the fallen portion (PSl/Pf) is not greater than 100 or not greater than 95 or not greater than 90 or not greater than 80 or not greater than 70 or not greater than 60 or not greater than 50 or not greater than 40 or not greater than 30 or not greater than 20 or not greater than 10 or not greater than 8 or not greater than 6.

Embodiment 41. The abrasive article of embodiment 1, further comprising an inverted portion of abrasive particles have an inverted orientation, wherein the inverted portion includes at least 0.1% of the total number of the abrasive particles or at least 0.2% or at least 0.4% or at least 0.6% or at least 0.8% or at least 1% or at least 1.5% or at least 2% or at least 2.5% or at least 3% or at least 3.5% or at least 4% or at least 4.5% or at least 5% of the total number of the abrasive particles.

Embodiment 42. The abrasive article of embodiment 41, wherein the inverted portion is not greater than 20% of the total number of the abrasive particles or not greater than 18% or not greater than 15% or not greater than 12% or not greater than 10% or not greater than 9% or not greater than 8% or not greater than 7% or not greater than 6% or not greater than 5% of the total number of the abrasive particles.

Embodiment 43. The abrasive article of embodiment 1, further comprising a standing portion of abrasive particles (Pst) having a standing orientation and an inverted portion (Pi) of abrasive particles having an inverted orientation, and further comprising a ratio of the standing portion relative to the inverted portion (PSt/Pi) of at least 1 or at least 2.0 or at least 3.0 or at least 4.0 or at least 5.0 or at least 6 or at least 7 or at least 8 or at least 9 or at least 10 or at least 12 or at least 15 or at least 18 or at least 20 or at least 25 or at least 30 or at least 40 or at least 50.

Embodiment 44. The abrasive article of embodiment 43, wherein the ratio of the standing portion to the inverted portion (PSt/Pi) of not greater than 100 or not greater than 95 or not greater than 90 or not greater than 80 or not greater than 70 or not greater than 60 or not greater than 50 or not greater than 40 or not greater than 30 or not greater than 20 or not greater than 10.

Embodiment 45. The abrasive article of embodiment 1, further comprising a slanted portion of abrasive particles (Psl) having a slanted orientation and an inverted portion (Pi) of abrasive particles having an inverted orientation, and further comprising a ratio of the slanted portion relative to the inverted portion (PSl/Pi) of at least 0.6 or at least 0.7 or at least 0.8 or at least 0.9 or at least 1 or at least 1.2 or at least 1.4 or at least 1.6 or at least 1.8 or at least 2.0 or at least 2.2 or at least 2.4 or at least 2.6 or at least 2.8 or at least 3.0 or at least 3.2 or at least or at least 3.4 or at least 3.6 or at least 3.8 or at least 4.0 or at least 4.2 or at least 4.4 or at least 4.6 or at least 4.8 or at least 5.0 or at least 5.2 or at least 5.4 or at least 5.6.

Embodiment 46. The abrasive article of embodiment 44, wherein the ratio of the slanted portion relative to the inverted portion (PSl/Pi) of not greater than 100 or not greater than 95 or not greater than 90 or not greater than 80 or not greater than 70 or not greater than 60 or not greater than 50 or not greater than 40 or not greater than 30 or not greater than 20 or not greater than 10 or not greater than 8 or not greater than 6 or not greater than 4 or not greater than 3 or not greater than 2 or not greater than 1.5.

Embodiment 47. The abrasive article of embodiment 1, further comprising a fallen portion of abrasive particles (Pf) having a fallen orientation and an inverted portion (Pi) of abrasive particles having an inverted orientation, and further comprising a ratio of the fallen portion relative to the inverted portion (Pf/Pi) of at least 0.6 or at least 0.7 or at least 0.8 or at least 0.9 or at least 1 or at least 1.2 or at least 1.4 or at least 1.6 or at least 1.8 or at least 2.0 or at least 2.2 or at least 2.4 or at least 2.6 or at least 2.8 or at least 3.0 or at least 3.2 or at least or at least 3.4 or at least 3.6 or at least 3.8 or at least 4.0 or at least 4.2 or at least 4.4 or at least 4.6 or at least 4.8 or at least 5.0.

Embodiment 48. The abrasive article of embodiment 47, wherein the ratio of the fallen portion relative to the inverted portion (Pf/Pi) of not greater than 100 or not greater than 95 or not greater than 90 or not greater than 80 or not greater than 70 or not greater than 60 or not greater than 50 or not greater than 40 or not greater than 30 or not greater than 20 or not greater than 10 or not greater than 8 or not greater than 6 or not greater than 4 or not greater than 3 or not greater than 2 or not greater than 1.5.

Embodiment 49. The abrasive article of embodiment 1, further comprising a standing portion of abrasive particles (Pst) having a standing orientation and a slanted portion (Psl) of abrasive particles having a slanted orientation, and further comprising a well-oriented percentage represented by the sum of the standing portion (%) plus the slanted portion (%) relative to all of the abrasive particles (i.e., 100%), wherein the well-oriented percentage is at least 60% or at least 62% or at least 65% or at least 67% or at least 70% or at least 72% or at least 75% or at least 77% or at least 80% or at least 82% or at least 85% or at least 87% or at least 90% or at least 92% or at least 95%.

Embodiment 50. The abrasive article of embodiment 49, wherein the well-oriented percentage is not greater than 99.9% or not greater than 99% or not greater than 98% or not greater than 97% or not greater than 96% or not greater than 95%.

Embodiment 51. The abrasive article of embodiment 1, wherein the abrasive particles include shaped abrasive particles or elongated abrasive particles, and where each of the shaped abrasive particles or elongated abrasive particles include a body having a length (l), a width (w) and a thickness (t), wherein the width>thickness and the length>thickness.

Embodiment 52. The abrasive article of embodiment 51, wherein the shaped abrasive particles include a 3-pointed star two dimensional shape as viewed in a plane of a length and width of the body.

Embodiment 53. The abrasive article of embodiment 51, wherein each of the shaped abrasive particles or elongated abrasive particles of the plurality of shaped abrasive particles or elongated abrasive particles comprises a body including a first major surface, a second a major surface opposite the first major surface, and a side surface extending between the first major surface and the second major surface, wherein the body comprises at least 3 exterior corners and wherein the side surface comprises at least 4 side surface sections, or at least 5 side surface sections or at least 6 side surface sections Embodiment 54. The abrasive article of embodiment 51, wherein the plurality of shaped abrasive particles or elongated abrasive particles comprises an average side surface angle between the side surface and the first major surface of at least 70 degrees and not greater than 94 degrees or within a range of at least 80 degrees and not greater than 93 degrees or within a range of at least 83 degrees and not greater than 92 degrees or within a range of at least 85 degrees and not greater than 91 degrees.

Embodiment 55. The abrasive article of embodiment 51, wherein the plurality of shaped abrasive particles or elongated abrasive particles comprises an average side surface angle between the side surface and the second major surface of at least 70 degrees and not greater than 94 degrees or within a range of at least 80 degrees and not greater than 93 degrees or within a range of at least 83 degrees and not greater than 92 degrees or within a range of at least 85 degrees and not greater than 91 degrees.

Embodiment 56. The abrasive article of embodiment 51, wherein each of the shaped abrasive particles or elongated abrasive particles of the plurality of shaped abrasive particles or elongated abrasive particles comprises a body having at least 3 exterior corners, wherein the sum of the angles of the exterior corners is less than 180 degrees.

Embodiment 57. The abrasive article of embodiment 56, wherein each of the shaped abrasive particles or elongated abrasive particles of the plurality of shaped abrasive particles or elongated abrasive particles comprises a body having at least 3 exterior corners, wherein each of the exterior corners defines an angle less than 60 degrees or less than 59 degrees or less than 58 degrees or less than 57 degrees or less than 56 degrees or less than 55 degrees.

Embodiment 58. The abrasive article of embodiment 51, wherein each of the shaped abrasive particles or elongated abrasive particles of the plurality of shaped abrasive particles or elongated abrasive particles comprises a body having at least 3 exterior corners and at least 3 interior corners, wherein each of the interior corners have an interior corner angle value greater than any of the exterior corner values of any of the at least 3 exterior corners.

Embodiment 59. The abrasive article of embodiment 51, wherein each of the shaped abrasive particles or elongated abrasive particles of the plurality of shaped abrasive particles or elongated abrasive particles comprises a body having at least 3 interior corners, and wherein not greater than 50% of the total number of plurality of shaped abrasive particles or elongated abrasive particles have a crack at an interior corner or not greater than 45% or not greater than 40% or not greater than 35% or not greater than 30% or not greater than 25% or not greater than 20% or not greater than 18% or not greater than 16% or not greater than 14% or not greater than 12% or not greater than 10% or not greater than 9% or not greater than 8% or not greater than 7% or not greater than 6% or not greater than 5% or not greater than 4% or not greater than 3% or not greater than 2% or not greater than 1%.

Embodiment 60. The abrasive article of embodiment 59, wherein each of the shaped abrasive particles or elongated abrasive particles of the plurality of shaped abrasive particles or elongated abrasive particles comprises a body having at least 3 interior corners, and wherein at least 0.01% of the total number of plurality of shaped abrasive particles or elongated abrasive particles have a crack at an interior corner or at least 0.5% or at least 1% or at least 2% or at least 3% or at least 4% or at least 5% or at least 8% or at least 10%.

Embodiment 61. The abrasive article of embodiment 51, wherein the abrasive particles comprise a ceramic material.

Embodiment 62. The abrasive article of embodiment 61, wherein the abrasive particles comprise at least one of a nitride, oxide, carbide, boride, oxynitride, oxyboride, diamond, carbon-containing material or any combination thereof.

Embodiment 63. The abrasive article of embodiment 61, wherein the abrasive particles comprise an oxide compound or complex, such as aluminum oxide, zirconium oxide, titanium oxide, yttrium oxide, chromium oxide, strontium oxide, silicon oxide, magnesium oxide, rare-earth oxides or any combination thereof.

Embodiment 64. The abrasive article of embodiment 61, wherein the abrasive particles comprise at least 80 wt. % alumina or at least 90 wt. % alumina or at least 91 wt. % alumina or at least 92 wt. % alumina or at least 93 wt. % alumina or at least 94 wt. % alumina or at least 95 wt. % alumina or at least 96 wt. % alumina or at least 97 wt. % alumina.

Embodiment 65. The abrasive article of embodiment 61, wherein the abrasive particles comprise not greater than 99.5 wt. % alumina or not greater than 99 wt. % alumina or not greater than 98.5 wt. % alumina or not greater than 97.5 wt. % alumina or not greater than 97 wt. % alumina not greater than 96 wt. % alumina or not greater than 94 wt. % alumina.

Embodiment 66. The abrasive article of embodiment 1, wherein the abrasive particles have an average density of at least 95% theoretical density.

Embodiment 67. The abrasive article of embodiment 1, wherein the abrasive particles comprise an average grain (crystallite) size of not greater than 1 micron or not greater than 0.8 microns or not greater than 0.6 microns or not greater than 0.4 microns or not greater than 0.2 microns as measured according to the uncorrected intercept method.

Embodiment 68. The abrasive article of embodiment 67, wherein each shaped abrasive particles or elongated abrasive particles of the plurality of shaped abrasive particles or elongated abrasive particles comprises an average grain (crystallite) size of at least 0.01 microns or at least 0.05 microns.

Embodiment 69. The abrasive article of embodiment 1, wherein an areal density the abrasive particles per square centimeter of the abrasive article may be not greater than about 70 particles/cm² or not greater than 65 particles/cm² or not greater than 60 particles/cm² or not greater than 55 particles/cm² or not greater than about 50 particles/cm².

Embodiment 70. The abrasive article of embodiment 69, wherein the areal density is at least 5 particles/cm² or at least 10 particles/cm².

Embodiment 71. The abrasive article of embodiment 1, further comprising an abrasive surface including the abrasive particles and at least one adhesive layer, wherein not greater than 90% of a total surface area of the abrasive surface includes the abrasive particles or not greater than 80% or not greater than 70% or not greater than 60% or not greater than 50% or not greater than 40% or not greater than 30% or not greater than 20%.

Embodiment 72. The abrasive article of embodiment 1, wherein at least 1% of the total surface area of the abrasive surface comprises the abrasive particles or at least 5% or at least 8% or at least 10% or at least 15% or at least 20% or at least 25% or at least 30% or at least 35% or at least 40% or at least 45% or at least 50%.

Embodiment 73. The abrasive article of embodiment 1, wherein the abrasive particles include a first group of abrasive particles and a second group of abrasive particles.

Embodiment 74. The abrasive article of embodiment 73, wherein the first group of abrasive particles includes at least two different types of shaped abrasive particles, wherein the two different types of shaped abrasive particles are different from each other based on at least one characteristic selected from the group of particle size, two-dimensional shape, three-dimensional shape, composition, hardness, toughness, friability, density, grain size, agglomeration state, lateral position, longitudinal position, rotational orientation, or any combination thereof.

Embodiment 75. The abrasive article of embodiment 73, further comprising a second group of abrasive particles different than the first group of abrasive particles.

Embodiment 76. The abrasive article of embodiment 75, wherein the second group of abrasive particles comprises diluent abrasive particles.

Embodiment 77. The abrasive article of embodiment 75, wherein the second group of abrasive particles comprises randomly shaped abrasive particles.

Embodiment 78. The abrasive article of embodiment 75, wherein the second group of abrasive particles are different from the first group of abrasive particles based on at least one characteristic selected from the group of particle size, two-dimensional shape, three-dimensional shape, composition, hardness, toughness, friability, density, grain size, agglomeration state, lateral position, longitudinal position, rotational orientation, or any combination thereof.

Embodiment 79. A coated abrasive article having the features of embodiment 1, including the backing having a major surface and an abrasive layer forming an abrasive surface overlying the major surface of the backing, wherein the abrasive layer forms substantially a single layer of abrasive particles adhered to the major surface of the backing by one or more adhesive layers.

Embodiment 80. The abrasive article of embodiment 1, wherein the backing layer including the front fill comprises a (1) a surface roughness of not greater than 100 microns and (2) an average thickness/roughness ratio of greater than 0.80.

Embodiment 81. A method for forming a coated abrasive article comprising:
obtaining a backing; and
forming a front fill overlying a backing, wherein forming includes making a backing layer including a front fill with a (1) a surface roughness of not greater than 100 microns or (2) an average thickness/roughness ratio of greater than 0.80.

Embodiment 82. The method of embodiment 81, wherein the abrasive article includes the abrasive article of any one of embodiments 1-80.

Embodiment 83. A method of using the abrasive article of any one of embodiments 1-80 to grind a workpiece.

EXAMPLES

Example 1

Sample 1 and Comparative Sample 1 were prepared according to the following procedure having the specifications outlined in Table 1. All backings were saturated with 20.5 lbs./rm of the following composition:
Latex: 63.85%
Cab-o-sil: 0.98%
Defoamer: 0.44%
Wetting Agent: 0.24%
Calcium Carbonate: 31.93%
Dye (reddish/pink): 2.56%

The saturated backing was backfilled with 7.1 lbs./rm of the following composition:
PF Resin: 59.13%
Defoamer: 0.3%
Wetting Agent: 0.66%
Solmod Tamol 165A: 2.01%
Wollastonite: 19.71%
Red Dye: 0.21%
Water: 17.98%

A make coat is applied to the saturated and backfilled backing via two roll coating. The make coat thickness is controlled by nip gap to achieve the desired add on weight. Abrasive particles are then applied to the wet make and the backing via electrostatic coating. The backing, make, and grains are then cured in an oven according to the curing schedule in Table 1. Size and supersize coats are applied and cured in the same manner as the make coat according to the specifications in Table 1.

TABLE 1

|  | Sample 1 | Comparative Sample 1 |
| --- | --- | --- |
| Backing | 1 ply woven PET | 1 ply woven PET |
| Make Coat | | |
| PF resin | 49.34 wt. % | 49.34 wt. % |
| Silane A1100 | 0.44 wt. % | 0.44 wt. % |
| Wetting Agent | 0.15 wt. % | 0.15 wt. % |
| Wollastoinite | 49.34 wt. % | 49.34 wt. % |
| Water | 0.75 wt. % | 0.75 wt. % |
| Black dye | 1 wt. % | 1 wt. % |
| Nip Gap | 0.41 in. | 0.41 in. |
| Add on Weight | 16 lbs./rm | 20 lbs./rm |
| Curing Cycle | 20 min at 170° C. | 20 min at 170° C. |
|  | 20 min at 190° C. | 20 min at 190° C. |
|  | 20 min at 210° C. | 20 min at 210° C. |
|  | 20 min at 235° C. | 20 min at 235° C. |

TABLE 1-continued

|  | Sample 1 | Comparative Sample 1 |
|---|---|---|
| Abrasive Particles | | |
| Type | 3-PT star, alumina | 3-PT star, alumina |
| Size | 36 grit | 36 grit |
| Add on Weight | 33 lbs./rm | 33 lbs./rm |
| Size Coat | | |
| PF resin | 46.95 wt. % | 46.95 wt. % |
| PET-3MP PolyThiol (PTM) | 4.69 wt. % | 4.69 wt. % |
| Defoamer | 0.09 wt. % | 0.09 wt. % |
| Solmod Tamol 165A | 2.35 wt. % | 2.35 wt. % |
| Water | 3.54 wt. % | 3.54 wt. % |
| Cryolite | 41.31 wt. % | 41.31 wt. % |
| Add on Weight | 32 lbs./rm | 32 lbs./rm |
| Curing Cycle | 20 min at 180° C. | 20 min at 180° C. |
|  | 20 min at 200° C. | 20 min at 200° C. |
|  | 20 min at 220° C. | 20 min at 220° C. |
|  | 20 min at 235° C. | 20 min at 235° C. |
| Supersize Coat | | |
| PF resin | 23 wt. % | 23 wt. % |
| Defoamer | 0.11 wt. % | 0.11 wt. % |
| Solmod Daxad 11 | 1.69 wt. % | 1.69 wt. % |
| Water | 7.77 wt. % | 7.77 wt. % |
| Orange Pigment | 2.78 wt. % | 2.78 wt. % |
| $KBF_4$ | 64.48 wt. % | 64.48 wt. % |
| Cab-o-sil | 0.17 wt. % | 0.17 wt. % |
| Add on Weight | 30 lbs./rm | 30 lbs./rm |
| Curing Cycle | 20 min at 170° C. | 20 min at 170° C. |
|  | 20 min at 190° C. | 20 min at 190° C. |
|  | 20 min at 210° C. | 20 min at 210° C. |
|  | 20 min at 235° C. | 20 min at 235° C. |

Conventional sample 1 was a 3M™ Cubitron™ II Cloth Belt 984F 36+grit.

Average make coat thickness was measured according to the following procedure. The samples were cut through the middle to reveal a cross-section. The samples are then cut into 2-inch segments and mounted on an epoxy puck. Two 2-inch segments are then imaged, and the make layer is identified by coloring in the layer using the imaging software. FIG. 13 includes an example image of an abrasive article including a colored make layer. Image analysis is used to overlay vertical gridlines, and the line segments overlapping the make layer were identified and isolated. Each line segment corresponds to a make coat thickness measurement. The average of all segments was taken. Approximately 150-200 overlapping line segments were made per two-inch sample segment, resulting in over 300 measurements for each sample.

Average make coat thickness near standing grains was measured according to the following procedure. The same cross-sectional images for average make coat thickness were also used for average make coat thickness near standing grains. Only standing grains showing their cross-sectional rectangular area with their short side in contact with the make coat were considered. For example, in FIG. 1, grain 102 would be considered, but grain 103 would not. Additionally, only isolated grains were considered. Standing grains in contact with another grain were not considered for average make coat thickness near standing grains measurements. Measurements were made from the highest point of make contacting the grain side down to the lowest point of make contacting the backing on both sides of grain. The line of measurement is made perpendicular to the backing plane. The results for average make coat thickness and average make coat thickness near standing grains measurements can be found below in Table 2.

TABLE 2

|  | S1 (83-2) | Comparative S1 (83-1) | Conventional S1 (3m) |
|---|---|---|---|
| Ta | 155 μm | 157 μm | 128 μm |
| Std Dev of Ta | 84 μm | 86 μm | 75 μm |
| Ta 95% confidence interval | 146-163 μm | 148-166 μm | 124-132 μm |
| Tg | 186 μm | 265 μm | 262 |
| Std Dev of Tg | 59 μm | 76 μm | 99 μm |
| Tg 95% confidence interval | 167-206 μm | 233-297 μm | 225-299 μm |
| Tg/Grain height | 0.16 | 0.22 | 0.22 |

Example 2

Sample 2 was prepared according to the same method as sample 1, according to the specifications below in table 3. The backing for sample 2 was also front filled with 9 lbs./rm of the following composition:

PF Resin: 52.79%

Defoamer: 0.11%

Wetting Agent: 0.11%

Calcium carbonate $CaCO_3$: 42.23%

Water: 4.76%

TABLE 3

|  | Sample 2 (83-13) |
|---|---|
| Backing | 1 ply woven PET |
| Make Coat | |
| PF resin | 49.34 wt. % |
| Silane A1100 | 0.44 wt. % |
| Wetting Agent | 0.15 wt. % |
| Wollastoinite | 49.34 wt. % |
| Water | 0.75 wt. % |
| Black dye | 1 wt. % |
| Nip Gap | 0.41 in. |
| Add on Weight | 8 lbs./rm |
| Curing Cycle | 20 min at 170° C. |
|  | 20 min at 190° C. |
|  | 20 min at 210° C. |
|  | 20 min at 235° C. |
| Abrasive Particles | |
| Type | 3-PT star, alumina |
| Size | 36 grit |
| Add on Weight | 28 lbs./rm |
| Size Coat | |
| PF resin | 46.95 wt. % |
| PET-3MP PolyThiol (PTM) | 4.69 wt. % |
| Defoamer | 0.09 wt. % |
| Solmod Tamol 165A | 2.35 wt. % |
| Water | 3.54 wt. % |
| Cryolite | 41.31 wt. % |
| Add on Weight | 32 lbs./rm |
| Curing Cycle | 20 min at 180° C. |
|  | 20 min at 200° C. |
|  | 20 min at 220° C. |
|  | 20 min at 235° C. |
| Supersize Coat | |
| PF resin | 23 wt. % |
| Defoamer | 0.11 wt. % |
| Solmod Daxad 11 | 1.69 wt. % |
| Water | 7.77 wt. % |
| Orange Pigment | 2.78 wt. % |
| $KBF_4$ | 64.48 wt. % |
| Cab-o-sil | 0.17 wt. % |
| Add on Weight | 30 lbs./rm |
| Curing Cycle | 20 min at 170° C. |

TABLE 3-continued

| Sample 2 (83-13) |
|---|
| 20 min at 190° C. |
| 20 min at 210° C. |
| 20 min at 235° C. |

Sample 2 and Conventional sample 1 were cross-sectioned and mounted to a puck and imaged using SEM. 10 images of width 1000-1200 nm were taken and analyzed for measurements of front fill thickness, backing deviation, and front fill roughness according to the methods below. Example images with colored front fill for front fill thickness and backing deviation measurements can be seen in FIGS. 10a and 10b. An example image with colored front fill for front fill roughness measurements can be seen in FIG. 10c.

Front fill thickness was measured using methods similar to those described above for make thickness. ImageJ software is used to identify and color the front fill as shown in FIG. 10. Image analysis is used to overlay vertical gridlines, and the line segments overlapping the front fill were identified and isolated. Each line segment corresponds to a front fill thickness measurement. About 50 measurements per image were taken. Lines 1001 are exemplary front fill measurements. The average of all measurements for each sample was calculated.

Backing deviation is measured according to the following process using the same images as front fill thickness. An imaginary line 1002 is drawn across the tops of the backing fibers. Lines corresponding to backing deviation measurements 1003 are drawn from line 1002 to the bottom of the "valleys" in the backing. The average of all measurements for each sample was taken.

Front fill roughness is measured according to the following process using the same images as front fill thickness and backing deviation. An imaginary line 1002 is drawn across the tops of the backing fibers. The greatest height of front fill 1004 above each backing "peak" is measured from imaginary line 1002. The lowest height of front fill 1005 in each backing "valley" is measured from imaginary line 1002. The difference 1006 between measurements 1004 and 1005 is calculated and recorded as the front fill roughness. The average of all measurements for each sample was taken. Front fill thickness, backing deviation, and front fill roughness measurements can be found below in table 4.

TABLE 4

| | Sample 2 | Conventional Sample 1 |
|---|---|---|
| Avg Front fill Thickness | 96.2 microns | 75.2 microns |
| Front fill Thickness Std Dev | 54.2 microns | 60.5 microns |
| Front fill Roughness | 37.9 microns | 112.3 microns |
| Avg Thickness/Roughness | 2.54 | 0.67 |
| Backing Deviation | 166.4 microns | 189.7 microns |

Example 3

Samples 3-6 and comparative sample 2 were prepared according to the method for Sample 1 above and the specifications in Tables 5 and 6. No size or supersize coats were applied. Sample 3 is essentially the same as sample 1 without a size or supersize coat. Sample 5 is essentially the same as sample 2 without a size or supersize coat. The backing for sample 5 was front filled with 9 lbs./rm of the following composition:

PF Resin: 52.79%
Defoamer: 0.11%
Wetting Agent: 0.11%
Calcium carbonate $CaCO_3$: 42.23%
Water: 4.76%

Reclaimed Cubitron grains were reclaimed according to the following procedure. A 3M™ Cubitron™ II Cloth Belt 984F 36+grit was obtained. The belt was burned until only abrasive particles and ash remained. The abrasive particles and burnoff were then allowed to soak in a 400 ml glass beaker filled with hydrochloric acid. Enough acid to just cover the grains burnoff was used. The contents were boiled for 10 minutes and then allowed to cool. The solution was then diluted with DI water and then the liquid was disposed of. The beaker with the abrasive particles was then allowed to dry for 2 hours at 60-70° C. The particles and remaining ash were then transferred to a 250 ml Erlenmeyer flask. 50% hydrofluoric acid was added to the flask so that the abrasive particles were just covered. The particles were allowed to soak for 30 minutes. The acid was then diluted with DI water and the liquid was disposed of. The flask was allowed to dry for 2 hours at 60-70° C. The flask and contents were then cooled to room temperature and the reclaimed and acid washed grains were removed.

Conventional sample 2 was prepared by removing the size and supersize coats from Conventional sample 1 via sand blasting.

TABLE 5

| | Sample 3 | Sample 4 | Comparative sample 2 |
|---|---|---|---|
| Backing | 1 ply woven PET | 1 ply woven PET | 1 ply woven PET |
| Make Coat | | | |
| PF resin | 49.34 wt. % | 49.34 wt. % | 49.34 wt. % |
| Silane A1100 | 0.44 wt. % | 0.44 wt. % | 0.44 wt. % |
| Wetting Agent | 0.15 wt. % | 0.15 wt. % | 0.15 wt. % |
| Wollastoinite | 49.34 wt. % | 49.34 wt. % | 49.34 wt. % |
| Water | 0.75 wt. % | 0.75 wt. % | 0.75 wt. % |
| Black dye | 1 wt. % | 1 wt. % | 1 wt. % |
| Nip Gap | 0.41 in. | 0.41 in. | 0.41 in. |
| Add on Weight | 16 lbs./rm | 16 lbs./rm | 20 lbs./rm |
| Curing Cycle | 20 min at 170° C. | 20 min at 170° C. | 20 min at 170° C. |
| | 20 min at 190° C. | 20 min at 190° C. | 20 min at 190° C. |
| | 20 min at 210° C. | 20 min at 210° C. | 20 min at 210° C. |
| | 20 min at 235° C. | 20 min at 235° C. | 20 min at 235° C. |
| Abrasive Particles | | | |
| Type | 36 grit 3-PT star, alumina | Reclaimed Cubitron | Reclaimed Cubitron |
| Add on Weight | 33 lbs./rm | 43 lbs./rm | 44 lbs./rm |

TABLE 6

| | Sample 5 | Sample 6 |
|---|---|---|
| Backing | 1 ply woven PET | 1 ply woven PET |
| Make Coat | | |
| PF resin | 49.34 wt. % | 49.34 wt. % |
| Silane A1100 | 0.44 wt. % | 0.44 wt. % |
| Wetting Agent | 0.15 wt. % | 0.15 wt. % |
| Wollastoinite | 49.34 wt. % | 49.34 wt. % |
| Water | 0.75 wt. % | 0.75 wt. % |
| Black dye | 1 wt. % | 1 wt. % |
| Nip Gap | 0.41 in. | 0.41 in. |
| Add on Weight | 8 lbs./rm | 16 lbs./rm |
| Curing Cycle | 20 min at 170° C. | 20 min at 170° C. |
| | 20 min at 190° C. | 20 min at 190° C. |
| | 20 min at 210° C. | 20 min at 210° C. |
| | 20 min at 235° C. | 20 min at 235° C. |

TABLE 6-continued

|  | Sample 5 | Sample 6 |
|---|---|---|
| Abrasive Particles | | |
| Type | 3-PT star, alumina | 3-PT star, alumina |
| Size | 36 grit | 36 grit |
| Add on Weight | 28 lbs./rm | 28 lbs./rm |

The orientation of the particles in samples 3-6, comparative samples 2, and conventional sample 2 were measured according to the following procedure.

Figure 9A:
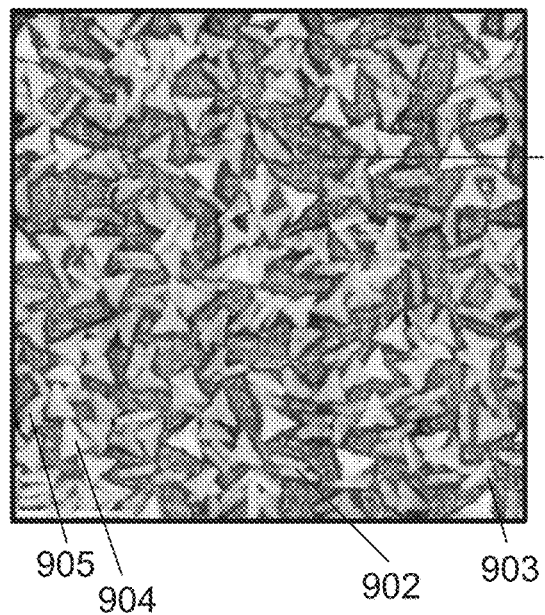
FIG. 9A includes a top down view of a coated abrasive article.
Figure 9B:
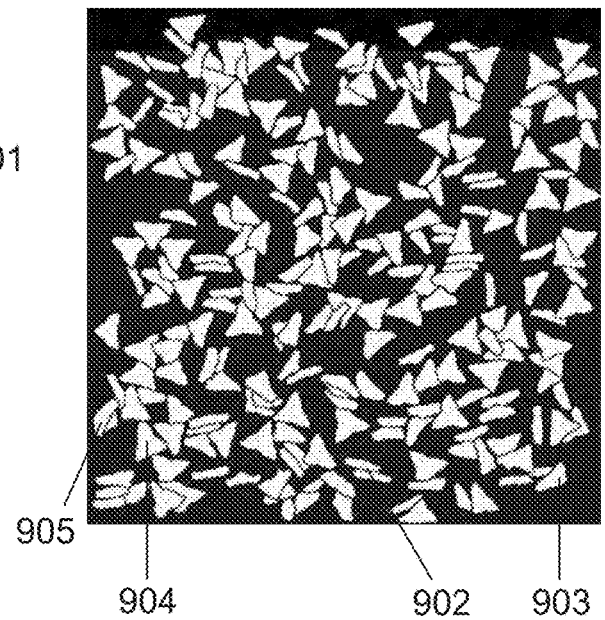
FIG. 9B includes the image of FIG. 9A edited to highlight the abrasive grains.
Figure 9C:
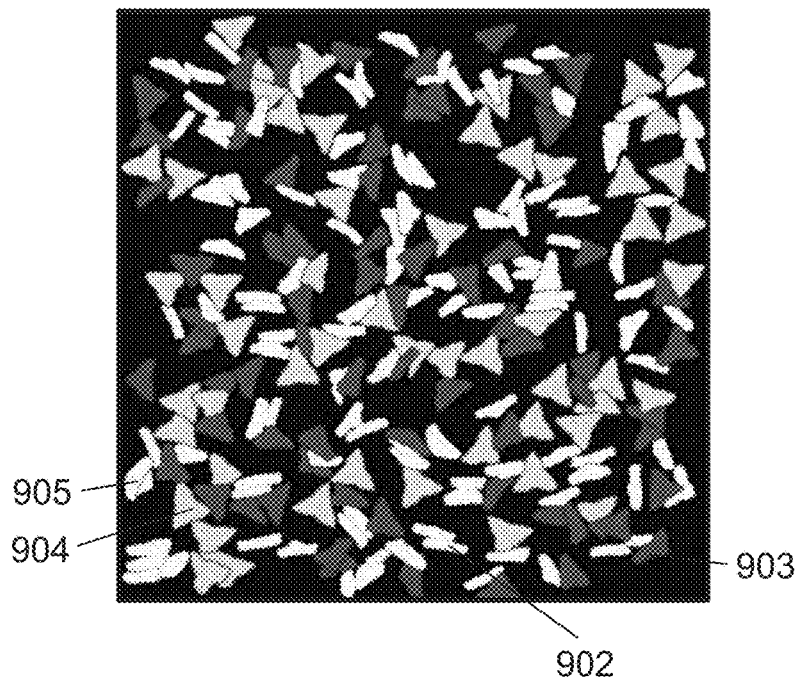
FIG. 9C includes the image of FIG. 9B further edited to color code the grains by orientation.

Images of each sample were taken using a z-stacking microscope. An exemplary image can be found in FIG. 9A. The image of the sample includes a visible make coat 901 and abrasive grains, e.g., 902, 903, 904, 905. ImageJ software was used to threshold and identify the grains, e.g., 902, 903, 904, 905. When necessary, overlapping grains were segmented manually. An exemplary image of the abrasive edited to identify the grains can be found in FIG. 9B. Grains were color-coded and counted by orientation based on the criteria below in Table 7. An exemplary image with color coated grains can be found in FIG. 9C. Particle 902 is in a standing orientation; particle 903 is in a slanted orientation; particle 904 is in a fallen orientation; and particle 905 is in an inverted orientation. Grain orientation data can be found below in Table 8. Images included a 3.2 cm² surface area of each sample.

TABLE 7

|  | Tilt Angle | Shape |
|---|---|---|
| Standing | 65-90° | Visually rectangular from top-down view |
| Slanted | 5-65° | Visually an isosceles 3-PT star from top-down view |
| Fallen | 0-5° | Visually an equilateral 3-PT star from top-down view |
| Inverse | N/A | Only the tip of the grain is in contact with the make coat |

TABLE 8

|  | Standing | Slanted | Well oriented | Fallen | Inverse | Coating density | Well Oriented Coating Density |
|---|---|---|---|---|---|---|---|
| Sample 3 | 73% | 12% | 85% | 6% | 10% | 65 #/cm² | 57 #/cm² |
| Sample 4 | 44% | 42% | 86% | 10% | 4% | 66 #/cm² | 55 #/cm² |
| Sample 5 | 82% | 5% | 87% | 7% | 6% | 61 #/cm² | 53 #/cm² |
| Sample 6 | 62% | 22% | 84% | 8% | 8% | 59 #/cm² | 50 #/cm² |
| Conventional Sample 2 | 35% | 23% | 58% | 40% | 2% | 63 #/cm² | 37 #/cm² |
| Comparative Sample 2 | 42% | 17% | 59% | 40% | 1% | 70 #/cm² | 41 #/cm² |

As can be seen in Table 8, samples 3-6 had a larger percentage of particles in desirable orientations as compared to the comparative and conventional samples. Sample 5, which included the front filled backing, included a significantly larger number of standing particles as compared to all other samples.

What is claimed is:

1. An abrasive article comprising: a backing layer including a front fill overlying a backing, wherein front fill comprises (1) a front fill roughness of not greater than 100 microns or (2) an average thickness/roughness ratio of at least 0.80; a make coat overlying the backing; and a plurality of abrasive particles overlying the backing layer, wherein at least 65% of the abrasive particles have a well oriented tilt orientation; and wherein the make coat comprises an average thickness at the sides of the abrasive particles (Tg) of not greater than 1 mm.

2. The abrasive article of claim 1, wherein the front fill comprises calcium carbonate.

3. The abrasive article of claim 1, wherein the backing comprises a backing deviation of not greater than 1 mm.

4. The abrasive article of claim 1, wherein front fill comprises a front fill roughness of at least 1 micron and not greater than 100 microns.

5. The abrasive article of claim 1, wherein the average thickness/roughness ratio is at least 0.85 and not greater than 15.

6. The abrasive article of claim 1, wherein the front fill comprises an average front fill thickness of at least 20 microns and not greater than 1 mm.

7. The abrasive article of claim 1, wherein the make coat comprises a make coat thickness ratio (Tg/Ta) of not greater than 1.5, wherein Tg is the average thickness of the make coat at the sides of the abrasive particles and the Ta is the average thickness of the make coat.

8. The abrasive article of claim 1, further comprising a standing portion of abrasive particles have a standing orientation, wherein the standing portion includes at least 10% of the total number of the abrasive particles.

9. The abrasive article of claim 1, further comprising a standing portion of abrasive particles (Pst) having a standing orientation and a slanted portion (Psl) of abrasive particles having a slanted orientation, and further comprising a ratio of the standing portion relative to the slanted portion (PSt/Psl) of at least 1.

10. The abrasive article of claim 1, further comprising a fallen portion of abrasive particles have a fallen orientation, wherein the fallen portion is not greater than 20% of the total number of the abrasive particles.

11. The abrasive article of claim 1, further comprising a standing portion of abrasive particles (Pst) having a standing orientation and a fallen portion (Pf) of abrasive particles having a fallen orientation, and further comprising a ratio of the standing portion relative to the fallen portion (PSt/Pf) of at least 2.0.

12. The abrasive article of claim 1, further comprising an inverted portion of abrasive particles have an inverted orientation, wherein the inverted portion includes not greater than 20% of the total number of the abrasive particles.

13. The abrasive article of claim 1, further comprising a standing portion of abrasive particles (Pst) having a standing orientation and a slanted portion (Psl) of abrasive particles having a slanted orientation, and further comprising a well oriented percentage represented by the sum of the standing portion (%) plus the slanted portion (%) relative to all of the abrasive particles (i.e., 100%), wherein the well oriented percentage is at least 65%.

14. The abrasive article of claim 1, wherein the abrasive particles include shaped abrasive particles or elongated abrasive particles, and where each of the shaped abrasive particles or elongated abrasive particles include a body having a length (l), a width (w) and a thickness (t), wherein the width≥thickness and the length≥thickness.

15. The abrasive article of claim 14, wherein the shaped abrasive particles include a 3-pointed star two dimensional shape as viewed in a plane of a length and width of the body.

16. The abrasive article of claim 14, wherein each of the shaped abrasive particles or elongated abrasive particles of the plurality of shaped abrasive particles or elongated abrasive particles comprises a body having at least 3 exterior corners, wherein the sum of the angles of the exterior corners is less than 180 degrees.

17. The abrasive article of claim 15, wherein the body comprises a central portion and a first arm, a second arm, and a third arm extending from the central portion.

18. The abrasive article of claim 17, wherein the body comprises a first side surface extending between the first arm and the second arm.

19. The abrasive article of claim 18, wherein the first side surface comprises a first side section and a second side section.

20. The abrasive article of claim 19, wherein the first side section and the second side section define an interior angle comprising an obtuse angle.

21. The abrasive article of claim 1, wherein the average thickness of the make coat at the sides of the abrasive particles (Tg) is at least 50 microns and not greater than 1 mm.

22. The abrasive article of claim 4, wherein front fill comprises a front fill roughness of at least 30 microns and not greater than 40 microns.

23. The abrasive article of claim 5, wherein the average thickness/roughness ratio of at least 2.5 and not greater than 3.

24. The abrasive article of claim 7, wherein the make coat comprises a make coat thickness ratio (Tg/Ta) of at least 1 and not greater than 1.3, wherein Tg is the average thickness of the make coat at the sides of the abrasive particles and the Ta is the average thickness of the make coat.

25. The abrasive article of claim 8, wherein the standing portion includes at least 50% of the total number of the abrasive particles.

26. The abrasive article of claim 25, wherein the standing portion includes at least 70% of the total number of the abrasive particles.

27. The abrasive article of claim 9, wherein the ratio of the standing portion relative to the slanted portion (PSt/Psl) is at least 3.

28. The abrasive article of claim 12, wherein the inverted portion includes at least 3% of the total number of the abrasive particles.

29. The abrasive article of claim 13, wherein the well-oriented percentage is at least 80%.

* * * * *